US012198622B2

(12) United States Patent
Ma et al.

(10) Patent No.: US 12,198,622 B2
(45) Date of Patent: Jan. 14, 2025

(54) DISPLAY PANEL AND DISPLAY DEVICE

(71) Applicant: Wuhan Tianma Micro-Electronics Co., Ltd., Wuhan (CN)

(72) Inventors: Yangzhao Ma, Wuhan (CN); Hao Dai, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 17/791,029

(22) PCT Filed: Jun. 29, 2021

(86) PCT No.: PCT/CN2021/103123
§ 371 (c)(1),
(2) Date: Jul. 6, 2022

(87) PCT Pub. No.: WO2022/227260
PCT Pub. Date: Nov. 3, 2022

(65) Prior Publication Data
US 2024/0062720 A1 Feb. 22, 2024

(30) Foreign Application Priority Data
Apr. 27, 2021 (CN) ......................... 202110460556.9

(51) Int. Cl.
*G09G 3/3233* (2016.01)

(52) U.S. Cl.
CPC ... *G09G 3/3233* (2013.01); *G09G 2300/0426* (2013.01); *G09G 2300/0452* (2013.01);
(Continued)

(58) Field of Classification Search
CPC ......... G09G 3/3233; G09G 2300/0426; G09G 2300/0452; G09G 2300/0819;
(Continued)

(56) References Cited

U.S. PATENT DOCUMENTS

2020/0394959 A1 12/2020 Lou et al.
2021/0327972 A1* 10/2021 Lou ...................... G09G 3/3225

FOREIGN PATENT DOCUMENTS

CN 110310576 A 10/2019
CN 110580873 A 12/2019
(Continued)

OTHER PUBLICATIONS

International Search Report for PCT/CN2021/103123, dated Dec. 1, 2021 (nine (9) pages).

*Primary Examiner* — Benjamin C Lee
*Assistant Examiner* — Nathan P Brittingham
(74) *Attorney, Agent, or Firm* — KDW Firm PLLC

(57) ABSTRACT

Provided are a display panel and a display device. The display panel includes a display area and pixel circuits. The display area includes a first display area and a second display area. The first display area is used as an optical element reservation area. The pixel circuits include a first pixel circuit and a second pixel circuit. The first display area includes minimum repeating units. One of the minimum repeating units includes first light-emitting elements of at least three different colors. Multiple first light-emitting elements include a light-emitting element of a first color, a light-emitting element of a second color, and a light-emitting element of a third color. The first pixel circuit is configured to drive first light-emitting elements to emit light. In at least one minimum repeating unit, at least two first light-emitting elements of at least one same color are electrically connected to a same first pixel circuit.

12 Claims, 40 Drawing Sheets

(52) U.S. Cl.
CPC ............... *G09G 2300/0819* (2013.01); *G09G 2300/0852* (2013.01); *G09G 2300/0861* (2013.01); *G09G 2320/0233* (2013.01); *G09G 2320/045* (2013.01); *G09G 2320/0666* (2013.01)

(58) Field of Classification Search
CPC ... G09G 2300/0852; G09G 2300/0861; G09G 2320/0233; G09G 2320/045; G09G 2320/0666
See application file for complete search history.

(56) References Cited

FOREIGN PATENT DOCUMENTS

| | | | | | |
|---|---|---|---|---|---|
| CN | 110767682 A | | 2/2020 | | |
| CN | 110767720 A | | 2/2020 | | |
| CN | 110890026 A | | 3/2020 | | |
| CN | 210245501 U | | 4/2020 | | |
| CN | 112038373 A | | 12/2020 | | |
| CN | 112071887 A | * | 12/2020 | ............... | G09F 9/33 |
| CN | 112072000 A | | 12/2020 | | |
| CN | 112634809 A | | 4/2021 | | |
| JP | 2011191473 A | | 9/2011 | | |

* cited by examiner

DISPLAY PANEL AND DISPLAY DEVICE

CROSS-REFERENCE TO RELATED APPLICATIONS

This is a National Stage Application filed under 35 U.S.C. 371 based on International Patent Application No. PCT/CN2021/103123, filed on Jun. 29, 2021, which claims priority to Chinese Patent Application No. 202110460556.9 filed with the China National Intellectual Property Administration (CNIPA) on Apr. 27, 2021, the contents of which are incorporated herein by reference in their entireties.

TECHNICAL FIELD

The present application relates to the field of display technologies, for example, a display panel and a display device.

BACKGROUND

With the development of display technologies, the display panel with a high screen-to-body ratio has become the focus of research. To increase the screen-to-body ratio, an optical element reservation area is usually provided in the display area of the display panel to accommodate optical elements such as a front-facing camera, an infrared sensing device, and a fingerprint recognition element.

However, since the optical element reservation area needs to achieve the display function, light-emitting elements and pixel circuits in one-to-one correspondence with the light-emitting elements need to be provided in the optical element reservation area. This affects the transmittance of the optical element reservation area and leads to poor optical performance of the optical elements, such as the unsharp imaging of the front-facing camera, thereby affecting the capturing effect.

SUMMARY

The present application provides a display panel and a display device to improve the transmittance of the first display area, thereby improving the optical performance of optical elements arranged in an optical element reservation area.

A display panel is provided. The display panel includes a display area and pixel circuits. The display area includes a first display area and a second display area. The first display area is used as an optical element reservation area. The pixel circuits include a first pixel circuit and a second pixel circuit. The second pixel circuit is located in the second display area. The first display area includes minimum repeating units arranged in rows and columns. Each of the minimum repeating units includes first light-emitting elements of at least three different colors. Multiple first light-emitting elements include a light-emitting element of a first color, a light-emitting element of a second color, and a light-emitting element of a third color. The first pixel circuit is configured to drive the first light-emitting elements to emit light. In at least one minimum repeating unit, at least two first light-emitting elements of at least one same color are electrically connected to the same first pixel circuit.

A display device is further provided. The display device includes the display panel as described in any embodiment of the present application.

DETAILED DESCRIPTION

Figure 1:
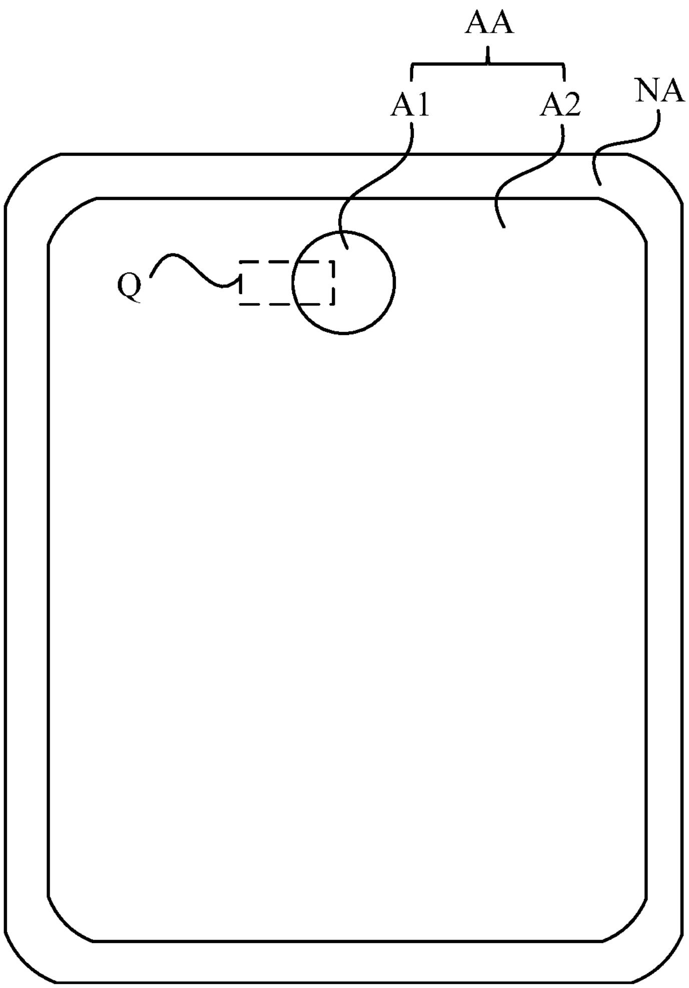
FIG. 1 is a diagram illustrating the structure of a display panel according to an embodiment of the present application.

The present application is described below in conjunction with drawings and embodiments. The embodiments described herein are merely intended to explain the present application and not to limit the present application. For ease of description, only part, not all, of structures related to the present application are illustrated in the drawings.

For the preceding problems, the embodiments of the present application provide a display panel. The display panel includes a display area and pixel circuits. The display area includes a first display area and a second display area. The first display area is used as an optical element reservation area. The pixel circuits include a first pixel circuit and a second pixel circuit. The second pixel circuit is located in the second display area. The first display area includes minimum repeating units arranged in rows and columns. The minimum repeating unit includes first light-emitting elements of at least three different colors. Multiple first light-emitting elements include a light-emitting element of a first color, a light-emitting element of a second color, and a light-emitting element of a third color. The first pixel circuit is configured to drive the first light-emitting elements to emit light. In at least one minimum repeating unit, at least two first light-emitting elements of at least one same color are electrically connected to the same first pixel circuit. With the preceding technical scheme, the number of first pixel circuits can be reduced, thereby reducing the ratio of the non-transparent area in the first display area and improving the transmittance of the optical element reservation area.

The schemes in the embodiments of the present application will be described in conjunction with the drawings in the embodiments of the present application. The embodiments described below are part, not all, of the embodiments of the present application.

Figure 2:
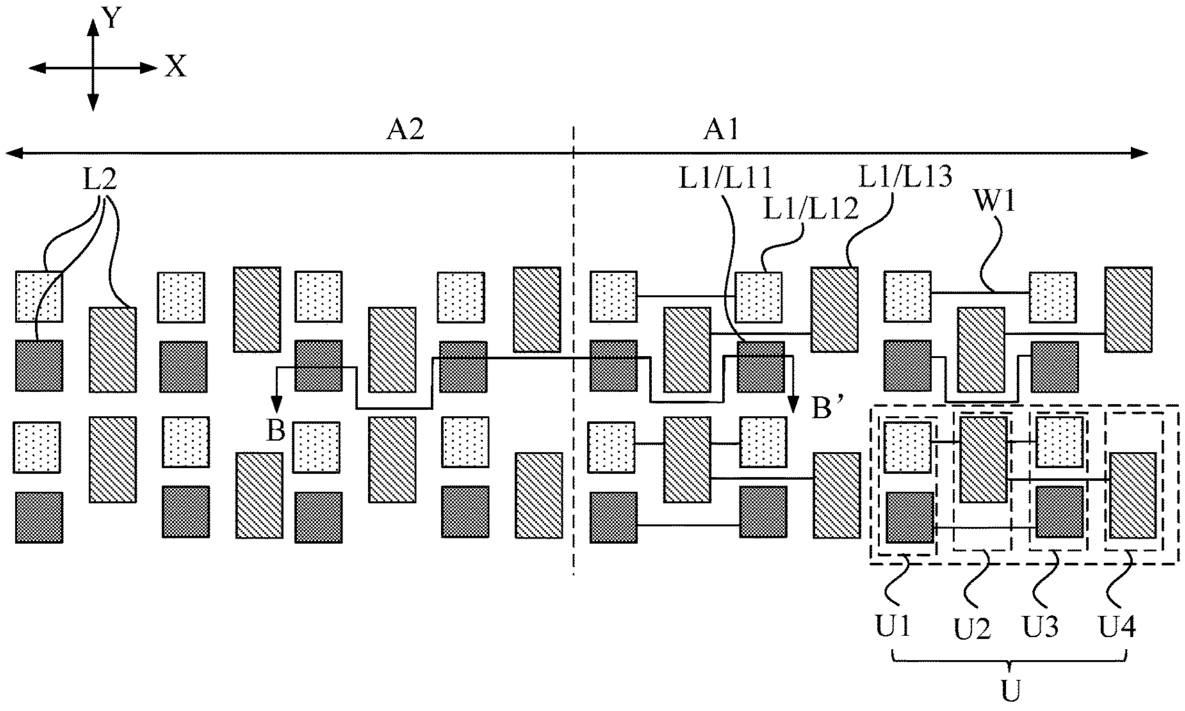
FIG. 2 is a diagram illustrating the structure of a region Q of FIG. 1.
Figure 3:
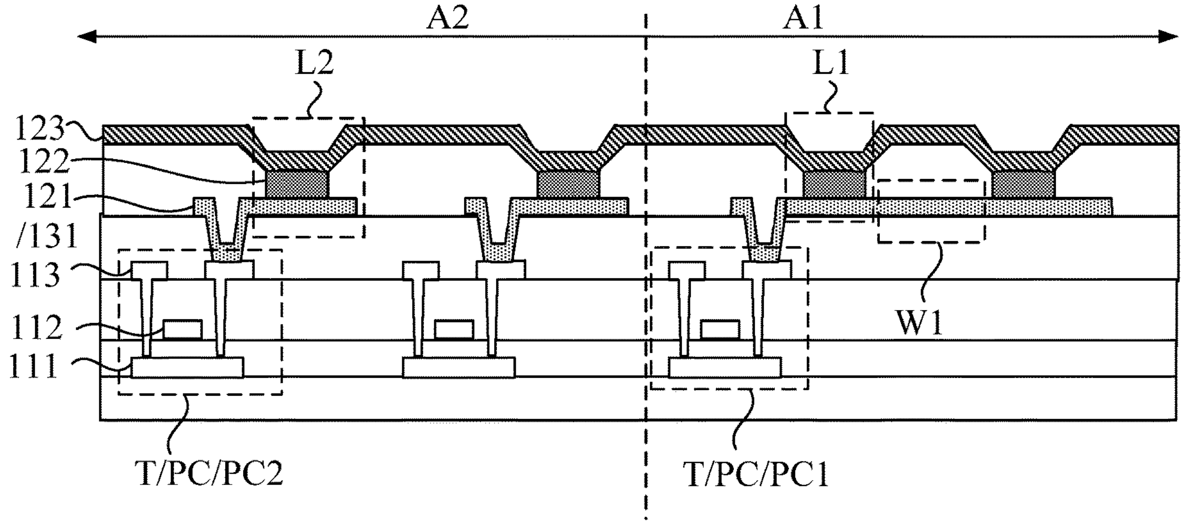
FIG. 3 is a sectional view taken along a direction BB' of FIG. 2.
Figure 4:
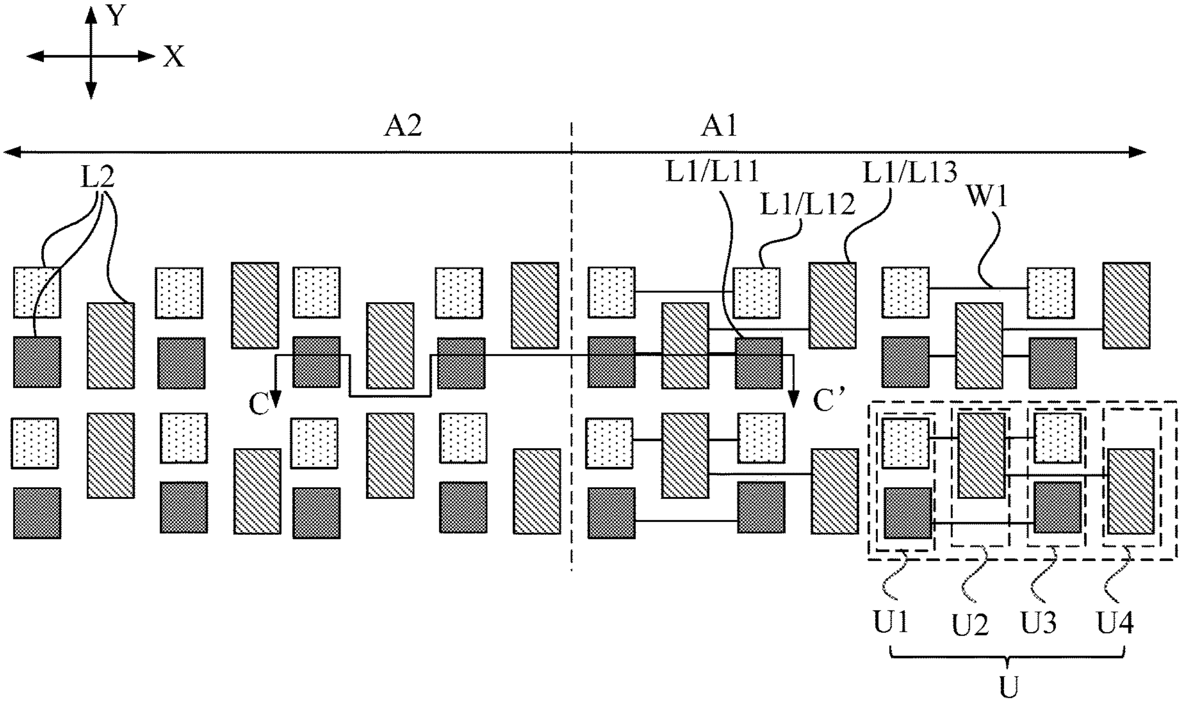
FIG. 4 is another diagram illustrating the structure of the region Q of FIG. 1.
Figure 5:
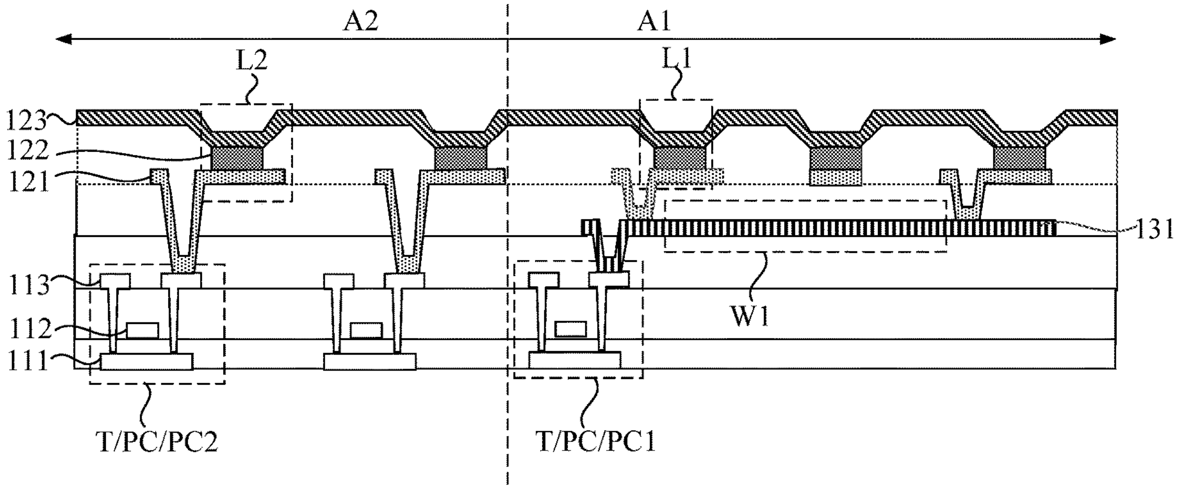
FIG. 5 is a sectional view taken along a direction CC' of FIG. 4.

FIG. 1 is a diagram illustrating the structure of a display panel according to an embodiment of the present application. FIG. 2 is a diagram illustrating the structure of a region Q of FIG. 1. FIG. 3 is a sectional view taken along a direction BB' of FIG. 2. FIG. 4 is a diagram illustrating the structure of another region Q of FIG. 1. FIG. 5 is a sectional view taken along a direction CC' of FIG. 4. Referring to FIGS. 1 to 5, the display panel includes a display area AA and pixel circuits PC. The display area AA includes a first display area A1 and a second display area A2. The first display area A1 is used as an optical element reservation area. The pixel circuits PC include a first pixel circuit PC1 and a second pixel circuit PC2. The second pixel circuit PC2 is located in the second display area A2. The first display area A1 includes minimum repeating units U arranged in rows and columns. The minimum repeating unit U includes first light-emitting elements L1 of at least three different colors. Multiple first light-emitting elements L1 includes light-emitting elements L11 of a first color, light-emitting elements L12 of a second color, and light-emitting elements L13 of a third color. The first pixel circuit PC1 is configured to drive the first light-emitting elements L1 to emit light. In at least one minimum repeating unit U, at least two first light-emitting elements L1 of at least one same color are electrically connected to the same first pixel circuit PC1.

In an embodiment, the display panel may further include a non-display area NA. The display area AA is configured to display pictures. The non-display area NA does not display the pictures, and a gate driver circuit, a driver chip and the like are arranged in the non-display area NA. The display area AA includes the first display area A1 and the second display area A2. The first display area A1 may be used as the optical element reservation area. Optical elements may include a camera, an infrared sensor device, a fingerprint recognition element and the like, which is not limited herein. The shape of the first display area A1 may be set according to the shape of a light sensing surface of the optical element, which is not limited herein. Exemplarily, the first display area A1 may be in the shape of a circle (as shown in FIG. 1), an ellipse, an irregular figure including an arc edge, a polygon or the like. The relative position relationship between the first display area A1 and the second display area A2 may also be set according to practical situations, which is not limited herein. Exemplarily, the first display area A1 may be located inside the second display area A2 (as shown in FIG. 1), or may be located at a corner of the second display area A2, such as an upper left corner or an upper right corner.

Figure 6:
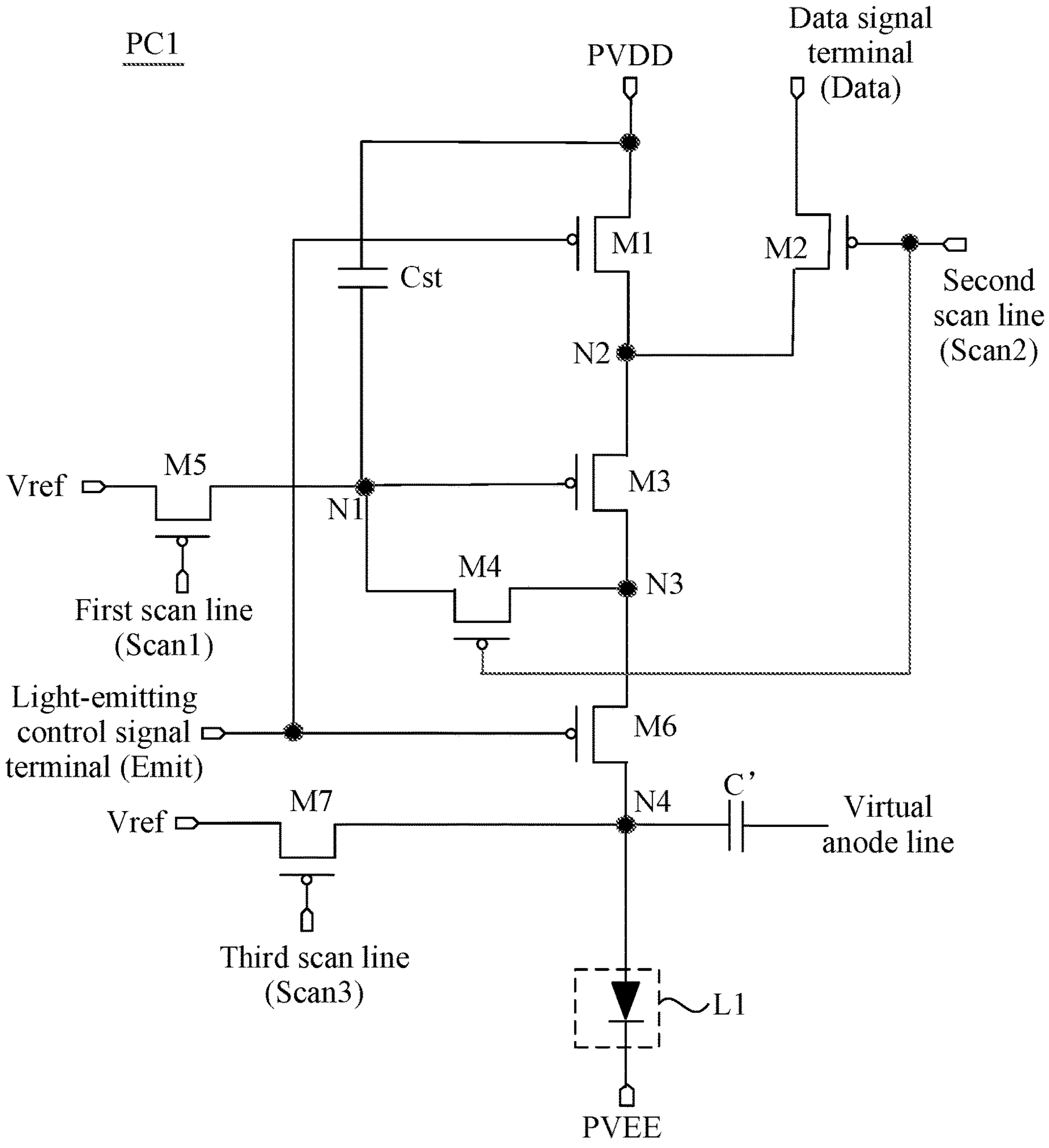
FIG. 6 is a schematic diagram of circuit elements of a first pixel circuit according to an embodiment of the present application.

The implementation mode of the pixel circuit PC may be set according to practical situations, which is not limited herein. Exemplarily, the pixel circuit PC includes "7TIC", "2TIC" and the like. "T" denotes a transistor and "C" denotes a capacitor. Exemplarily, FIG. 6 is a schematic diagram of circuit elements of a first pixel circuit according to an embodiment of the present application. Referring to FIG. 6, the first pixel circuit PC1 is a "7TIC" pixel circuit, and the first pixel circuit PC1 includes a first reset transistor M5, a data write transistor M2, a drive transistor M3, a threshold compensation transistor M4, a first light-emitting control transistor M1, a second light-emitting control transistor M6, a second reset transistor M7 and a storage capacitor Cst. A first electrode of the data write transistor M2 is electrically connected to a data signal terminal Data. A gate of the data write transistor M2 and a gate of the threshold compensation transistor M4 are both electrically connected to a second scan signal terminal Scan2. A first electrode of the first reset transistor M5 and a first electrode of the second reset transistor M7 are both electrically connected to an initialization signal terminal Vref. A gate of the first reset transistor M5 is electrically connected to a first scan signal terminal Scan1. A gate of the second reset transistor M7 is electrically connected to a third scan signal terminal Scan3. A gate of the first light-emitting control transistor M1 and a gate of the second light-emitting control transistor M6 are both electrically connected to a light-emitting control signal terminal Emit. A first electrode of the first light-emitting control transistor M1 is electrically connected to a first power terminal PVDD. A first electrode of the second light-emitting control transistor M6 is electrically connected to an anode of the first light-emitting element L1. A cathode of the first light-emitting element L1 is electrically connected to a second power terminal PVEE. A virtual anode line and a node N4 form a capacitor.

In an embodiment, the first reset transistor M5 and the threshold compensation transistor M4 may be double-gate transistors. Correspondingly, the display panel further includes an initialization signal line, a scan line SCANa, a scan line SCANb, a scan line SCANc, a light-emitting control signal line, a data signal line, a first power line and a second power line. The initialization signal line is configured to transmit an initialization signal to the initialization signal terminal Vref. The scan line SCANa is configured to transmit a first scan signal to the first scan signal terminal Scan1. The scan line SCANb is configured to transmit a second scan signal to the second scan signal terminal Scan2. The scan line SCANc is configured to transmit a third scan signal to the third scan signal terminal Scan3. The light-emitting control signal line is configured to transmit a light-emitting control signal to the light-emitting control signal terminal Emit. The data signal line is configured to transmit a data signal to the data signal terminal Data. The first power line is configured to transmit a first power signal to the first power terminal PVDD. The second power line is configured to transmit a second power signal to the second power terminal PVEE. The structure of the second pixel circuit PC2 and the structure of the first pixel circuit PC1 may be the same or different, and are not limited herein.

Figure 7:
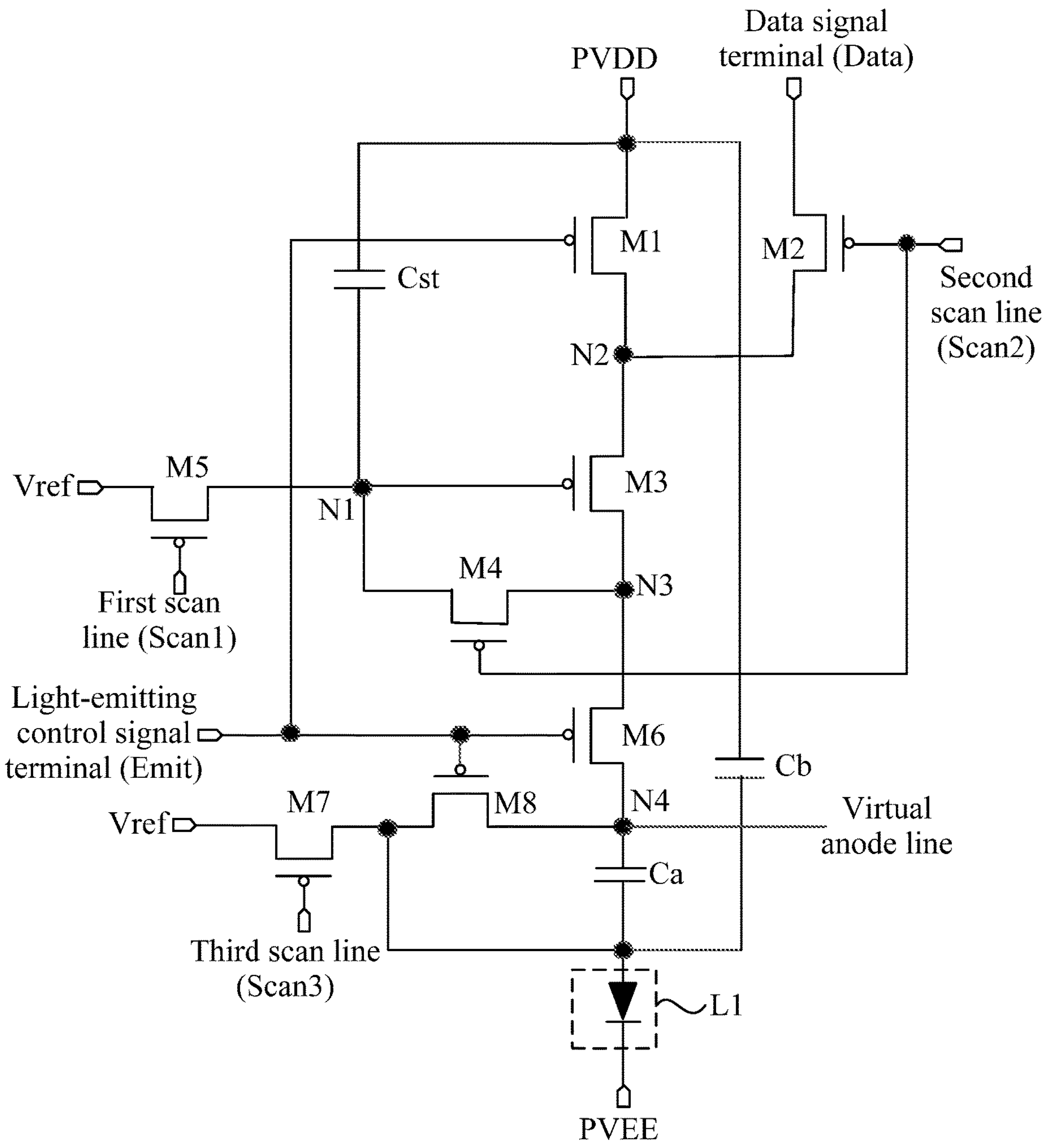
FIG. 7 is a schematic diagram of circuit elements of a virtual pixel circuit according to an embodiment of the present application.

In an embodiment, the display panel may further include a virtual pixel circuit. The virtual pixel circuit is located in the non-display area NA and on two sides of the display area AA. Such configuration of the virtual pixel circuit is to ensure the uniformity of the manufacturing process of the display area AA. The implementation mode of the virtual pixel circuit may be set according to practical situations, which is not limited herein. Exemplarily. FIG. 7 is a schematic diagram of circuit elements of a virtual pixel circuit according to an embodiment of the present application. Referring to FIG. 7, the virtual pixel circuit is a "8T3C" pixel circuit. Similarities between the virtual pixel circuit and the first pixel circuit PC1 in FIG. 6 will not be repeated herein, except that the virtual pixel circuit further includes an eighth transistor M8, a first capacitor Ca and a second capacitor Cb, a gate of the eighth transistor M8 is electrically connected to the light-emitting control signal terminal Emit, the first electrode of the second light-emitting control transistor M6 is electrically connected to the anode of the first light-emitting element L1 through the first capacitor Ca. and the first power terminal PVDD is electrically connected to the anode of the first light-emitting element L1 through the second capacitor Cb. Moreover, the virtual anode line is directly electrically connected to the node N4.

In an embodiment, referring to FIGS. 3 and 5, the display panel further includes a pixel circuit layer located in the display area AA. The pixel circuit layer includes a semiconductor layer 111, a gate metal layer 112, a capacitor metal layer (not shown in FIGS. 3 and 5) and a source/drain metal layer 113. The capacitor metal layer is located between the gate metal layer 112 and the source/drain metal layer 113. An active layer of a transistor T is located in the semiconductor layer 111, a gate of the transistor T is located in the gate metal layer 112, and a source and a drain of the transistor T are located in the source/drain metal layer 113. In an embodiment, the display panel may further include a third metal layer (not shown in FIGS. 3 and 5) located on a side of the source/drain metal layer 113 facing away from the gate metal layer 112. Exemplarily, the initialization signal line transmits the initialization signal. The initialization signal line may include a portion located in the semiconductor layer 111 and extending in a row direction X as well as a portion located in the third metal layer extending in a column direction Y, and both portions are electrically connected to form a grid through punching holes, reducing the load. A first power signal line transmits the first power signal. The first power signal line may include a portion located in the capacitor metal layer and extending in the row direction X as well as a portion located in the third metal layer and extending in the column direction Y. and both portions are electrically connected to form a grid through punching holes, reducing the load. Moreover, a portion blocking a node N2 may be arranged in the capacitor metal layer, and the portion of the first power signal line extending in the column direction Y may be arranged between the data signal line and a node N1, reducing the coupling. The light-emitting control signal line transmits a light-emitting control signal. The light-emitting control signal line is located in the gate metal layer 112 and extends in the row direction X. The scan line SCANa, the scan line SCANb, and the scan line SCANc include a first portion arranged in the source/drain metal layer 113 and a second portion arranged in the gate metal layer 112. The first portion extends in the row direction, the second portion intersects with the active layer of the transistor and is used as the gate of the transistor, and the first portion and the second portion are electrically connected through punching holes, reducing the load. The virtual anode line is located in the capacitor metal layer and extends in the row direction X. and forms the capacitor with the node N4 arranged in the source/drain metal layer 113.

The pixel circuit PC includes the first pixel circuit PC1 and a second pixel circuit PC2. The first pixel circuit PC1 may be located in the first display area A1; or may be located in the second display area A2; or part of first pixel circuits PC1 are located in the first display area A1 and another part of the first pixel circuits PC1 are located in the second display area A2, which are not limited herein. Examples will also be described hereinafter and repetition is not made herein. The second pixel circuit PC2 is located in the second display area A2.

The first display area A1 includes the minimum repeating units U arranged in rows and columns. The minimum repeating unit U described here refers to the first light-emitting elements L1 of all of colors, and the minimum repeating unit U is the minimum unit having repeatability arranged in the row direction or the column direction among all of the first light-emitting elements L1 arranged in the first display area A1. The row direction may be a direction in which the scan line in the display panel extends, and the column direction may be a direction in which the data signal line in the display panel extends. The minimum repeating unit U includes the first light-emitting elements L1 of at least three different colors. The first pixel circuit PC1 is configured to drive the first light-emitting elements L1 to emit light. The minimum repeating unit U includes the first light-emitting elements L1 of three colors. In the minimum repeating unit U, the number and the arrangement mode of multiple first light-emitting elements L1 may be set according to practical situations, and are not limited herein. Examples will also be described hereinafter and repetition is not made herein. In an embodiment, the second display area A2 further includes second light-emitting elements L2, and the second pixel circuit PC2 is configured to drive the second light-emitting elements L2 to emit light. In an embodiment, referring to FIGS. 3 and 5, the display panel further includes a light-emitting element array layer. The light-emitting element array layer includes an anode layer 121, a light-emitting material layer 122 and a cathode layer 123. An anode of the first light-emitting element L1 and an anode of the second light-emitting element L2 are located in the anode layer 121. A light-emitting layer of the first light-emitting element L1 and a light-emitting layer of the second light-emitting element L2 are located in the light-emitting material layer 122. A cathode of the first light-emitting element L1 and a cathode of the second light-emitting element L2 are located in the cathode layer 123.

"In at least one minimum repeating unit U, at least two first light-emitting elements L1 of the same color may be electrically connected to the same first pixel circuit PC1", that is, one first pixel circuit PC1 may drive at least two first light-emitting elements L1 of the same color (referred to as a "one driving multiple"). The following cases may be included: the "one driving multiple" within the same minimum repeating unit U is included in the first display area A1, that is, in one minimum repeating unit U, at least two first light-emitting elements L1 of the same color is electrically connected to the same first pixel circuit PC1, e.g., two, more or all of the first light-emitting elements L1 of the same color within the same minimum repeating unit U are electrically connected to the same first pixel circuit PC1; the "one driving multiple" among two or more minimum repeating units U is included in the first display area A1, that is, among two or more minimum repeating units U, at least two first light-emitting elements L1 of the same color are electrically connected to the same first pixel circuit PC1, e.g., two, more or all of the first light-emitting elements L1 of the same color among two or more minimum repeating units U are electrically connected to the same first pixel circuit PC1; both the "one driving multiple" within the same minimum repeating unit U and the "one driving multiple" among two or more minimum repeating units U are included in the first display area A1. In this way, the number of first pixel circuits PC1 can be reduced. In an embodiment, referring to FIGS. 2 and 4, the first light-emitting elements L1 electrically connected to the same first pixel circuit PC1 are connected through a co-drive connection line W1 to achieve the electrical connection to the same first pixel circuit PC1.

The line type of the co-drive connection line W1 may also be set according to practical situations, which is not limited herein. In an embodiment, the co-drive connection line W1 may include a straight line (as shown in FIGS. 2 and 4). In the case where the co-drive connection line W1 includes the straight line, two first light-emitting elements L1 may be electrically connected to each other through a straight line segment (as shown in FIG. 4), and two first light-emitting elements L1 may also be electrically connected to each other through a co-drive connection line W1 (as shown in FIG. 2) composed of multiple straight line segments, that is, the co-drive connection line W1 is winding and does not overlap with an orthographic projection of another first light-emitting element L1 on a plane where the display panel is located. In this way, the co-drive connection line W1 and the anode may be arranged on the same layer. In an embodiment, the co-drive connection line W1 may also include a curve. In the case where the co-drive connection line W1 includes the curve, the diffraction degree when the external light bypasses the co-drive connection line W1 can be effectively reduced, thereby reducing the impact of the diffraction phenomenon on the optical performance of the optical elements.

In the case where any two co-drive connection lines W1 of co-drive connection lines W1 configured to electrically connect the light-emitting elements do not intersect, all of the co-drive connection lines W1 may be located in the same layer. In this way, the process of the display panel can be simplified, thereby reducing the cost. Alternatively, at least two of the co-drive connection lines W1 may be arranged in different layers. In this way, the distance between the co-drive connection lines W1 can be increased, thereby weakening the signal coupling between the co-drive connection lines W1. In the case where two co-drive connection lines W1 of the co-drive connection lines W1 configured to electrically connect the first light-emitting elements L1 intersect, the two intersected co-drive connection lines W1 are arranged in different layers. In this way, the short circuit can be avoided. In an embodiment, a co-drive connection line layer 131 may be separately arranged in the display panel to form the co-drive connection lines W1 (as shown in FIG. 5). The co-drive connection lines W1 may also be located in the original conductive layer of the display panel, for example, the co-drive connection lines W1 may be located in the anode layer (as shown in FIG. 3), the source/drain metal layer and the like. In an embodiment, the anode layer 121 may include at least two conductive layers, and the co-drive connection lines W1 are located in one of the conductive layers of the anode layer 121. In an embodiment, the anode layer 121 may include at least one first conductive layer and a second conductive layer. The material of the first conductive layer may include an indium tin oxide (ITO). The material of the second conductive layer may include a silver. The co-drive connection lines W1 may be located in one first conductive layer. In this way, one manufacture process can be reduced, facilitating reducing the cost of the display panel. Moreover, since the ITO is transparent, the co-drive connection lines W1 are arranged in one first conductive layer, causing that the co-drive connection lines W1 can be avoided from blocking the light, facilitating improving the transmittance of the first display area A1, and further improving the optical performance of the optical elements.

In the case where the first pixel circuits PC1 are arranged in the first display area A1, at least two first light-emitting elements L1 of at least one same color are electrically connected to the same first pixel circuit PC1 so that the number of first pixel circuits PC1 in the first display area A1 can be reduced, thereby reducing the area occupied by the first pixel circuits PC1 in the first display area A1, increasing the area ratio of the transparent area in the first display area A1, and increasing the transmittance of the first display area A1. Moreover, in the case where the "one driving multiple" in the first display area A1 is the "one driving multiple" within the minimum repeating unit U, the light-emitting spots in the entire minimum repeating unit U increase so that the definition of pixels in the minimum repeating unit U viewed by human eyes can be increased, thereby improving the display effect. In the case where the "one driving multiple" in the first display area A1 is the "one driving multiple" among at least two minimum repeating units U, the uniformity of the first display area A1 can be improved, thereby improving the display effect. The increase in the transmittance of the first display area A1 can improve the optical performance of the optical elements accommodated in the first display area A1, facilitating increasing the density of the first light-emitting elements L1 in the first display area A1 while satisfying the optical performance of the optical elements, thereby improving the display effect of the display panel.

In the display panel according to the embodiments of the present application, the first display area A1 is used as the optical element reservation area, and in the first display area A1, in at least one minimum repeating unit U, at least two first light-emitting elements L1 of at least one same color are electrically connected to the same first pixel circuit PC1. In this way, the first pixel circuits PC1 do not need to be in one-to-one correspondence with the first light-emitting elements L1, and the number of first pixel circuits PC1 is reduced, facilitating reducing the ratio of the non-transparent area in the first display area A1, solving the issue of low transmittance of the optical element reservation area, and improving the transmittance of the optical element reservation area.

In an embodiment, the first light-emitting elements L1 include red light-emitting elements, green light-emitting elements and blue light-emitting elements; the number of red light-emitting elements, the number of green light-emitting elements and the number of blue light-emitting elements are the same; the same first pixel circuit PC1 is electrically connected to n1 red light-emitting elements, the same first pixel circuit PC1 is electrically connected to n2 green light-emitting elements, and the same first pixel circuit PC1 is electrically connected to n3 blue light-emitting elements; and it may be set that n3>n1 and n3>n2, where n1, n2 and n3 are positive integers. The blue light-emitting element has the shortest life, the red light-emitting element has the longest life, and the green light-emitting element has a life between the life of the blue light-emitting element and the life of the red light-emitting element. Therefore, n3 is set to be the maximum, facilitating reducing the current density flowing through the blue light-emitting elements to a greater extent, further prolonging the life of the blue pixels to a greater extent and finally prolonging the life of the display panel. In an embodiment, n1=n2. Since the human eyes are most sensitive to green, such setting can ensure the display effect of the display panel in the human eyes.

In an embodiment, the first light-emitting elements L1 include red light-emitting elements, green light-emitting elements, and blue light-emitting elements; in the first display area A1, the same first pixel circuit PC1 is electrically connected to n4 red light-emitting elements, the same first pixel circuit PC1 is electrically connected to n4 green light-emitting elements, and the same first pixel circuit PC1 is electrically connected to n4 blue light-emitting elements; and the number of first pixel circuits PC1 electrically connected to the blue light-emitting elements may be set to be maximum, and n4 is an integer greater than 1. In this way, the current density flowing through the blue light-emitting elements can be reduced, thereby prolonging the life of the blue pixels to a greater extent, and finally prolonging the life of the display panel. In an embodiment, the number of first pixel circuits PC1 electrically connected to the red light-emitting elements is the same as the number of first pixel circuits PC1 electrically connected to the green light-emitting elements. Since the human eyes are most sensitive to green, such setting can ensure the display effect of the display panel in the human eyes.

For "In the same minimum repeating unit U, at least two first light-emitting elements L1 of the same color are electrically connected to the same first pixel circuit PC1", there may be multiple implementation modes that are described below in detail by means of examples but are not intended to limit the present application.

In an embodiment, as shown in FIGS. 2, 4, 15, 19 and 22, in the same minimum repeating unit U, at least two first light-emitting elements L1 of at least one same color are electrically connected to the same first pixel circuit PC1.

First light-emitting elements L1 of m colors are included in the same minimum repeating unit U. In the same minimum repeating unit U, first light-emitting elements L1 of m1 colors include at least two first light-emitting elements L1, where m is a positive integer greater than or equal to 3, and m1 is a positive integer greater than or equal to 1. For the first light-emitting elements L1 of m1 colors, among first light-emitting elements L1 of m2 colors, for first light-emitting elements L1 of each color, two, more or all of the first light-emitting elements L1 of the same color in the same minimum repeating unit U may be configured to be electrically connected to the same first pixel circuit PC1 (i.e., the "one driving multiple"); moreover, among first light-emitting elements L1 of m3 colors, the first light-emitting elements L1 are in one-to-one correspondence with the first pixel circuits PC1 (i.e., a "one driving one"), where m2+m3=m1, m2 is a positive integer greater than or equal to 1, and m3 is an integer greater than or equal to 0). Exemplarily, the same minimum repeating unit U includes the following first light-emitting elements L1 of three colors, red light-emitting elements, green light-emitting elements and blue light-emitting elements, and in the same minimum repeating unit U, the first light-emitting elements L1 of each color include at least two first light-emitting elements L1. Thus, one, two or three of cases described below may be included in the same minimum repeating unit U. First, two or more red light-emitting elements in the same minimum repeating unit U are electrically connected to the same first pixel circuit PC1. Second, two or more green light-emitting elements in the same minimum repeating unit U are electrically connected to the same first pixel circuit PC1. Third, two or more blue light-emitting elements in the same minimum repeating unit U are electrically connected to the same first pixel circuit PC1.

Compared with the case where first light-emitting elements L1 of the same color in multiple minimum repeating units U spaced apart are electrically connected to the same first pixel circuit PC1, the first light-emitting elements L1 of the same color in the same minimum repeating unit U are electrically connected to the same first pixel circuit PC1, facilitating reducing the design difficulty of a co-drive connection line W1 for electrically connecting the first light-emitting elements L1 to the first pixel circuit PC1, shortening the length of the co-drive connection line W1 and reducing the loss on the co-drive connection line W1.

The light-emitting elements of the same color electrically connected with the same first pixel circuit PC1 have the same light-emitting brightness. At least two first light-emitting elements L1 of the same color electrically connected to the same first pixel circuit PC1 belong to the same minimum repeating unit U, so that the distance between the at least two first light-emitting elements L1 of the same color can be closer, the sawtooth is not prone to occur during the display, and it is facilitated that the display effect is improved.

In an embodiment, as shown in FIGS. 8 to 12, 16, 20, 23 and 26, among at least two minimum repeating units U, at least two first light-emitting elements L1 of at least one same color are electrically connected to the same first pixel circuit PC1.

The same first pixel circuit PC1 crosses at least two minimum repeating units U to carry out the "one driving multiple", so that the same first pixel circuit PC1 can drive more first light-emitting elements L1, facilitating reducing the number of first pixel circuits PC1, thereby increasing the ratio of the transparent area in the first display area A1. Moreover, the first pixel circuit PC1 crosses at least two minimum repeating units U to carry out the "one driving multiple" so that which first light-emitting elements L1 driven by the same first pixel circuit PC1 can be flexibly configured.

In an embodiment, as shown in FIGS. 8 to 10, 16, 20, 23 and 26, among at least two adjacent minimum repeating units U in a row direction X or a column direction Y, at least two first light-emitting elements L1 of at least one same color are electrically connected to the same first pixel circuit PC1.

The at least two adjacent minimum repeating units U in the row direction X or the column direction Y described here refer to at least two minimum repeating units U arranged in sequence in the row direction X or the column direction Y.

Compared with the case where the same first pixel circuit PC1 carries out the "one driving multiple" among multiple minimum repeating units U that are far away from each other or irregularly dispersed, that the first pixel circuit PC1 carries out the "one driving multiple" among at least two adjacent minimum repeating units U in the row direction X or in the column direction Y facilitates reducing the design difficulty of the co-drive connection line W1 for electrically connecting the first light-emitting elements L1 to the first pixel circuit PC1, shortens the length of the co-drive connection line W1 and reduces the loss on the co-drive connection line W1. Moreover, the distance among the multiple first light-emitting elements L1 electrically connecting to the same first pixel circuit PC1 can be made closer, and the sawtooth is not prone to occur during the display, improving display effect.

The number of minimum repeating units U involved by the first light-emitting elements L1 electrically connected to the same first pixel circuit PC1 and whether the minimum repeating units U are arranged in sequence in the row direction X or in the column direction Y may be set according to practical situations, and are not limited herein.

Figure 12:
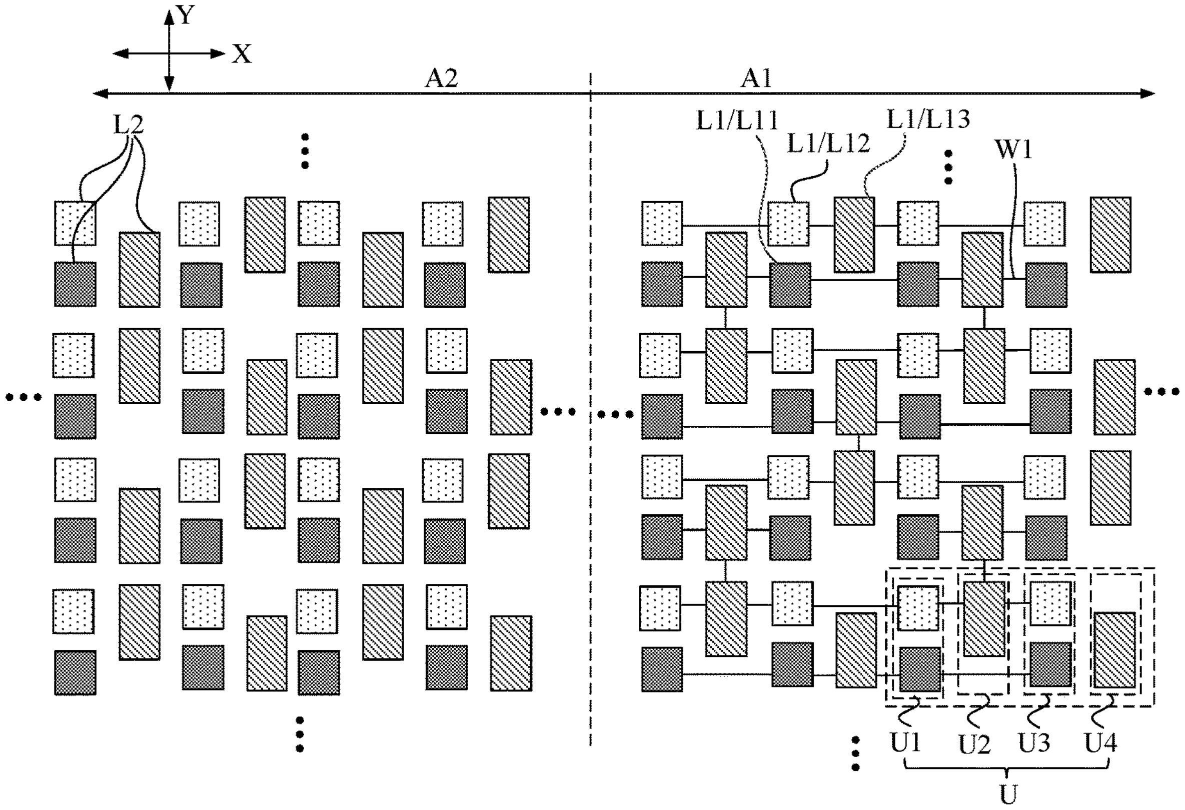
FIG. 12 is a diagram illustrating the structure of another region Q according to an embodiment of the present application.

In an embodiment, as shown in FIG. 12, among M*N minimum repeating units U in at least M rows and N columns, at least two first light-emitting elements L1 of at least one same color are electrically connected to the same first pixel circuit PC1, and M and N are both positive integers greater than or equal to 2.

M*N minimum repeating units U in M rows and N columns refer to that N minimum repeating units U in each row are adjacent in the row direction X, and M minimum repeating units U in each row are adjacent in the column direction Y. In this way, the M*N minimum repeating units U in M rows and N columns are arranged compactly and regularly.

The minimum repeating units U involved by the same first pixel circuit PC1 for carrying out the "one driving multiple" are enlarged to at least M*N minimum repeating units U in M rows and N columns, so that more choices can be made when which first light-emitting elements L1 are driven by the same first pixel circuit PC1 is designed, facilitating reducing the design difficulty. Moreover, compared with the case where the same first pixel circuit PC1 carries out the "one driving multiple" among multiple minimum repeating units U that are far away from each other or irregularly dispersed, that the first light-emitting elements L1 driven by the same first pixel circuit PC1 are assigned among the M*N minimum repeating units U arranged compactly and regularly facilitates reducing the design difficulty of the co-drive connection line W1 for electrically connecting the first light-emitting elements L1 to the first pixel circuit PC1, shortens the length of the co-drive connection line W1 and reduces the loss on the co-drive connection line W1. Moreover, the distance between the multiple first light-emitting elements L1 electrically connecting to the same first pixel circuit PC1 can be closer, and the sawtooth is not prone to occur during the display, improving display effect.

The values of M and N may be set according to practical situations, and are not limited herein.

In an embodiment, as shown in FIG. 2, 4, 15, 19 or 22, in the same minimum repeating unit U, all of the first light-emitting elements L1 of the same color are electrically connected to the same first pixel circuit PC1.

With such arrangement, the number of first pixel circuits PC1 can be reduced, thereby improving the transmittance of the first display area A1. Moreover, the distance between the multiple first light-emitting elements L1 electrically connecting to the same first pixel circuit PC1 can be closer, the connection loss can be reduced, and the occurrence of the sawtooth can be avoided, improving the display effect.

In an embodiment, as shown in FIGS. 8 to 10, 16, 20 and 23, among the at least two minimum repeating unit U, all of the first light-emitting elements L1 of the same color are electrically connected to the same first pixel circuit PC1.

With such arrangement, the number of first pixel circuits PC1 can be further reduced, thereby improving the transmittance of the first display area A1.

On the basis of the preceding technical schemes, in an embodiment, at least one first pixel circuit PC1 is located in the second display area A2. In this way, at least one first pixel circuit PC1 originally arranged in the first display area A1 is transferred to the second display area A2, and thus the position where the at least one first pixel circuit PC1 is originally arranged becomes the transparent area, increasing the area ratio of the transparent area in the first display area A1 and increasing the transmittance of the first display area A1.

In an embodiment, as shown in FIG. 13, 14, 17, 21, 24 or 27, at least one first pixel circuit PC1 is located in the first display area A1.

In an embodiment, as shown in FIG. 13, 14, 17, 21, 24 or 27, the first display area A1 includes at least one first aggregation area JJ, at least part of first pixel circuits PC1 is located in the first aggregation area JJ, and at least three first pixel circuits PC1 in compact proximity are arranged in the first aggregation area JJ. The first light-emitting elements L1 electrically connected to the first pixel circuits PC1 and arranged in the first aggregation area JJ are arranged at an outer periphery of the first aggregation area JJ.

In a direction perpendicular to the plane where the display panel is located, the first light-emitting elements L1 arranged at the outer periphery of the first aggregation area JJ partially overlap with the first aggregation area JJ corresponding to the first light-emitting elements L1 or the first light-emitting elements L1 arranged at the outer periphery of the first aggregation area JJ partially do not overlap with the first aggregation area JJ corresponding to the first light-emitting elements L1, which are not limited herein.

Since the first pixel circuits PC1 are not arranged in an area in addition to the first aggregation area JJ in the first display area A1, the diffraction caused by gaps existing in metal structures in the first pixel circuits PC1 does not exist in the corresponding area. Moreover, the first pixel circuits PC1 are arranged centrally in the first aggregation area JJ, that is, metal structures in the first pixel circuits PC1 are arranged compactly, so that the diffraction caused by gaps existing in metal structures in the first pixel circuits PC1 can also be improved.

In an embodiment, the display panel includes a substrate, a pixel circuit layer and a light blocking layer. The pixel circuit PC is located in the pixel circuit layer. The light blocking layer is located on a side of the pixel circuit layer facing away from the substrate. The light blocking layer includes multiple light blocking portions. An orthographic projection of the first aggregation area JJ on the plane where the display panel is located is within an orthographic projection of the light blocking portion on the plane where the display panel is located. In this way, the light blocking portion can block the pixel circuit PC and some metal wirings (such as the scan lines and the data lines) in the first aggregation area JJ to avoid the occurrence of the diffraction when the external light passes through the gaps between the metal structures or the metal wirings in the first pixel circuit PC1, facilitating improving the performance of the optical elements.

The material of the light blocking layer and the relative position relationship between the light blocking layer and other films in the display panel may be set according to practical situations, and are not limited herein. In an embodiment, the anode layer includes at least one first conductive layer and the second conductive layer. The material of the first conductive layer may include the ITO. The material of the second conductive layer may include the silver. The light blocking layer and the second conductive layer may be arranged in the same layer. In this way, one process can be saved, facilitating reducing the cost of the display panel.

In an embodiment, the light blocking portion is in the shape of a circle or an ellipse. In the case where a contour line of the light blocking portion includes a straight line edge (e.g., the light blocking portion is in the shape of a rectangle), the diffraction is likely to occur when the external light bypasses the light blocking portion and irradiates the optical elements. Therefore, the contour line of the light blocking portion is set to be a curved edge, the problem of the diffraction can be effectively improved, thereby improving the optical performance of the optical elements.

In an embodiment, as shown in FIG. 13, 14, 17, 21, 24 or 27, the first pixel circuits PC1 in the same first aggregation area JJ are arranged in rows and/or columns.

In the first aggregation area JJ, the first pixel circuits PC1 are regularly arranged in rows or columns, facilitating reducing the design difficulty of the mask required in the process of manufacturing the display panel and facilitating compactly arranging the first pixel circuits PC1 so that the area of the first aggregation area JJ can be reduced. In this way, when the light blocking layer is arranged, the area of the light blocking portion can be reduced, thereby increasing the transmittance of the first display area A1.

Figure 25:
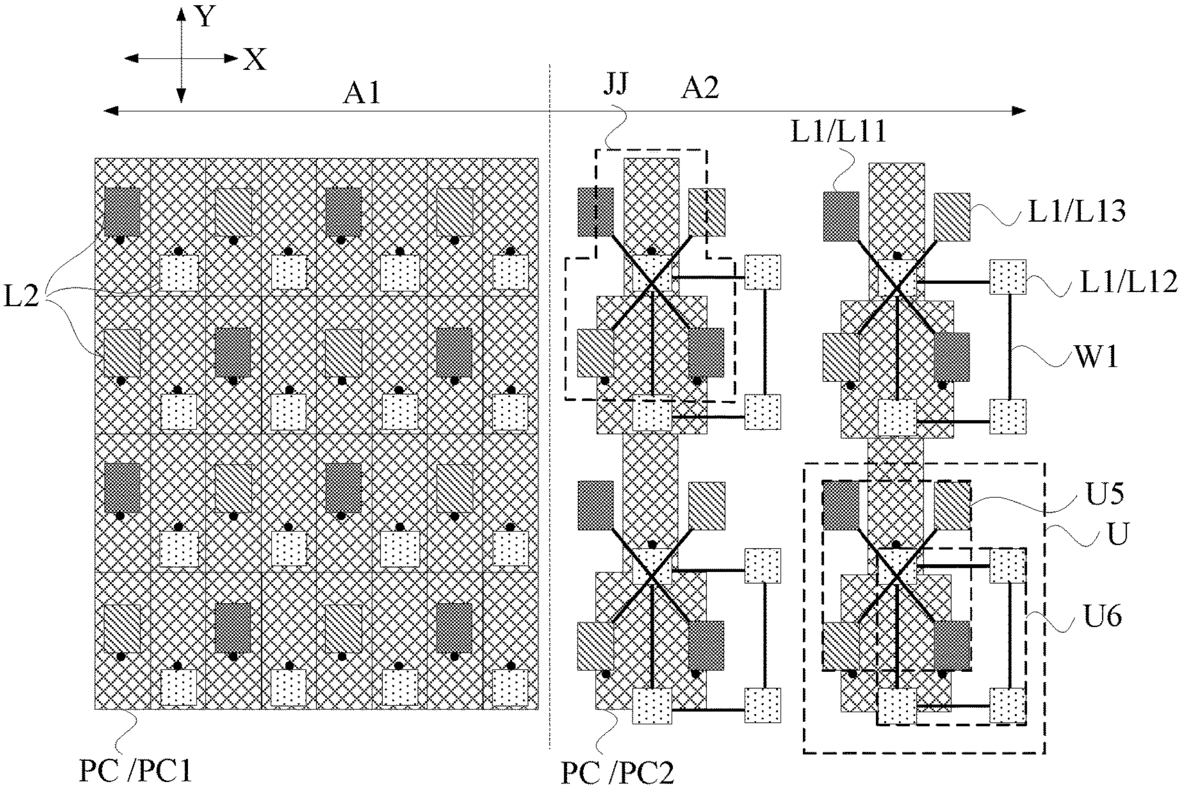
FIG. 25 is a diagram illustrating the structure of another region Q according to an embodiment of the present application.

In an embodiment, as shown in FIG. 25, the second pixel circuit PC2 and the first pixel circuit PC1 in the first aggregation area JJ are in the same row direction X.

In an embodiment, as shown in FIGS. 25, and 30 to 37, the first pixel circuit PC1 and the second pixel circuit PC2 are in the same row direction.

The first pixel circuit PC1 and the second pixel circuit PC2 located in the same row may be electrically connected to the same metal wire (such as the scan line) extending in the row direction X, do not need to be connected to two metal wires respectively, and do not need to be connected to the same metal wire through winding. In this way, the number of metal wires passing through the first display area A1 can be reduced or the length of the metal wires passing through the first display area A1 can be shortened, thereby increasing the transmittance of the first display area A1, and improving the optical performance of the optical elements.

In an embodiment, as shown in FIG. 13, 14, 18, 21, 24 or 27, the second pixel circuits PC2 and the first pixel circuits PC1 in the first aggregation area JJ are arranged in staggered rows.

In an embodiment, as shown in FIG. 13, 14, 17, 18, 21, 24, 27, 28 or 29, the first pixel circuits PC1 and the second pixel circuits PC2 are arranged in staggered rows.

The first pixel circuits PC1 and the second pixel circuits PC2 are arranged in staggered rows, facilitating flexibly arranging positions of the first pixel circuits PC1 so that the first pixel circuits PC1 are compactly arranged, and the first light-emitting elements L1 electrically connected to the first pixel circuits PC1 arranged in the first aggregation area JJ are facilitated being arranged at the outer periphery of the first aggregation area JJ.

The driving mode corresponding to the "one driving multiple" and the arrangement mode of the first pixel circuits PC1, especially the arrangement that the first pixel circuits PC1 are aggregated in the first aggregation area JJ, are applicable to any pixel arrangement and the pixel arrangement is described below in detail by way of examples, which are not intended to limit the present application.

Figure 8:
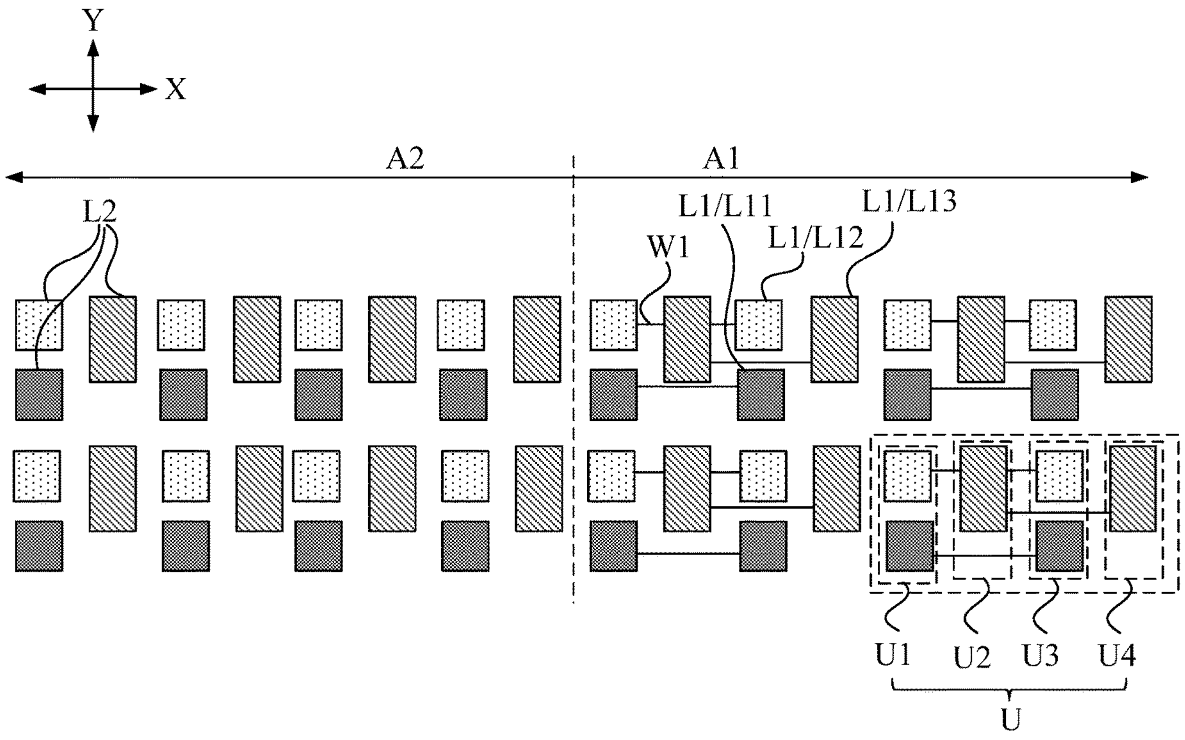
FIG. 8 is a diagram illustrating the structure of another region Q according to an embodiment of the present application.
Figure 9:
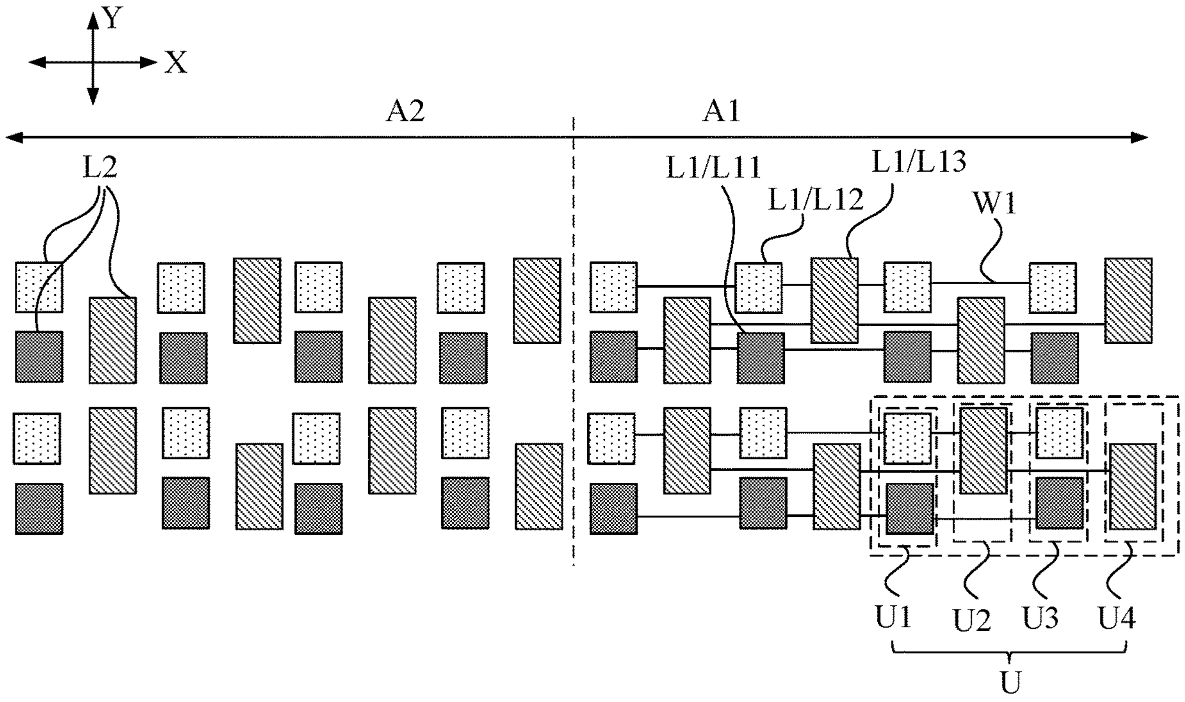
FIG. 9 is a diagram illustrating the structure of another region Q according to an embodiment of the present application.
Figure 10:
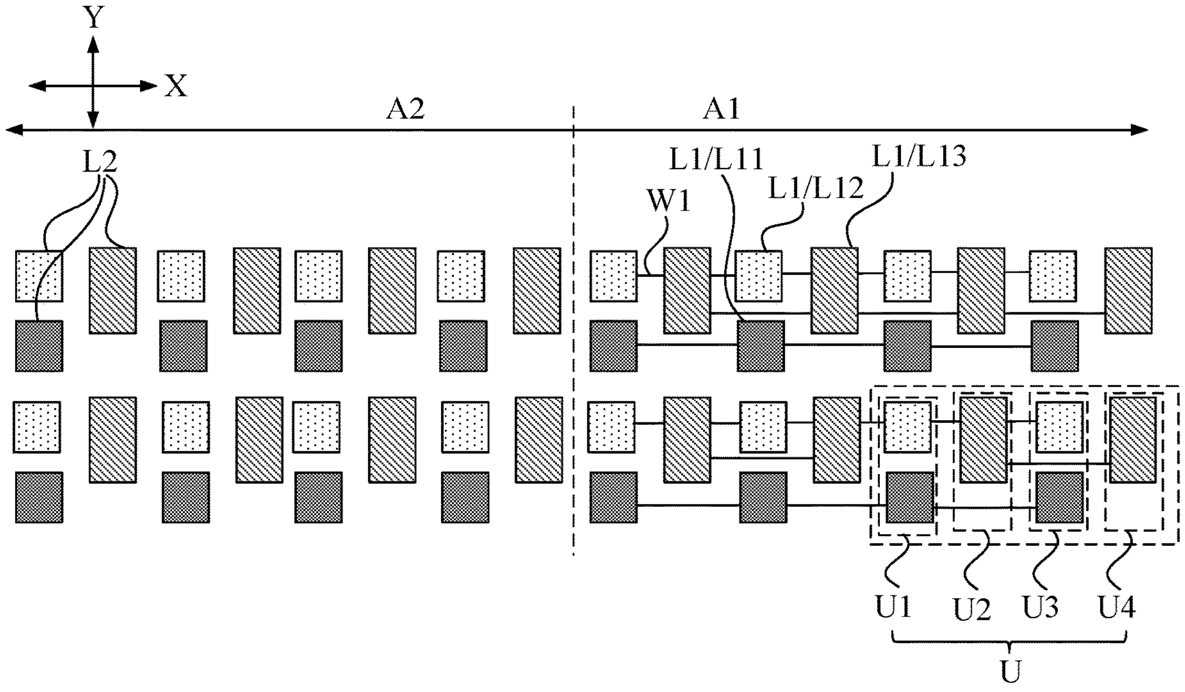
FIG. 10 is a diagram illustrating the structure of a region Q according to an embodiment of the present application.
Figure 11:
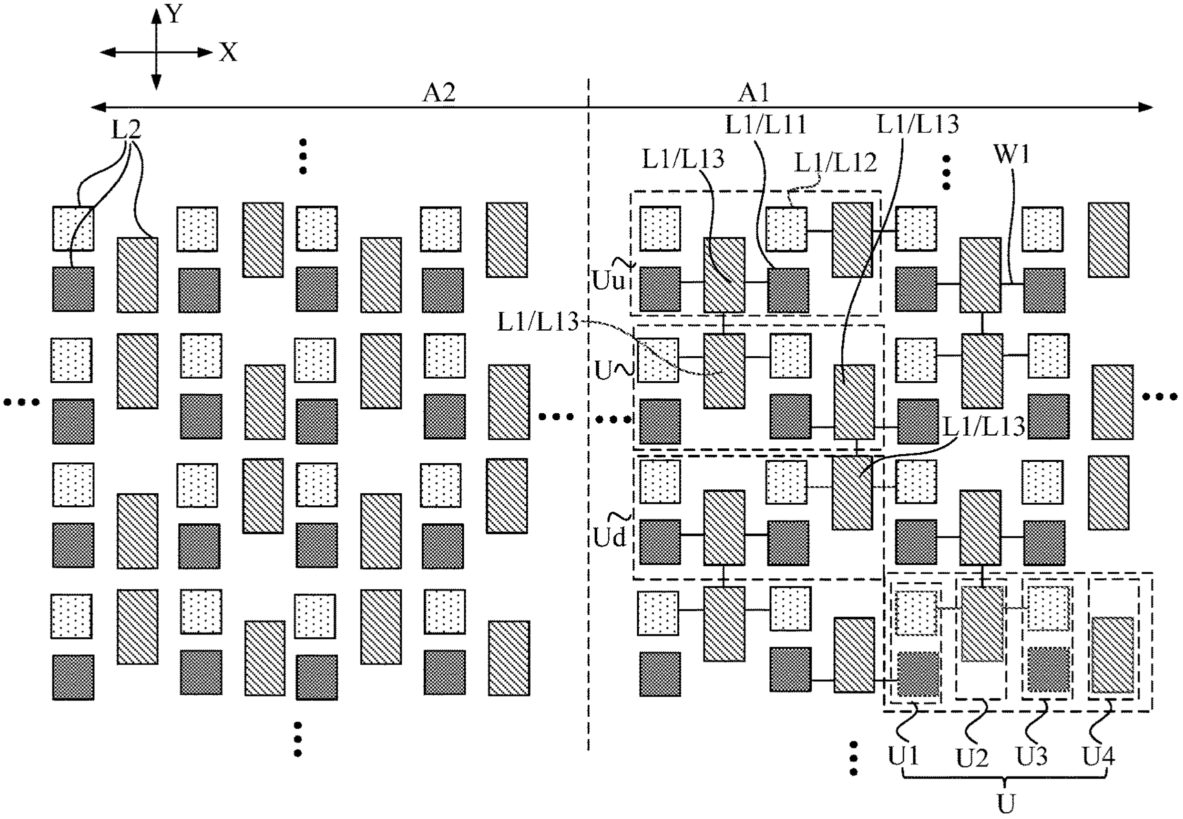
FIG. 11 is a diagram illustrating the structure of another region Q according to an embodiment of the present application.

Exemplarily, FIG. 8 is a diagram illustrating the structure of another region Q according to an embodiment of the present application. FIG. 9 is a diagram illustrating the structure of another region Q according to the present application. FIG. 10 is a diagram illustrating the structure of a region Q according to the present application. FIG. 11 is a diagram illustrating the structure of another region Q according to the present application. FIG. 12 is a diagram illustrating the structure of another region Q according to the present application. FIGS. 2, 4, 9, 11 and 12 show the same pixel arrangement mode, but the implementation modes of "one driving multiple" are different. FIGS. 8 and 10 show another same pixel arrangement mode, but the implementation modes of "one driving multiple" are different. In an embodiment, referring to FIGS. 2, 4, 7 to 12, the minimum repeating unit U includes a first light-emitting element column U1, a second light-emitting element column U2, a third light-emitting element column U3, and a fourth light-emitting element column U4 arranged in the row direction X. The arrangement mode of the first light-emitting element column U1 is the same as the arrangement mode of the third light-emitting element column U3. The first light-emitting element column U1 and the third light-emitting element column U3 each include one light-emitting element L12 of a second color and one light-emitting element L11 of a first color arranged in the column direction Y. The second light-emitting element column U2 and the fourth light-emitting element column U4 each include one light-emitting element L13 of a third color.

The light-emitting color of the light-emitting element L11 of the first color, the light-emitting color of the light-emitting element L12 of the second color and the light-emitting color of the light-emitting element L13 of the third color can be set according to practical situations, and are not limited herein. In an embodiment, the light-emitting element L11 of the first color includes the red light-emitting element, the light-emitting element L12 of the second color includes the green light-emitting element, and the light-emitting element L13 of the third color includes the blue light-emitting element; or the light-emitting element L11 of the first color includes the green light-emitting element, the light-emitting element L12 of the second color includes the red light-emitting element, and the light-emitting element L13 of the third color includes the blue light-emitting element.

In an embodiment, in the same minimum repeating unit U, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1, the better the transmittance of the first display area A1.

In an embodiment, referring to FIGS. 2, 4, 9, 11 and 12, one light-emitting element L13 of the third color in the second light-emitting element column U2 and one light-emitting element L13 of the third color in the fourth light-emitting element column U4 are arranged in a misaligned mode in the row direction X.

In the first display area A1, the arrangement mode of the first light-emitting elements L1 is "x arrangement". In the "x arrangement", the red light-emitting element has the smallest area, and the green light-emitting element has a smaller area than the blue light-emitting element; in the row direction X, a spacing between the blue light-emitting element and the green light-emitting element is equal to a spacing between the blue light-emitting element and the red light-emitting element; and in the column direction Y, a spacing between two adjacent blue light-emitting elements is smaller than a spacing between the blue light-emitting element and the red light-emitting element that are adjacent to each other. The preceding spacing refers to a distance between edges of openings on a pixel definition layer.

The light-emitting element L13 of the third color in the second light-emitting element column U2 and the light-emitting element L13 of the third color in the fourth light-emitting element column U4 are arranged in a misaligned mode in the row direction X so that in the process of manufacturing the light-emitting element L13 of the third color, two light-emitting elements L13 of the third color closer to each other in the column direction Y can be vaporized through the same opening on the mask. In this way, the size of the opening can be increased and the manufacturing difficulty and the cost of the mask can be reduced.

In an embodiment, referring to FIGS. 9 and 10, among at least two adjacent minimum repeating units U in the row direction X or the column direction Y, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The smaller the number of first pixel circuits PC1, the better the transmittance of the first display area A1.

As shown in FIG. 11, a minimum repeating unit Uu, a minimum repeating unit U, and a minimum repeating unit Ud are arranged in the column direction. One light-emitting element L13 of the third color in two light-emitting elements L13 of the third color marked in the minimum repeating unit U and one light-emitting element L13 of the third color marked in the minimum repeating unit Uu are electrically connected to the same first pixel circuit, and the one light-emitting element L13 of the third color located in the minimum repeating unit U and the one light-emitting element L13 of the third color located in the minimum repeating unit Uu that are electrically connected to the first pixel circuit are arranged in the column direction; and simultaneously, another light-emitting element L13 of the third color in the two light-emitting elements L13 of the third color marked in the minimum repeating unit U and one light-emitting element L13 of the third color marked in the minimum repeating unit Ud are electrically connected to the same first pixel circuit, and the another light-emitting element L13 of the third color located in the minimum repeating unit U and the one light-emitting element L13 of the third color located in the minimum repeating unit Ud that are electrically connected to the first pixel circuit are arranged in the column direction.

In an embodiment, referring to FIG. 11, in the column direction Y, a light-emitting element L13 of the third color and a light-emitting element L13 of the third color closest to this light-emitting element L13 of the third color are electrically connected to the same first pixel circuit PC1.

In the column direction, if two light-emitting elements L13 of the third color are arranged on one side and another side of one light-emitting element L13 of the third color separately, and a spacing between the one light-emitting element L13 of the third color and one of the two light-emitting elements L13 of the third color is different from a spacing between the one light-emitting element L13 of the third color and another one of the two light-emitting elements L13 of the third color. This light-emitting element L13 of the third color and the light-emitting element L13 of the third color having a smaller spacing from this light-emitting element L13 of the third color are electrically connected to the same first pixel circuit PC1. The spacing described here refers to the distance between edges of openings on the pixel definition layer. For example, as shown in FIG. 11, in the column direction, the light-emitting element L13 of the third color located in the minimum repeating unit Uu is electrically connected to the light-emitting element L13 of the third color located in the minimum repeating unit U. and the light-emitting element L13 of the third color located in the minimum repeating unit U is electrically connected to light-emitting element L13 of the third color located in the minimum repeating unit Ud.

The two light-emitting elements L13 of the third color electrically connected to the same first pixel circuit PC1 are closer to each other so that the sawtooth is not prone to occur during the display, and the co-drive connection line W1 between the two light-emitting elements L13 of the third color can be shorter, facilitating reducing the loss on the co-drive connection line W1.

In an embodiment, referring to FIG. 12, in the minimum repeating units U in two adjacent rows and two columns, in the row direction X, all of the light-emitting elements L11 of the first color are electrically connected to the same first pixel circuit PC1, and all of the light-emitting elements L12 of the second color are electrically connected to the same first pixel circuit PC1; and in the column direction Y, two light-emitting elements L13 of the third color closer to each other are electrically connected to the same first pixel circuit PC1. In this way, for the light-emitting elements L11 of the first color and the light-emitting elements L12 of the second color, the first pixel circuit PC1 carries out a "one driving four" mode so that the number of first pixel circuits PC1 can be effectively reduced, thereby improving the transmittance of the first display area A1. Moreover, the two light-emitting elements L13 of the third color electrically connected to the same first pixel circuit PC1 are closer to each other so that the sawtooth is not prone to occur during the display, and the co-drive connection line W1 between the two light-emitting elements L13 of the third color can be shorter, facilitating reducing the loss on the co-drive connection line W1.

Figure 13:
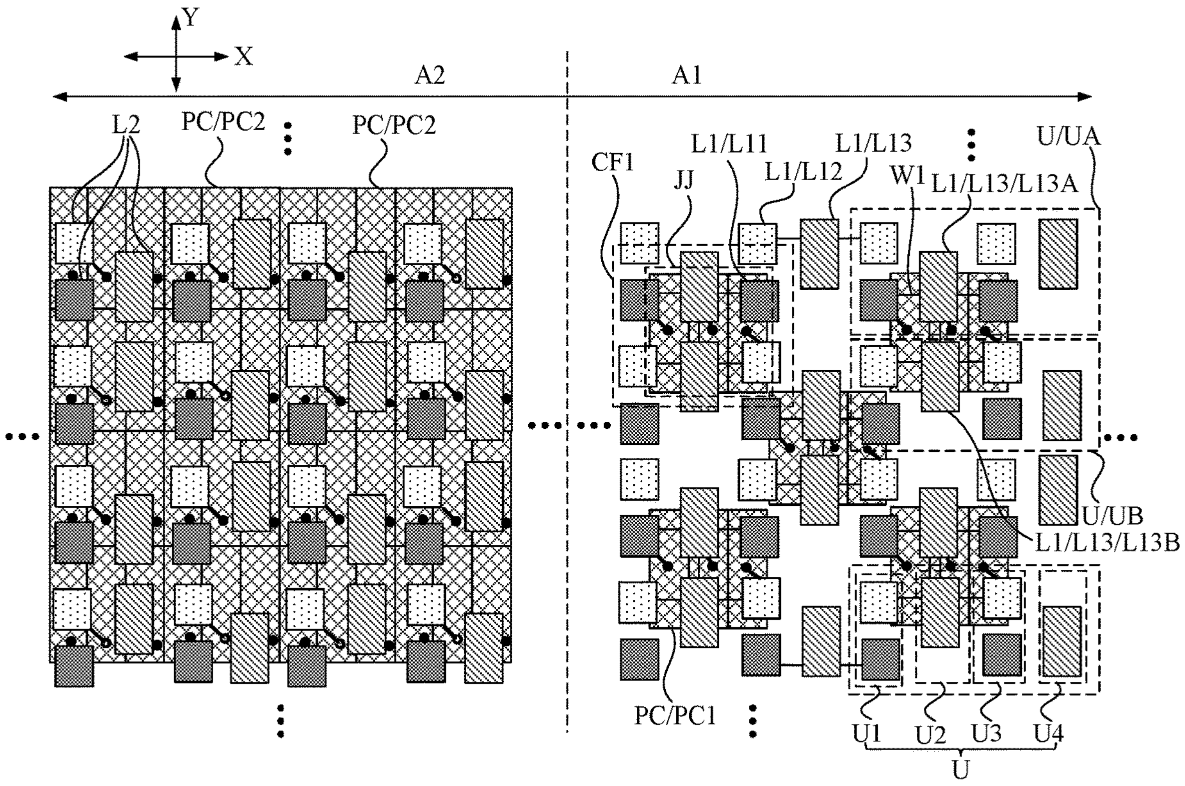
FIG. 13 is a diagram illustrating the structure of another region Q according to an embodiment of the present application.
Figure 14:
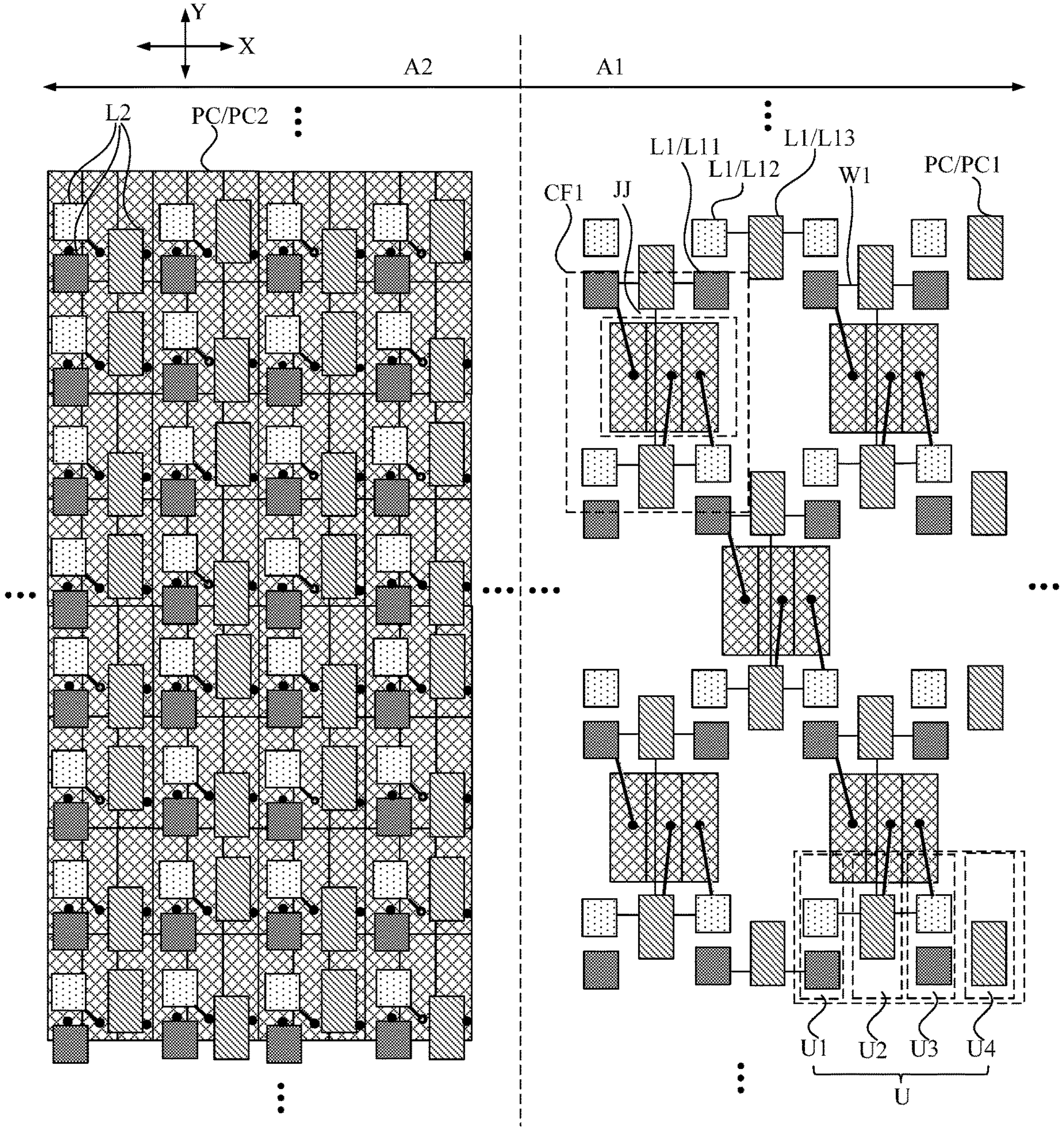
FIG. 14 is a diagram illustrating the structure of a region Q according to an embodiment of the present application.

Exemplarily, FIG. 13 is a diagram illustrating the structure of another region Q according to an embodiment of the present application. FIG. 14 is a diagram illustrating the structure of a region Q according to an embodiment of the present application. In FIGS. 13 and 14, the arrangement mode of the first light-emitting elements L1 is the "x arrangement" but the implementation modes of the "one driving multiple" is same as that in FIG. 11. In an embodiment, referring to FIGS. 13 and 14, the two light-emitting elements L13 of the third color electrically connected to the same first pixel circuit PC1 are a first sub-color light-emitting element L13A and a second sub-color light-emitting element L13B separately. The first sub-color light-emitting element L13A belongs to a first minimum repeating unit UA and the second sub-color light-emitting element L13B belongs to a second minimum repeating unit UB. The first sub-color light-emitting element L13A, two light-emitting elements L11 of the first color adjacent to the first sub-color light-emitting element L13A in the row direction X in the first minimum repeating unit UA, the second sub-color light-emitting element L13B, and two light-emitting elements L12 of the second color adjacent to the second sub-color light-emitting element L13B in the row direction X in the second minimum repeating unit UB constitute a first repeating unit CF1. First pixel circuits PC1 to which the first repeating unit CF1 is electrically connected are aggregated in a first aggregation area JJ, and multiple first light-emitting elements L1 in the first repeating unit CF1 are arranged at an outer periphery of the first aggregation area JJ.

When multiple first light-emitting elements L1 are driven by the same first pixel circuit PC1, this first pixel circuit PC1 may be directly connected to any one of the first light-emitting elements L1 driven by this first pixel circuit PC1 through an anode connection line. The manner of arranging the anode connection line may be the nearest connection. In this way, the anode connection line can be ensured to be shorter and the loss of the signal on the anode connection line can be reduced.

Three first pixel circuits PC1 carrying out a "one driving two" mode are aggregated in the first aggregation area JJ corresponding to the first repeating unit CF1, one first pixel circuit PC1 may be directly electrically connected to any one of two first light-emitting elements L1 driven by the first pixel circuit PC1, and the three first pixel circuits PC1 may be arranged at any position in the first aggregation area JJ. All of the first light-emitting elements L1 in the first repeating unit CF1 are arranged at the outer periphery of the first aggregation area JJ. The first aggregation area JJ is arranged inside the first repeating unit CF1, and may overlap with the partial area of the first light-emitting elements L1 close to the first aggregation area JJ (as shown in FIG. 13) or may not overlap with the first light-emitting elements L1 at all (as shown in FIG. 14).

The three first pixel circuits PC1 to which the first repeating unit CF1 is electrically connected are aggregated in the first aggregation area JJ, facilitating improving the diffraction caused by the structure of the first pixel circuits PC1, thereby facilitating reducing the diffraction degree of the first display area A1. Moreover, multiple first light-emitting elements L1 in the first repeating unit CF1 are arranged at the outer periphery of the first aggregation area JJ so that the multiple first light-emitting elements L1 in the first repeating unit CF1 are in the state of approximately surrounding the first aggregation area JJ, facilitating the electrical connection between the first pixel circuit PC1 and the first light-emitting element L1 directly electrically connected to the first pixel circuit PC1 through the anode connection line W2, and facilitating reducing the design difficulty of the anode connection line W2.

Figure 15:
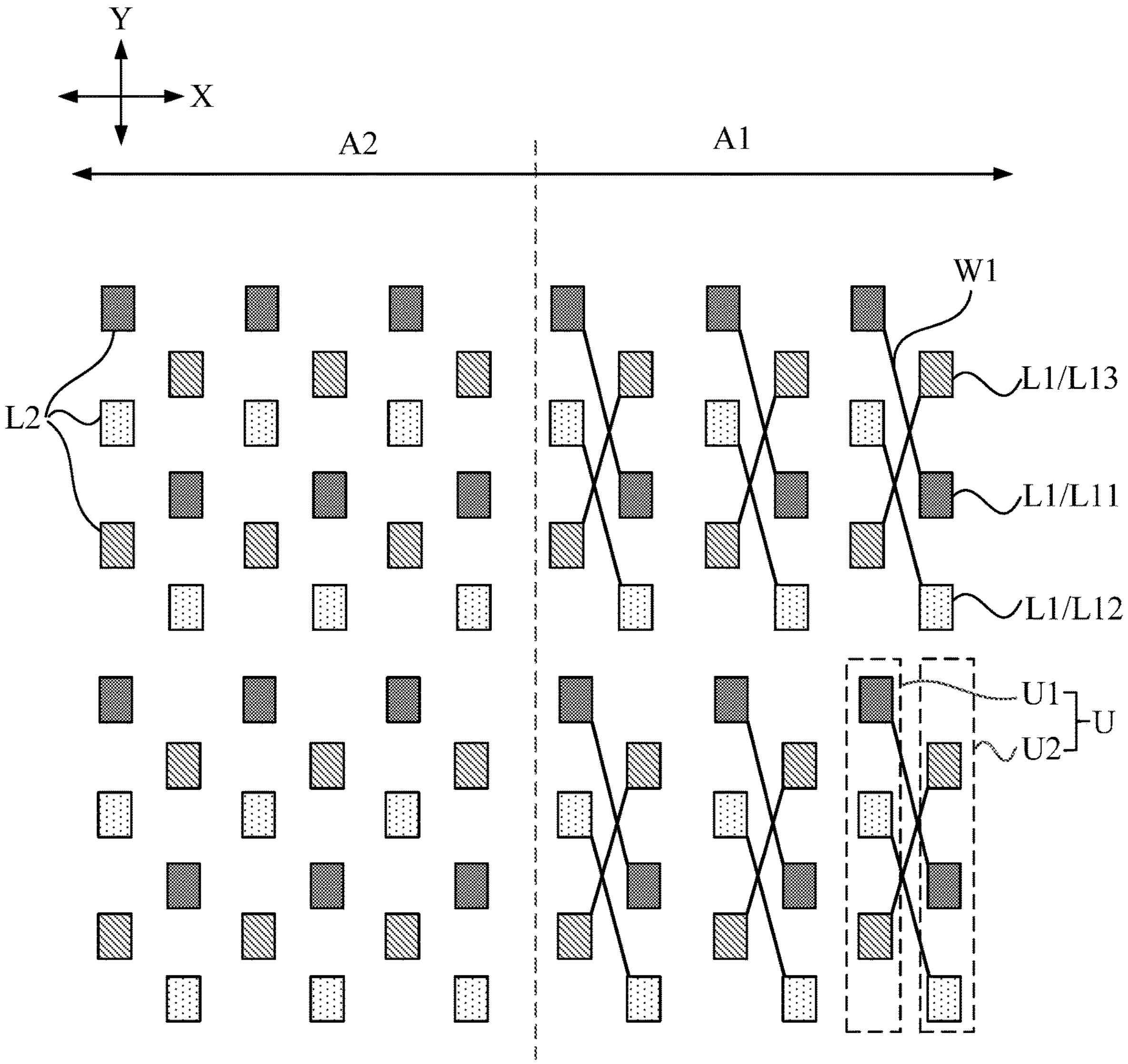
FIG. 15 is a diagram illustrating the structure of another region Q according to an embodiment of the present application.
Figure 16:
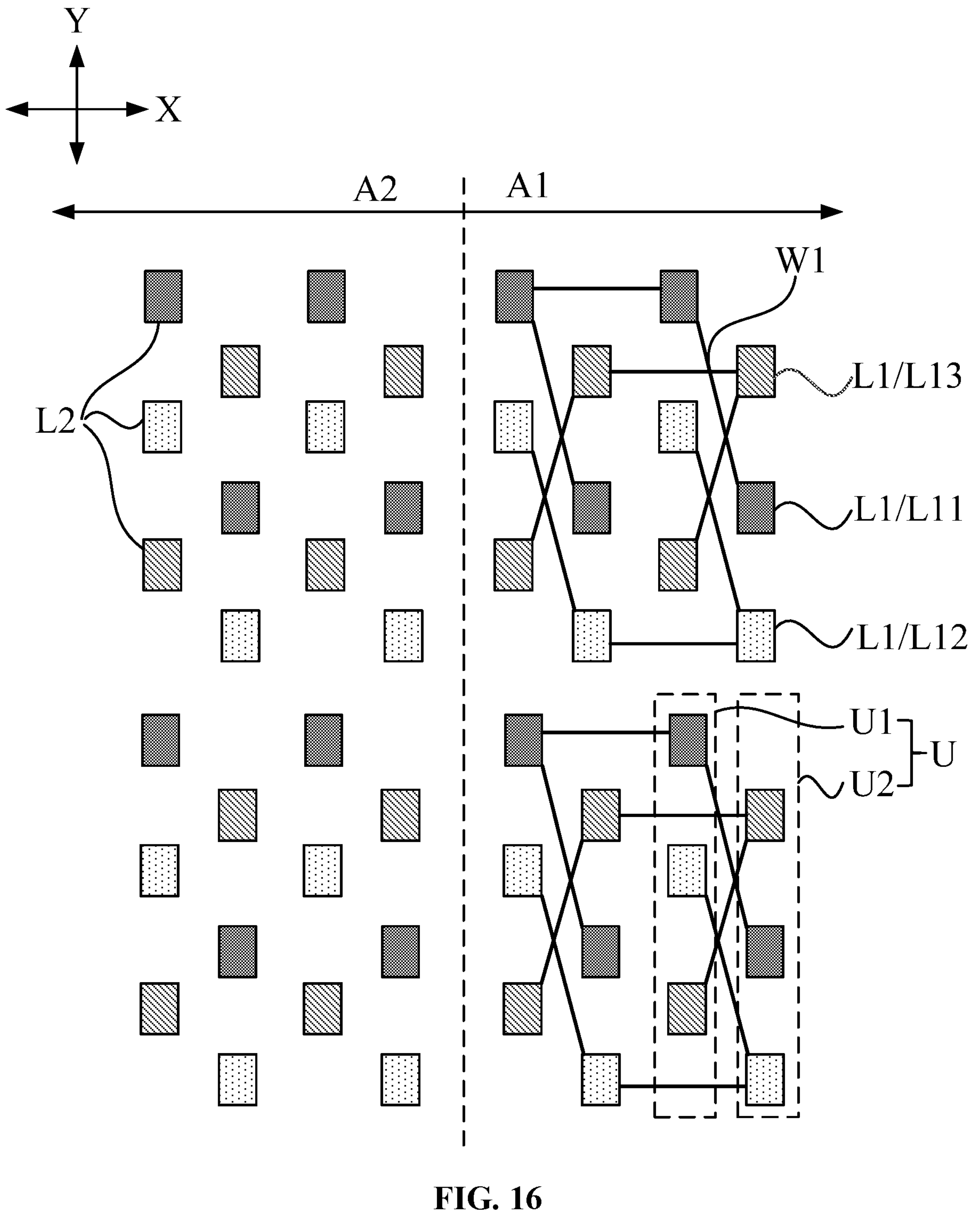
FIG. 16 is a diagram illustrating the structure of another region Q according to an embodiment of the present application.

Exemplarily, FIG. 15 is a diagram illustrating the structure of another region Q according to an embodiment of the present application. FIG. 16 is a diagram illustrating the structure of another region Q according to an embodiment of the present application. FIGS. 15 and 16 show the same pixel arrangement mode, but the implementation modes of "one driving multiple" are different. In an embodiment, referring to FIGS. 15 and 16, the minimum repeating unit U includes a first light-emitting element column U1 and a second light-emitting element column U2 arranged in the row direction X. The first light-emitting element column U1 includes one light-emitting element L11 of the first color, one light-emitting element L12 of the second color and one light-emitting element L13 of the third color arranged in sequence in the column direction Y. The second light-emitting element column U2 includes one light-emitting element L13 of the third color, one light-emitting element L11 of the first color, and one light-emitting element L12 of the second color arranged in sequence in the column direction Y. The first light-emitting element column U1 and the second light-emitting element column U2 are arranged in a misaligned mode in the row direction X.

In the first display area A1, the arrangement mode of the first light-emitting elements L1 is "YYG arrangement". The light-emitting color of the light-emitting element L11 of the first color, the light-emitting color of the light-emitting element L12 of the second color and the light-emitting color of the light-emitting element L13 of the third color may be set according to practical situations, and are not limited herein. In an embodiment, the light-emitting element L11 of the first color includes the red light-emitting element, the light-emitting element L12 of the second color includes the green light-emitting element, and the light-emitting element L13 of the third color includes the blue light-emitting element.

In an embodiment, in the same minimum repeating unit U, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1.

In an embodiment, referring to FIG. 16, among at least two adjacent minimum repeating units U in the row direction X or the column direction Y, at least two first light-emitting elements L1 of at least one same color are electrically connected to the same first pixel circuit PC1. In other words, in the same minimum repeating unit U, there are the first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1.

Figure 17:
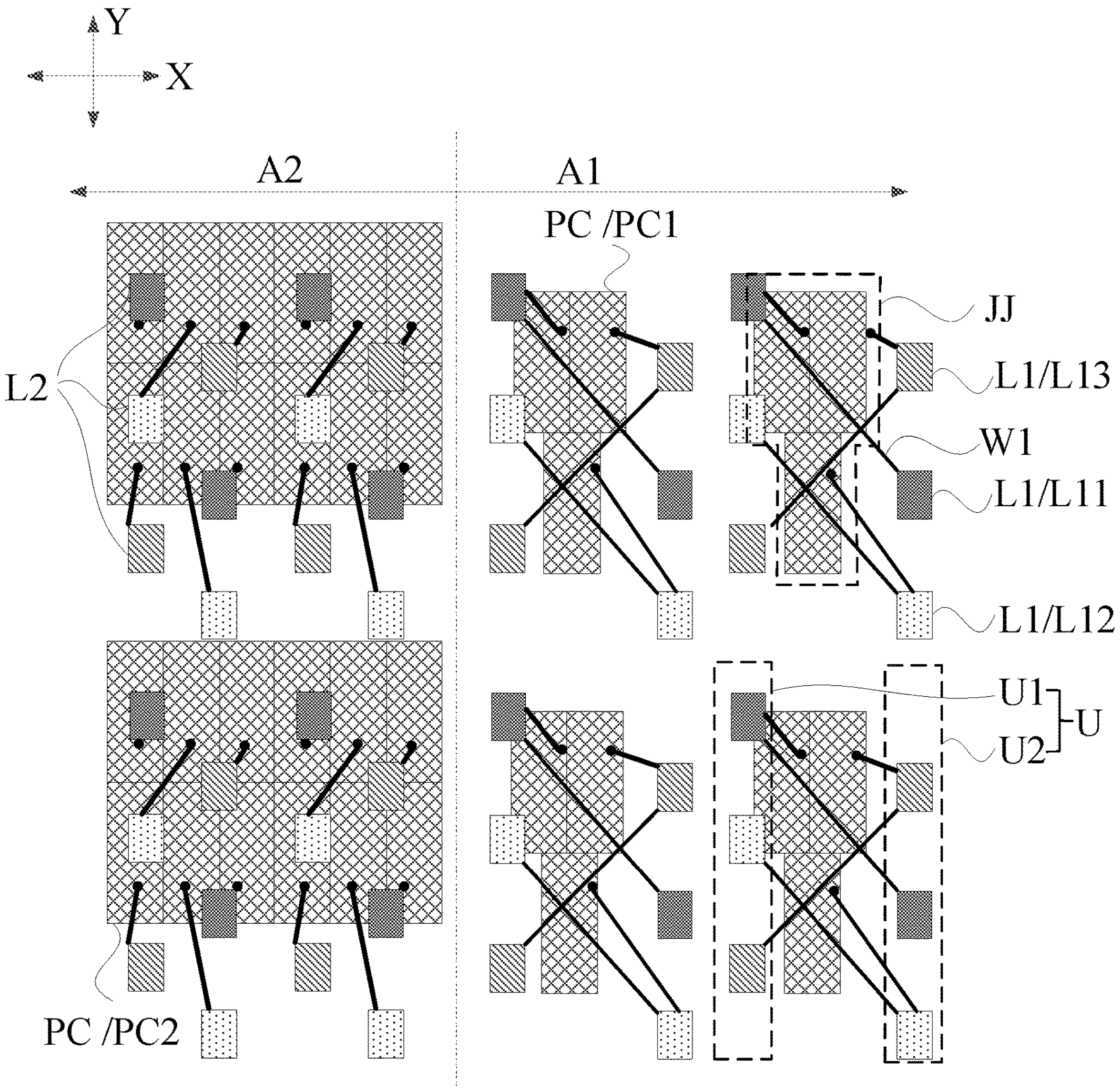
FIG. 17 is a diagram illustrating the structure of another region Q according to an embodiment of the present application.
Figure 18:
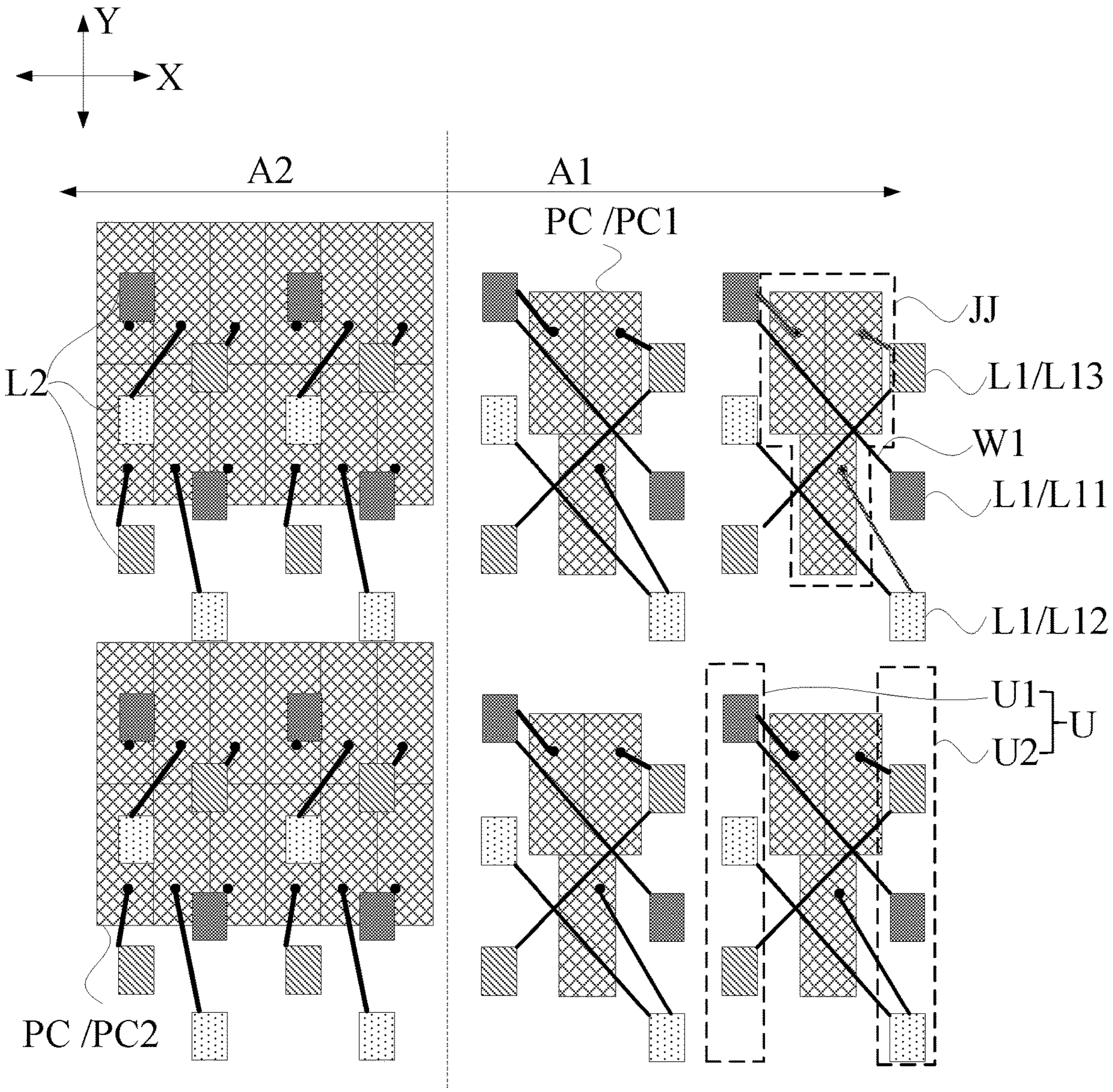
FIG. 18 is a diagram illustrating the structure of a region Q according to an embodiment of the present application.

Exemplarily, FIG. 17 is a diagram illustrating the structure of another region Q according to an embodiment of the present application. FIG. 18 is a diagram illustrating the structure of a region Q according to an embodiment of the present application. In FIGS. 17 and 18, the arrangement mode of the first light-emitting elements L1 is the "YYG arrangement". In an embodiment, in the same minimum repeating unit U, all of the first light-emitting elements L1 of the same color are electrically connected to the same first pixel circuit PC1, the first pixel circuits PC1 to which the minimum repeating unit U is electrically connected are aggregated in the first aggregation area JJ, and multiple first light-emitting elements L1 in the first repeating unit CF1 are arranged at the outer periphery of the first aggregation area JJ.

Three first pixel circuits PC1 carrying out a "one driving two" mode are aggregated in the first aggregation area JJ corresponding to the minimum repeating unit U, one first pixel circuit PC1 may be directly electrically connected to any one of two first light-emitting elements L1 driven by the first pixel circuit PC1, and the first pixel circuit PC1 may be arranged at any position in the first aggregation area JJ. All of the first light-emitting elements L1 in the minimum repeating unit U are arranged at the outer periphery of the first aggregation area JJ. The first aggregation area JJ is arranged inside the minimum repeating unit U, and may overlap with the partial area of at least part of the first light-emitting elements L1 close to the first aggregation area JJ (as shown in FIG. 17) or may not overlap with the first light-emitting elements L1 at all (as shown in FIG. 18).

The first pixel circuits PC1 to which the minimum repeating unit U is electrically connected are aggregated between the first light-emitting element column U1 and second light-emitting element column U2, facilitating improving the diffraction caused by the structure of the first pixel circuits PC1, thereby facilitating reducing the diffraction degree of the first display area A1. Moreover, multiple first light-emitting elements L1 in the minimum repeating unit U can be arranged on two sides of the aggregated first pixel circuits PC1, facilitating the electrical connection between the first pixel circuit PC1 and the first light-emitting element L1 directly electrically connected to the first pixel circuit PC1 through the anode connection line W2, and facilitating reducing the design difficulty of the anode connection line W2.

Figure 19:
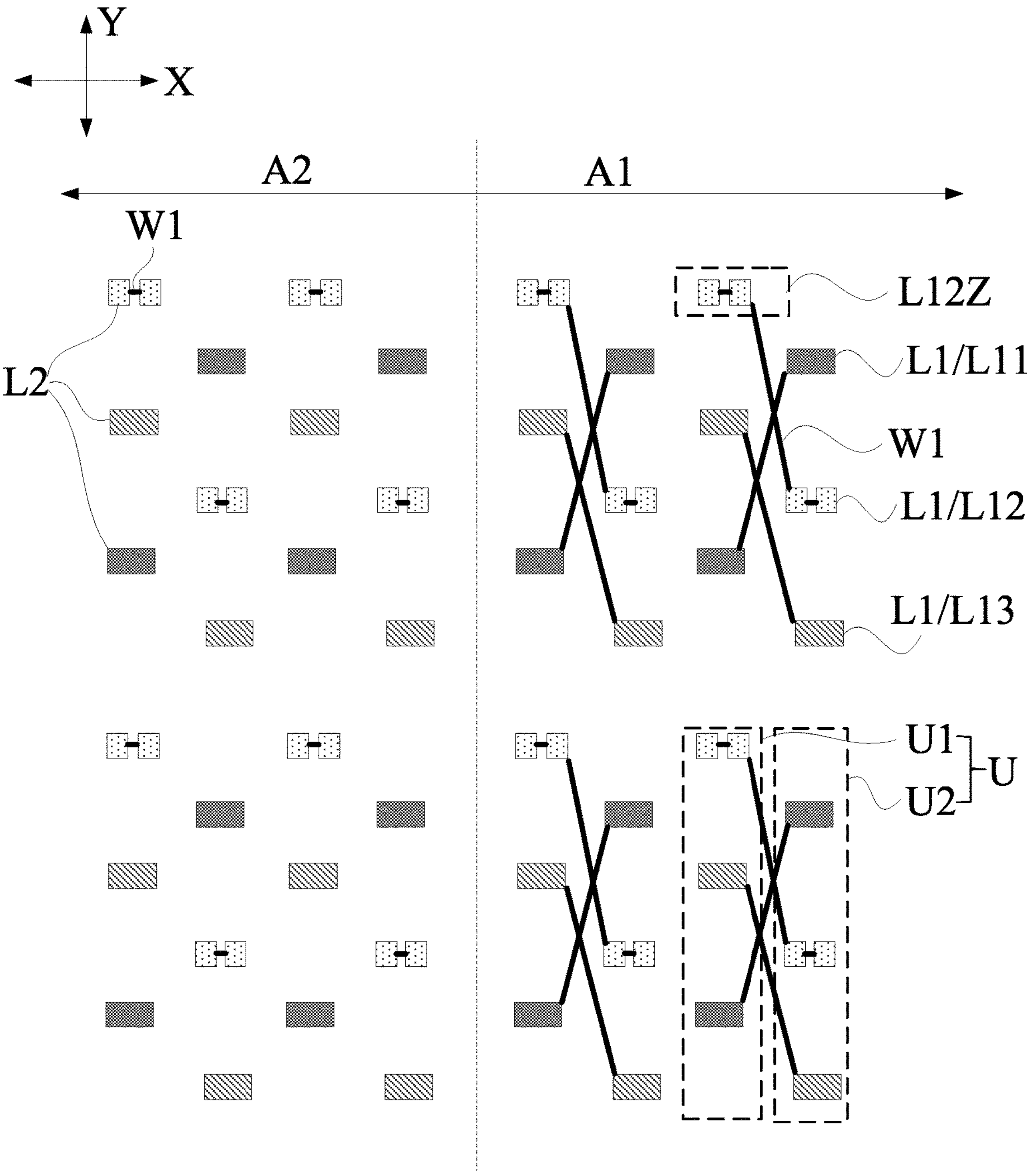
FIG. 19 is a diagram illustrating the structure of another region Q according to an embodiment of the present application.
Figure 20:
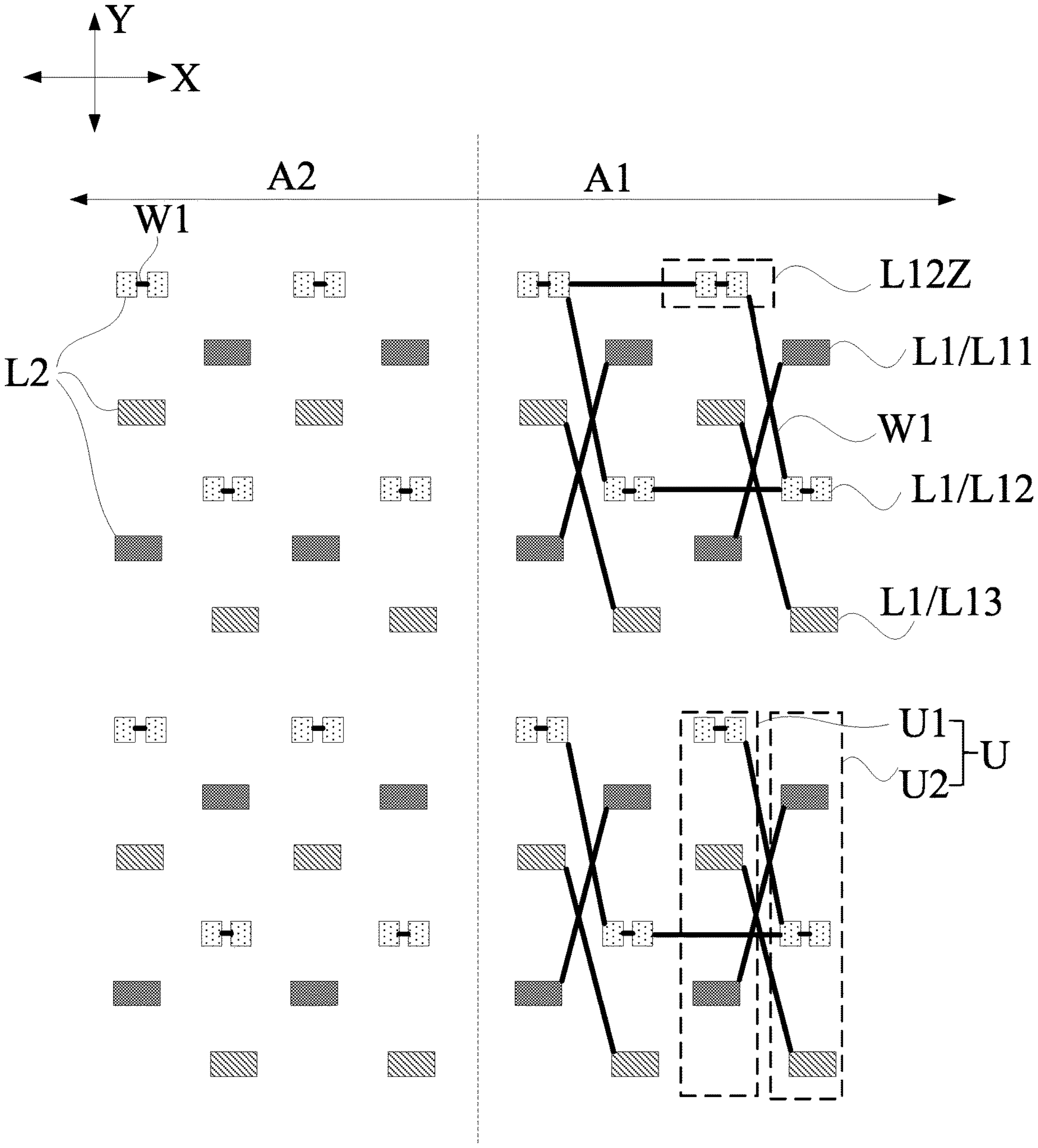
FIG. 20 is a diagram illustrating the structure of another region Q according to an embodiment of the present application.

Exemplarily. FIG. 19 is a diagram illustrating the structure of another region Q according to an embodiment of the present application. FIG. 20 is a diagram illustrating the structure of another region Q according to an embodiment of the present application. FIGS. 19 and 20 show the same pixel arrangement mode, but the implementation modes of "one driving multiple" are different. In an embodiment, referring to FIGS. 19 and 20, the minimum repeating unit U includes a first light-emitting element column U1 and a second light-emitting element column U2 arranged in the row direction X. The first light-emitting element column U1 includes one light-emitting element group L12Z of the second color, one light-emitting element L13 of the third color and one light-emitting element L11 of the first color arranged in sequence in the column direction Y. The second light-emitting element column U2 includes one light-emitting element L11 of the first color, one light-emitting element group L12Z of the second color and one light-emitting element L13 of the third color arranged in sequence in the column direction Y. The first light-emitting element column U1 and the second light-emitting element column U2 are arranged in a misaligned mode in the row direction X.

In the first display area A1, the arrangement mode of the first light-emitting elements L1 is "YYG-like arrangement". The light-emitting color of the light-emitting element L11 of the first color, the light-emitting color of the light-emitting element L12 of the second color and the light-emitting color of the light-emitting element L13 of the third color may be set according to practical situations, and are not limited herein. In an embodiment, the light-emitting element L11 of the first color includes the red light-emitting element, the light-emitting element L12 of the second color includes the green light-emitting element, and the light-emitting element L13 of the third color includes the blue light-emitting element.

In an embodiment, in the same minimum repeating unit U, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1. In an embodiment, the number of the light-emitting elements L12 of the second color connected to the same first pixel circuit PC1 may be two and these light-emitting elements L12 of the second color are two light-emitting elements L12 of the second color arranged close to each other.

In an embodiment, referring to FIG. 20, among at least two adjacent minimum repeating units U in the row direction X or the column direction Y, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1.

Figure 21:
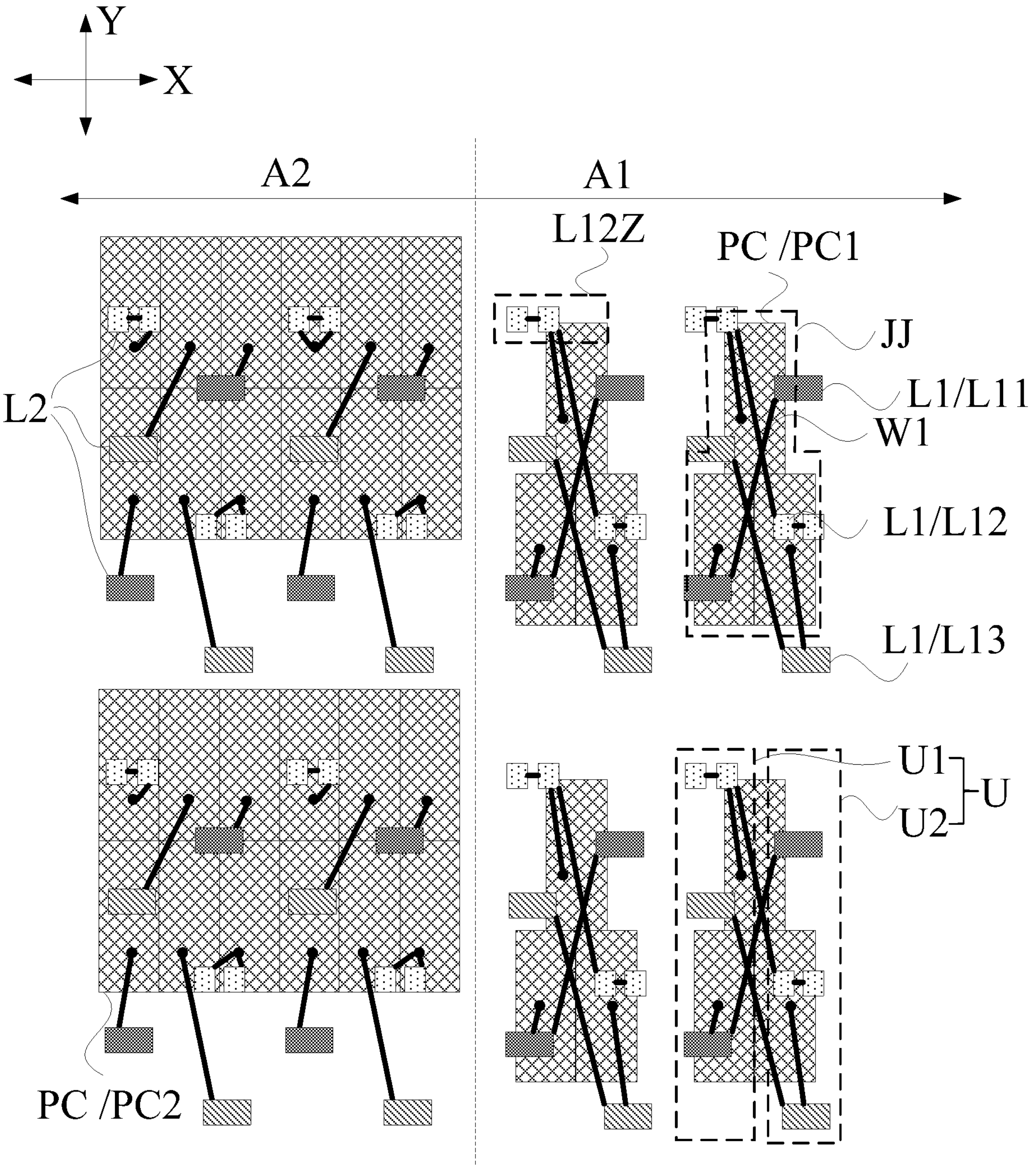
FIG. 21 is a diagram illustrating the structure of another region Q according to an embodiment of the present application.

Exemplarily, FIG. 21 is a diagram illustrating the structure of another region Q according to an embodiment of the present application. In FIG. 21, the arrangement mode of the first light-emitting elements L1 is the "YYG-like arrangement". In an embodiment, in the same minimum repeating unit U, all of first light-emitting elements L1 of the same color are electrically connected to the same first pixel circuit PC1, first pixel circuits PC1 to which the minimum repeating unit U is electrically connected are aggregated in the first aggregation area JJ, and multiple first light-emitting elements L1 in the first repeating unit CF1 are arranged at the outer periphery of the first aggregation area JJ.

Two first pixel circuits PC1 carrying out the "one driving two" mode and one first pixel circuit PC1 carrying out the "one driving four" mode are aggregated in the first aggregation area JJ corresponding to the minimum repeating unit U. The first pixel circuit PC1 carrying out the "one driving two" mode may be directly electrically connected to any one of two first light-emitting elements L1 driven by the first pixel circuit PC1. Similarly, the first pixel circuit PC1 carrying out the "one driving four" mode may be directly electrically connected to any one of four light-emitting elements L12 of the second color driven by the first pixel circuit PC1. Moreover, the three first pixel circuits PC1 may be arranged at any position in the first aggregation area JJ. All of the first light-emitting elements L1 in the minimum repeating unit U are arranged at the outer periphery of the first aggregation area JJ. The first aggregation area JJ is arranged inside the minimum repeating unit U, and may overlap with the partial area of at least part of the first light-emitting elements L1 close to the first aggregation area JJ (as shown in FIG. 21) or may not overlap with the first light-emitting elements L1 at all.

The first pixel circuits PC1 to which the minimum repeating unit U is electrically connected are aggregated between the first light-emitting element column U1 and second light-emitting element column U2, facilitating improving the diffraction caused by the structure of the first pixel circuits PC1, thereby facilitating reducing the diffraction degree of the first display area A1. Moreover, multiple first light-emitting elements L1 in the minimum repeating unit U can be arranged on two sides of the aggregated first pixel circuits PC1, facilitating the electrical connection between the first pixel circuit PC1 and the first light-emitting element L1 directly electrically connected to the first pixel circuit PC1 through the anode connection line W2, and facilitating reducing the design difficulty of the anode connection line W2.

Figure 22:
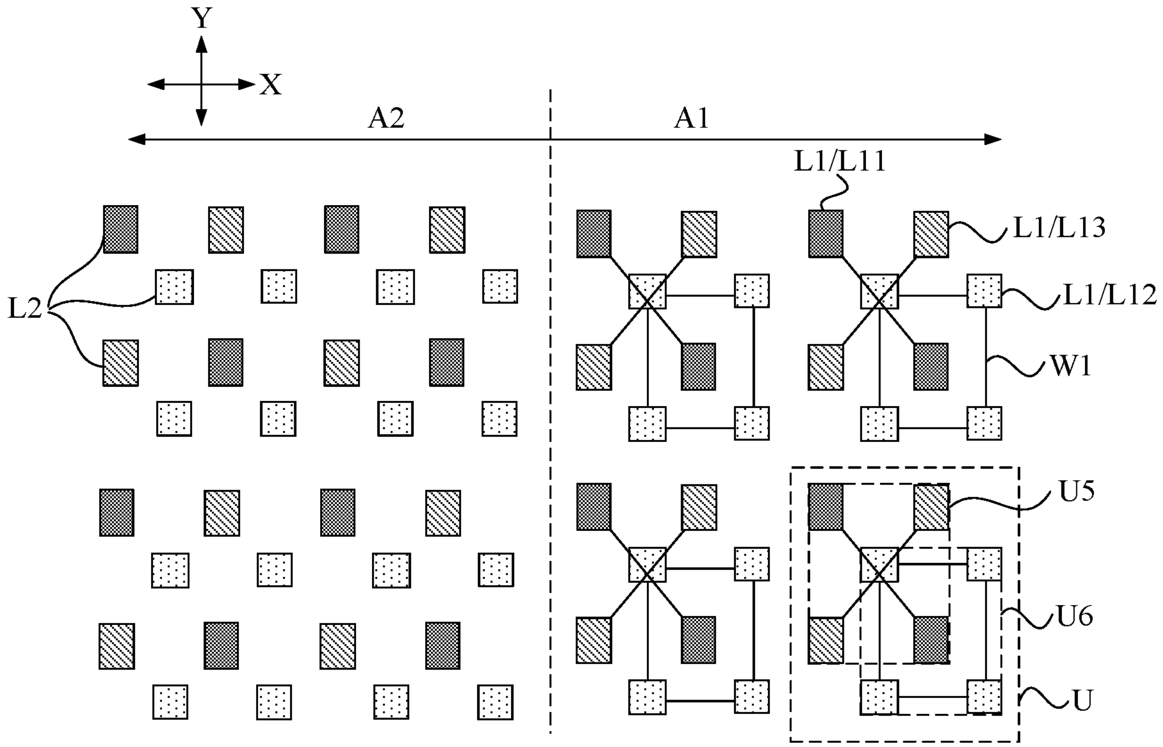
FIG. 22 is a diagram illustrating the structure of a region Q according to an embodiment of the present application.
Figure 23:
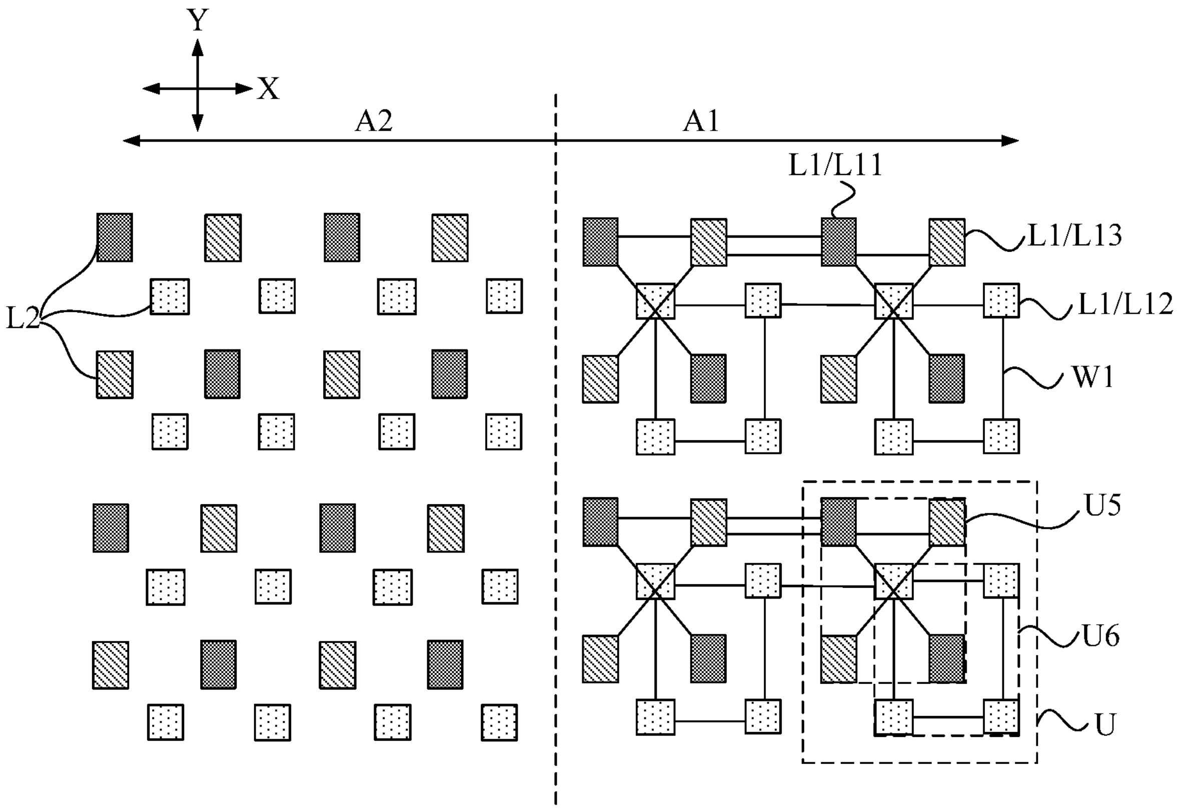
FIG. 23 is a diagram illustrating the structure of another region Q according to an embodiment of the present application.

Exemplarily, FIG. 22 is a diagram illustrating the structure of a region Q according to an embodiment of the present application. FIG. 23 is a diagram illustrating the structure of another region Q according to an embodiment of the present application. FIGS. 22 and 23 show the same pixel arrangement mode, but the implementation modes of "one driving multiple" are different. In an embodiment, referring to FIGS. 22 and 23, the minimum repeating unit U includes the following eight first light-emitting elements L1: two light-emitting elements L11 of the first color, four light-emitting elements L12 of the second color, and two light-emitting elements L13 of the third color. The two light-emitting elements L11 of the first color and the two light-emitting elements L13 of the third color are arranged in two rows and two columns, and two first light-emitting elements L1 arranged in a same row or in a same column emit light of different colors. Centers of the two light-emitting elements L11 of the first color and centers of the two light-emitting elements L13 of the third color form a first virtual quadrangle U5, and two sides of at least one pair of opposite sides of two pairs of opposite sides of the first virtual quadrangle U5 are parallel to each other. One light-emitting element L12 of the second color and the remaining three light-emitting elements L12 of the second color inside the first virtual quadrangle U5 form a second virtual quadrangle U6, and two sides of at least one pair of opposite sides of two pairs of opposite sides of the second virtual quadrangle U6 are parallel to each other.

The first virtual quadrangle U5 includes a parallelogram, a trapezoid, a rectangle, a square or the like. The second virtual quadrangle U6 includes a parallelogram, a trapezoid, a rectangle a square or the like.

In the first display area A1, the arrangement mode of the first light-emitting elements L1 is "diamond arrangement". The light-emitting color of the light-emitting element L11 of the first color, the light-emitting color of the light-emitting element L12 of the second color and the light-emitting color of the light-emitting element L13 of the third color may be set according to practical situations, and are not limited herein. In an embodiment, the light-emitting element L11 of the first color includes the red light-emitting element, the light-emitting element L12 of the second color includes the green light-emitting element, and the light-emitting element L13 of the third color includes the blue light-emitting element; or the light-emitting element L11 of the first color includes the blue light-emitting element, the light-emitting element L12 of the second color includes the green light-emitting element, and the light-emitting element L13 of the third color includes the red light-emitting element.

In an embodiment, in the same minimum repeating unit U, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the larger the number of first light-emitting elements L1 connected to the same first pixel circuit PC1 is, and the smaller the number of first pixel circuits PC1 is, which is more conducive to improving the transmittance of the first display area A1.

In an embodiment, referring to FIG. 23, among at least two adjacent minimum repeating units U in the row direction X or the column direction Y, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1.

Figure 24:
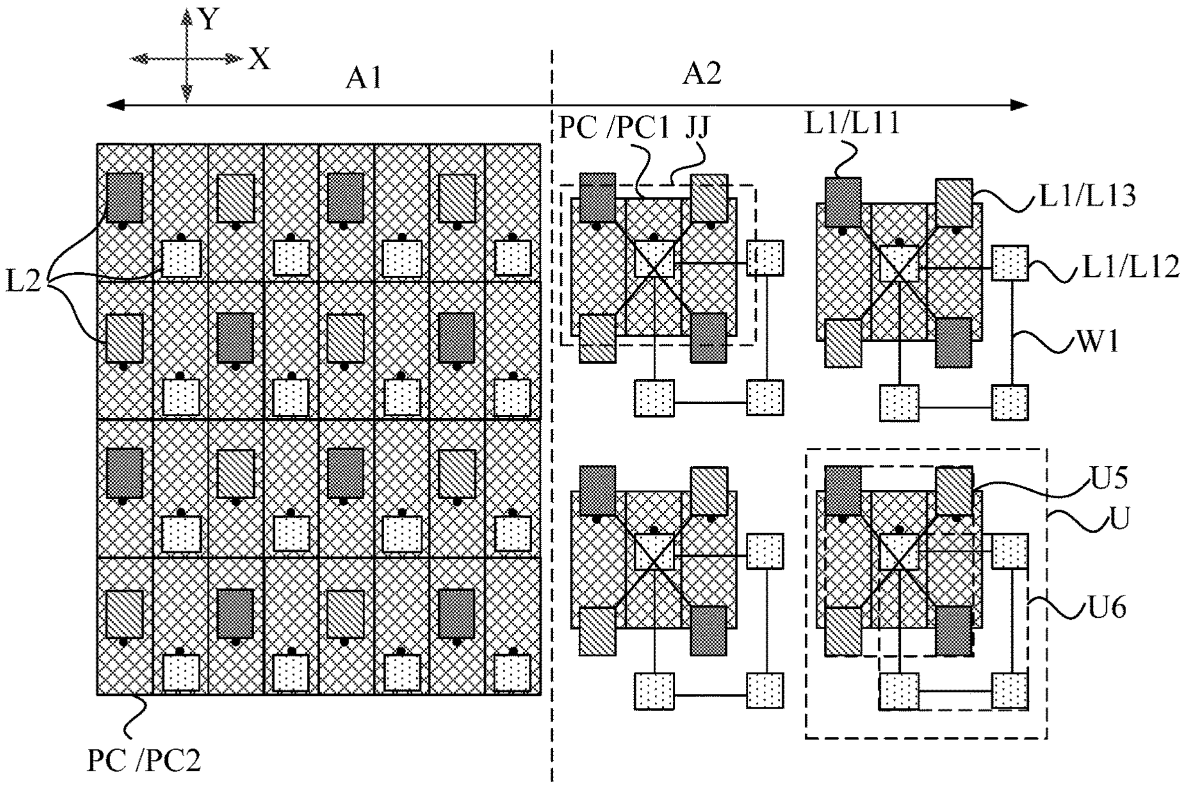
FIG. 24 is a diagram illustrating the structure of another region Q according to an embodiment of the present application.

Exemplarily, FIG. 24 is a diagram illustrating the structure of another region Q according to an embodiment of the present application. FIG. 25 is a diagram illustrating the structure of another region Q according to an embodiment of the present application. In FIGS. 24 and 25, the arrangement mode of the first light-emitting elements L1 is "diamond arrangement". In an embodiment, referring to FIGS. 24 and 25, in the same minimum repeating unit U, all of the first light-emitting elements L1 of the same color are electrically connected to the same first pixel circuit PC1. The first pixel circuits PC1 to which the minimum repeating unit U is electrically connected are aggregated in the first aggregation area JJ. The light-emitting element L11 of the first color electrically connected to a first pixel circuit PC1 and the light-emitting elements L13 of the third color electrically connected to a first pixel circuit PC1 in the first aggregation area JJ are located at an outer periphery of the first aggregation area JJ.

Two first pixel circuits PC1 carrying out the "one driving two" mode and one first pixel circuit PC1 carrying out the "one driving four" mode are aggregated in the first aggregation area JJ corresponding to the minimum repeating unit U. The two first pixel circuit PC1 carrying out the "one driving two" mode may be directly electrically connected to any one of two first light-emitting elements L1 driven by the first pixel circuit PC1. Similarly, the first pixel circuit PC1 carrying out the "one driving four" mode may be directly electrically connected to any one of four light-emitting elements L12 of the second color driven by the first pixel circuit PC1. Moreover, the three first pixel circuits PC1 may be arranged at any position in the first aggregation area JJ. In the minimum repeating unit U, the light-emitting element L11 of the first color and the light-emitting element L13 of the third color are arranged at the outer periphery of the first aggregation area JJ, the first aggregation area JJ overlaps with the light-emitting element L12 of the second color inside the first virtual quadrangle U5, and the first aggregation area JJ may overlap with the partial area of at least part of the light-emitting element L11 of the first color close to the first aggregation area JJ, and/or may overlap with the partial area of at least part of the light-emitting element L12 of the second color close to the first aggregation area JJ (as shown in FIGS. 24 and 25). Alternatively, the first aggregation area JJ may not overlap with the light-emitting element L11 of the first color and the light-emitting element L13 of the third color at all.

The three first pixel circuits PC1 to which the minimum repeating unit U is electrically connected are aggregated in the first aggregation area JJ, facilitating improving the diffraction caused by the structure of the first pixel circuits PC1, thereby facilitating reducing the diffraction degree of the first display area A1. Moreover, multiple first light-emitting elements L1 in the minimum repeating unit U are arranged at the outer periphery of the first aggregation area JJ, the light-emitting elements L11 of the first color and the light-emitting elements L13 of the third color in the minimum repeating unit U are in the state of approximately surrounding the first aggregation area JJ, and one light-emitting element L13 of the third color overlaps with the first aggregation area JJ, facilitating the electrical connection between the first pixel circuit PC1 and the first light-emitting element L1 directly electrically connected to the first pixel circuit PC1 through the anode connection line W2, and facilitating reducing the design difficulty of the anode connection line W2.

Figure 26:
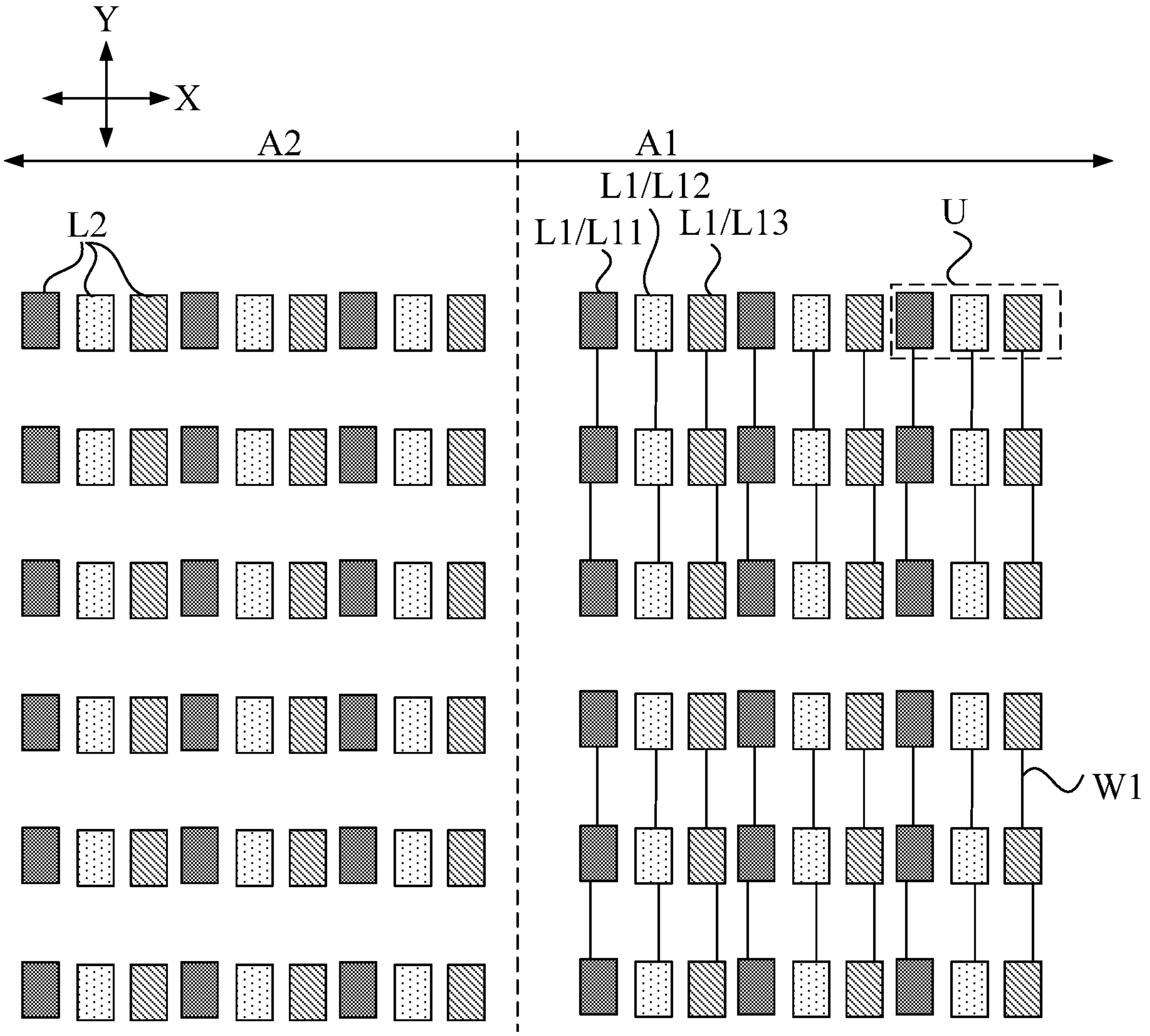
FIG. 26 is a diagram illustrating the structure of a region Q according to an embodiment of the present application.

Exemplarily, FIG. 26 is a diagram illustrating the structure of a region Q according to an embodiment of the present application. In an embodiment, referring to FIG. 26, the minimum repeating unit U includes the following three first light-emitting elements L1: a light-emitting element L11 of the first color, a light-emitting element L12 of the second color, and a light-emitting element L13 of the third color. The light-emitting element L11 of the first color, the light-emitting element L12 of the second color, and the light-emitting element L13 of the third color are arranged in the row direction X.

In the first display area A1, the arrangement manner of the first light-emitting elements L1 is "Real arrangement". Light-emitting colors of the light-emitting element L11 of the first color, the light-emitting element L12 of the second color and the light-emitting element L13 of the third color may be set according to practical situations, and are not limited herein. In an embodiment, the light-emitting element L11 of the first color is one of the red light-emitting element, the green light-emitting element or the blue light-emitting element; the light-emitting element L12 of the second color is one of the red light-emitting element, the green light-emitting element or the blue light-emitting element; and the light-emitting element L13 of the third color is one of the red light-emitting element, the green light-emitting element or the blue light-emitting element.

In an embodiment, referring to FIG. 26, among at least two adjacent minimum repeating units U in the row direction X or the column direction Y, at least two first light-emitting elements L1 of at least one same color are electrically connected to the same first pixel circuit PC1. In other words, in the same minimum repeating unit U, there are first light-emitting elements L1 of n colors driven by the first pixel circuit PC1 in the manner of the "one driving multiple", where n=1, 2 or 3. The larger n is, the smaller the number of first pixel circuits PC1 is, which is more conducive to improving the transmittance of the first display area A1.

Figure 27:
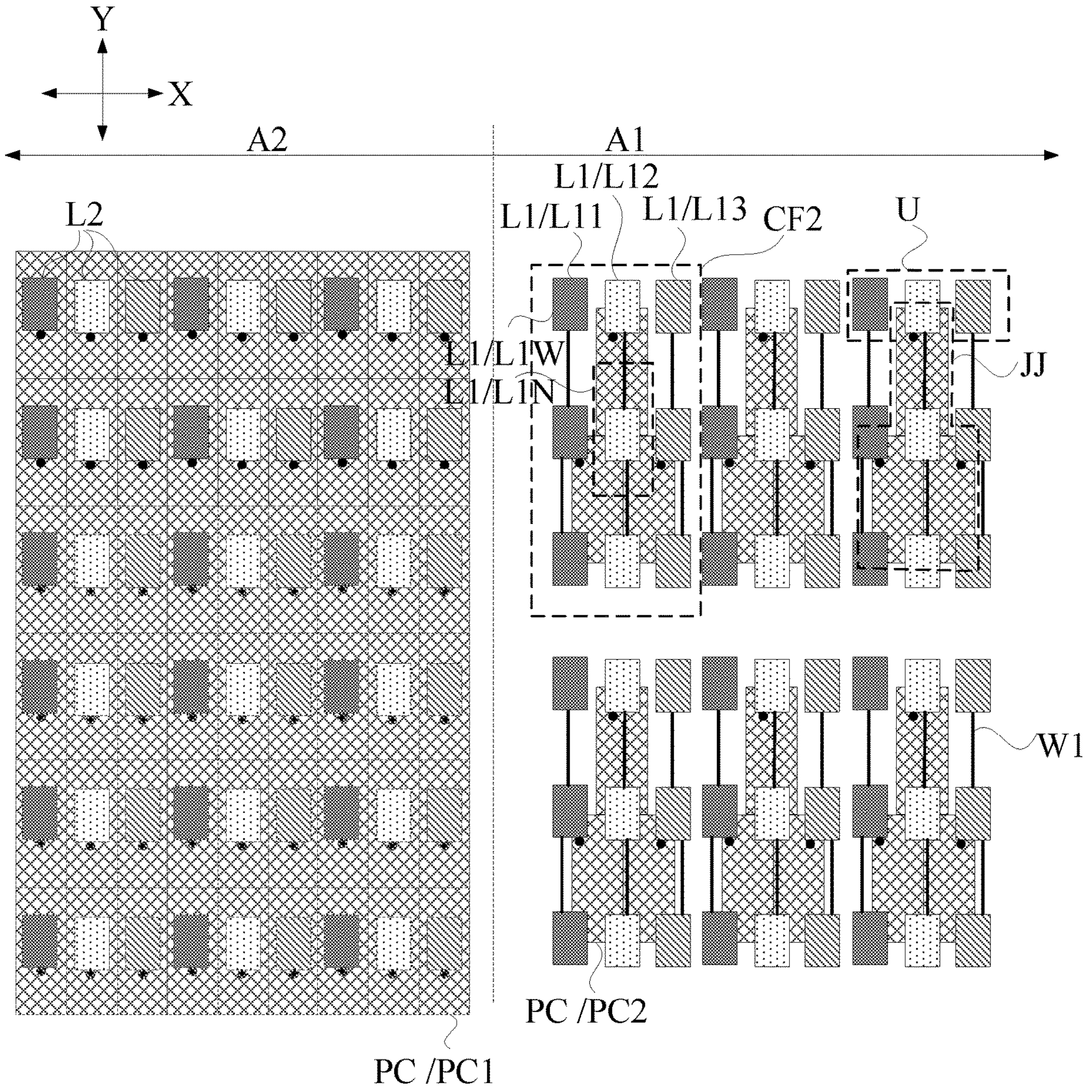
FIG. 27 is a diagram illustrating the structure of another region Q according to an embodiment of the present application.

Exemplarily, FIG. 27 is a diagram illustrating the structure of another region Q according to an embodiment of the present application. In an embodiment, at least three minimum repeating units U arranged in the column direction Y form a second repeating unit CF2. All of the first light-emitting elements L1 of the same color are electrically connected to the same first pixel circuit PC1. The first pixel circuits PC1 to which the second repeating unit CF2 is electrically connected are aggregated in the first aggregation area JJ, and multiple first light-emitting elements L1 in the second repeating unit CF2 are arranged at the outer periphery of the first aggregation area JJ.

Figure 33:
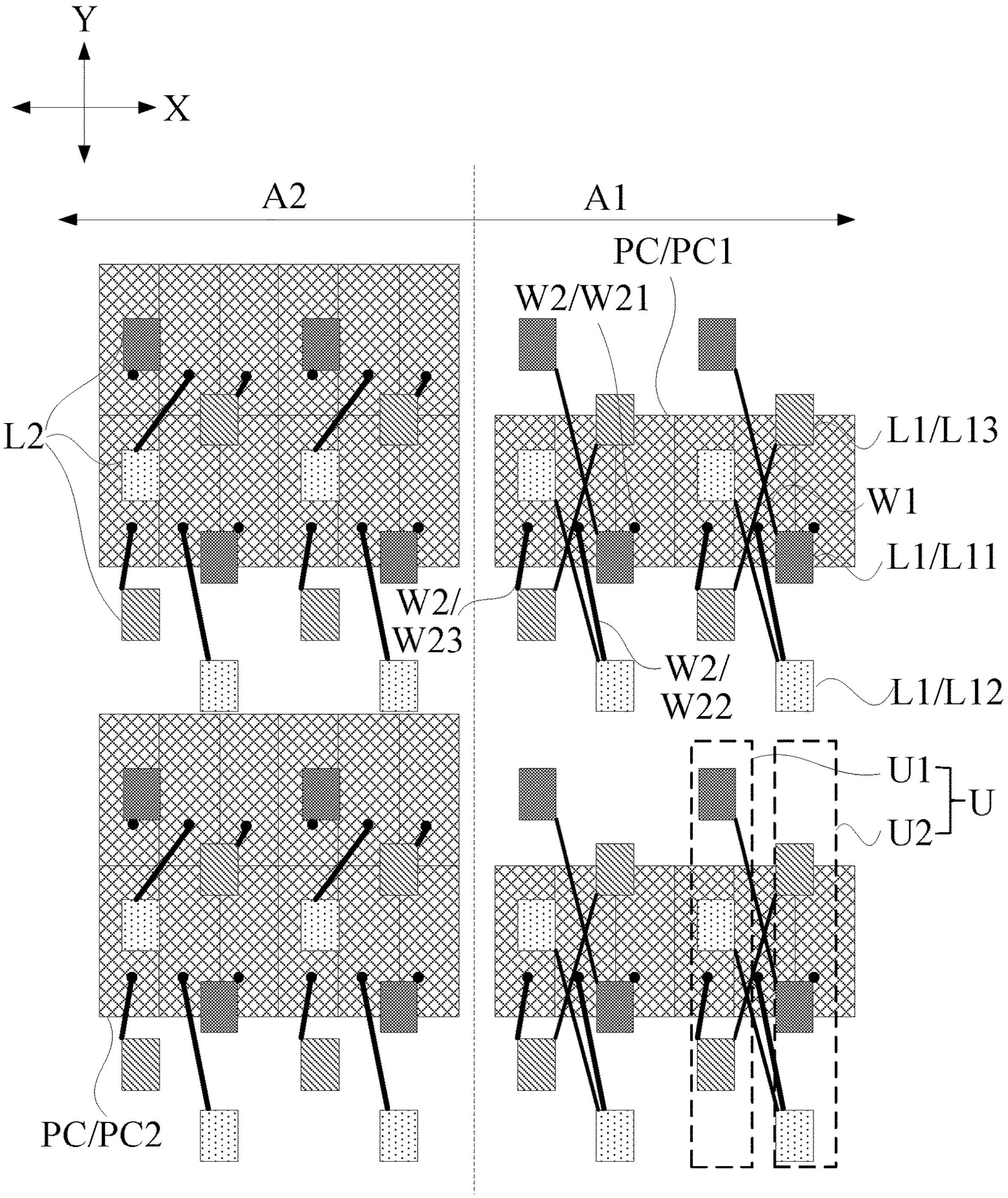
FIG. 33 is a diagram illustrating the structure of another region Q according to an embodiment of the present application.

Referring to FIG. 27, three first pixel circuits PC1 carrying out the "one driving multiple" mode are aggregated in the first aggregation area JJ corresponding to the second repeating unit CF2. The first pixel circuit PC1 carrying out the "one driving multiple" mode may be directly electrically connected to any one of the multiple first light-emitting elements L1 driven by the first pixel circuit PC1. The three first pixel circuits PC1 may be arranged at any position in the first aggregation area JJ. The second minimum repeating unit CF2 includes inner-loop first light-emitting element L1N and outer-loop first light-emitting elements L1W. The inner-loop first light-emitting element L1N is not adjacent to the other second minimum repeating units CF2. The outer-loop first light-emitting elements L1W surround the inner-loop first light-emitting element L1N. For example, in FIG. 27, the first light-emitting elements L1 in the first row and the first column, the first light-emitting element L1 in the first row and the second column, the first light-emitting element L1 in the first row and the third column, the first light-emitting element L1 in the second row and the first column, the first light-emitting element L1 in the second row and the third column, the first light-emitting element L1 in the third row and the first column, the first light-emitting element L1 in the third row and the second column, and the first light-emitting element L1 in the third row and the third column are the outer-loop first light-emitting elements L1W. The first light-emitting element L1 in the second row and the second column is the inner-loop first light-emitting element L1N. The outer-loop first light-emitting elements L1W are arranged at the outer periphery of the first aggregation area JJ. The first aggregation area JJ is arranged inside the second repeating unit CF2, and may overlap with the inner-loop first light-emitting elements L1N. The first aggregation area JJ may overlap with the partial area of at least part of the outer-loop first light-emitting elements L1W close to the first aggregation area JJ (as shown in FIG. 33) or may not overlap with the outer-loop first light-emitting elements L1W at all.

The three first pixel circuits PC1 to which the second repeating unit CF2 is electrically connected are aggregated in the first aggregation area JJ, facilitating improving the diffraction caused by the structure of the first pixel circuits PC1, thereby facilitating reducing the diffraction degree of the first display area A1. Moreover, multiple first light-emitting elements L1 in the second repeating unit CF2 are arranged at the outer periphery of the first aggregation area JJ so that the peripheral first light-emitting element L1 in the second repeating unit CF2 are in the state of approximately surrounding the first aggregation area JJ, facilitating the electrical connection between the first pixel circuit PC1 and the first light-emitting element L1 directly electrically connected to the first pixel circuit PC1 through the anode connection line W2, and reducing the design difficulty of the anode connection line W2.

In FIGS. 2, 4, 8 to 11, 14 to 16, 19, 20, 22, 23 and 26, the first pixel circuit PC1 and the second pixel circuit PC2 are not shown for ease of illustration. However, in the preceding drawings, two first light-emitting elements L1 are electrically connected through the co-drive connection line W1, which indicates that the two first light-emitting elements L1 are driven by the same first pixel circuit PC1, and the two first light-emitting elements L1 are not electrically connected to other first light-emitting elements L1 through the co-drive connection line W1, which indicates that the two first light-emitting elements L1 are driven by one pixel circuit PC independently.

FIGS. 9, 10, 16, 20 and 23 only exemplarily show that the same first pixel circuit PC1 carries out the "one driving multiple" mode between two adjacent minimum repeating units U in the row direction X. FIG. 26 only exemplarily shows that the same first pixel circuit PC1 carries out the "one driving multiple" mode between three minimum repeating units U minimum repeating units U in the column direction X, but it is not limited thereto. The number of minimum repeating units U involved by the first light-emitting element L1 electrically connected to the same first pixel circuit PC1 and whether the minimum repeating units U are arranged in sequence in the row direction X or in the column direction Y may be set according to practical situations.

Figure 28:
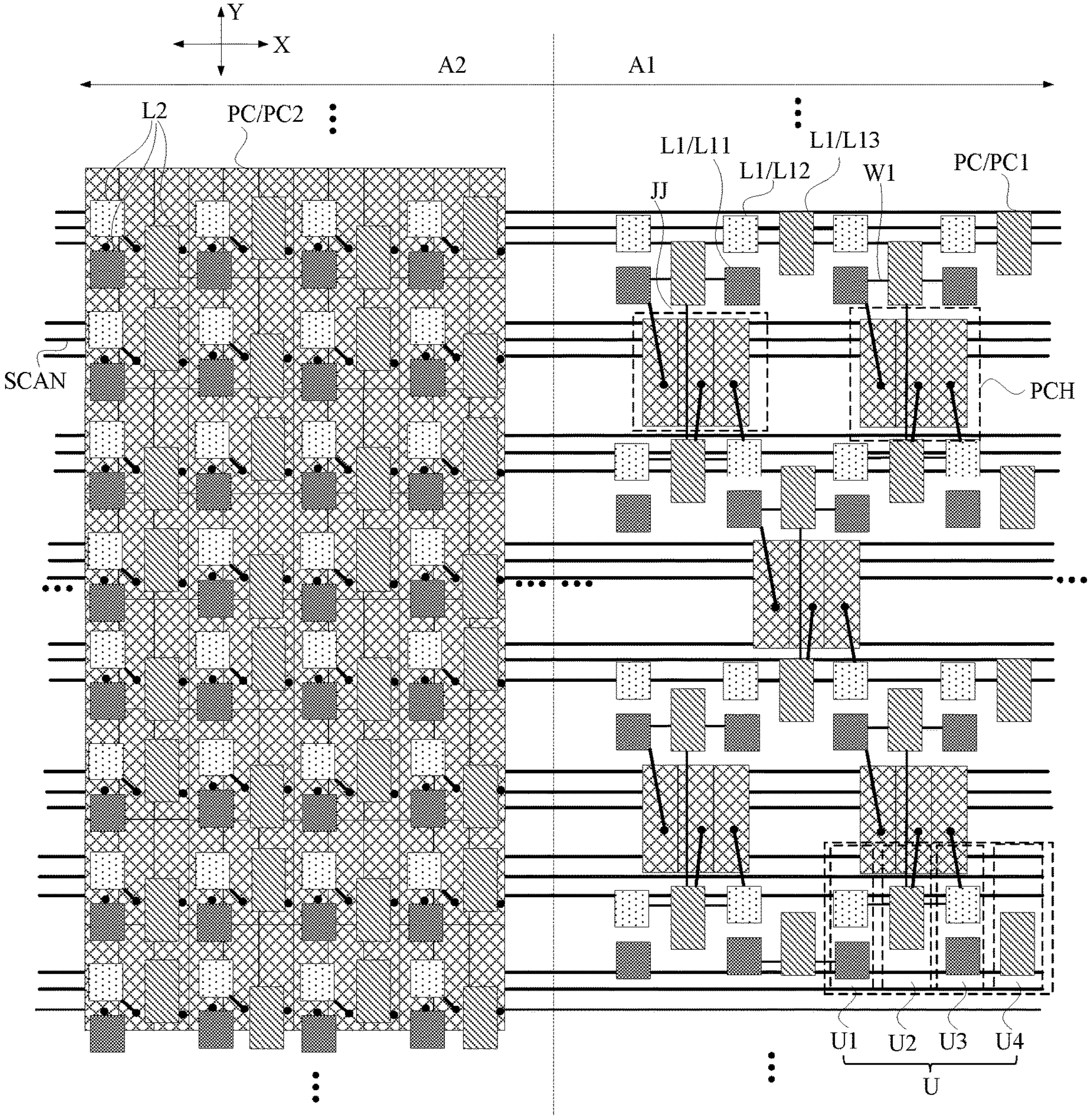
FIG. 28 is a diagram illustrating the structure of another region Q according to an embodiment of the present application.
Figure 29:
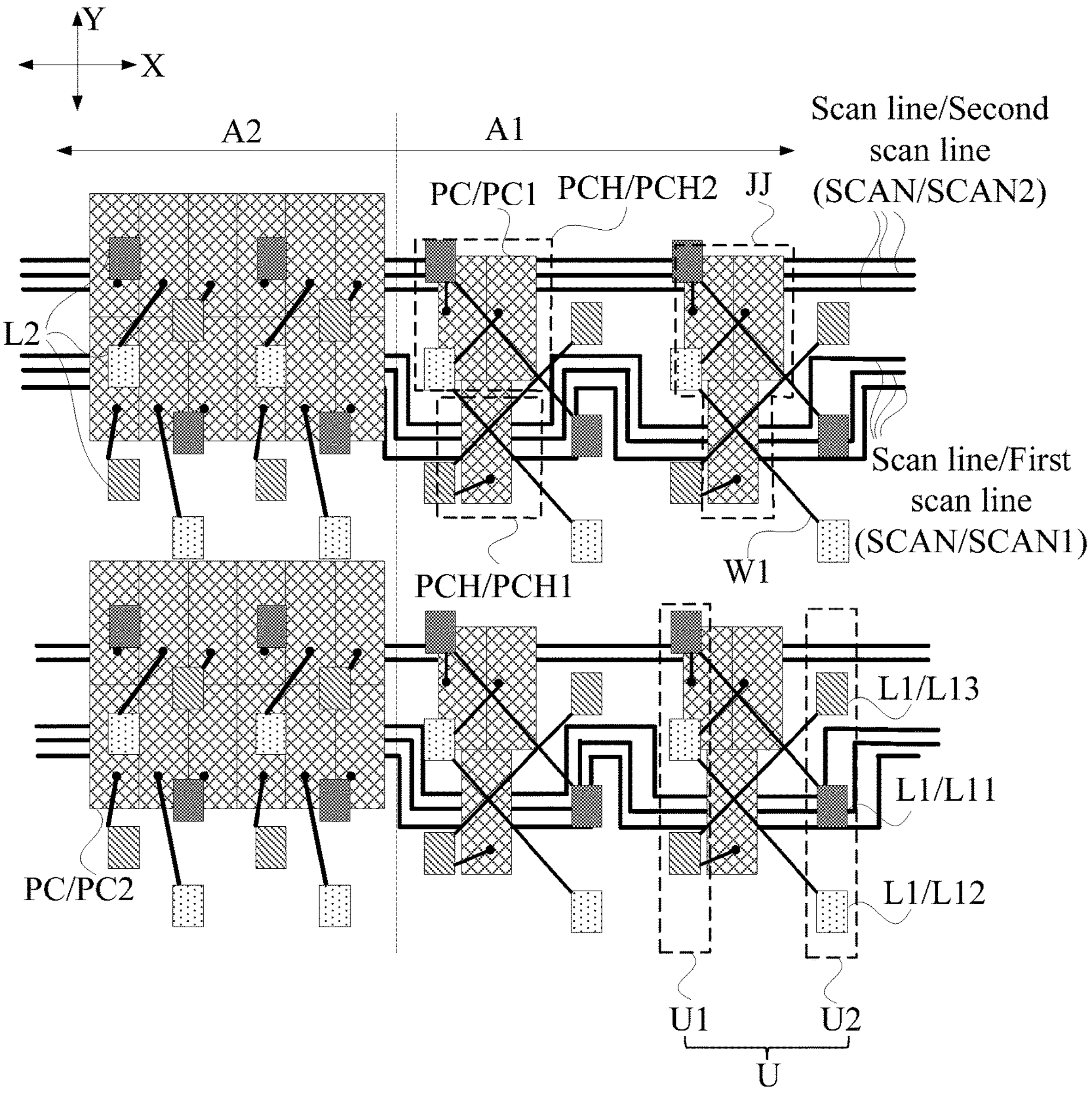
FIG. 29 is a diagram illustrating the structure of another region Q according to an embodiment of the present application.

The first pixel circuit PC1 in the first aggregation area JJ and the scan line SCAN are connected in various modes. In an embodiment, as shown in FIGS. 28 and 29, the first pixel circuits PC1 in the same first aggregation area JJ include at least one pixel circuit row PCH. The display panel further includes scan lines SCAN extending in the row direction X and electrically connected to the pixel circuit row PCH. In the same first aggregation area JJ, the pixel circuit row PCH is electrically connected to at least two scan lines SCAN.

The number of scan lines SCAN electrically connected to the pixel circuit row PCH is related to the structure of the first pixel circuit PC1. Exemplarily, in combination with FIG. 7, the first pixel circuit PC1 includes a scan signal terminal Scan1, a scan signal terminal Scan2, and a scan signal terminal Scan3. The pixel circuit row PCH is electrically connected to three scan lines SCAN extending in the row direction X. Exemplarily, FIG. 28 is a diagram illustrating the structure of another region Q according to an embodiment of the present application. Referring to FIG. 28, the arrangement mode of the first light-emitting elements L1 is the "π arrangement". The three first pixel circuits PC1 in the first aggregation area JJ are located in the same row. A different pixel circuit row PCH is electrically connected to different three scan lines SCAN. The first pixel circuits PC1 of the same first aggregation area JJ are aligned in one row; facilitating reducing the number of scan lines SCAN crossing the first display area A1, and further improving the transmittance of the first display area A1, thereby improving the optical performance of the optical elements.

The different pixel circuit line PCH is electrically connected to different three scan lines SCAN so that back and forth winding of the scan lines SCAN can be avoided and the design difficulty of the scanning line SCAN can be reduced.

In an embodiment, as shown in FIG. 29, at least one pixel circuit row PCH includes a first pixel circuit row PCH1 and a second pixel circuit row PCH2. The first pixel circuit row PCH1 includes one first pixel circuit PC1 electrically connected to the light-emitting element L13 of the third color. The second pixel circuit row PCH2 includes two first pixel circuits PC1. The two first pixel circuits PC1 are electrically connected to the light-emitting element L11 of the first color and the light-emitting element L12 of the second color respectively.

The electrical connection described here includes the electrical connection through the anode connection wire W2, the electrical connection through the co-drive connection wire W1, the electrical connection through coupling and the like.

Such configuration mode is applicable to any pixel arrangement in which the three first pixel circuits PC1 in the same first aggregation area JJ are arranged in two rows. Exemplarily, FIG. 29 is a diagram illustrating the structure of another region Q according to an embodiment of the present application. Referring to FIG. 29, the arrangement mode of the first light-emitting elements L1 is the "YYG arrangement". The three first pixel circuit PC1 in the first aggregation area JJ are arranged in two rows. The first pixel circuit PC1 in the first pixel circuit row PCH1 is electrically connected to the first scan line SCAN1, and is electrically connected to the light-emitting element L13 of the third color. Two first pixel circuits PC1 in the first pixel circuit row PCH1 are electrically connected to the second scan line SCAN2, and the two first pixel circuits PC1 are electrically connected to the light-emitting element L11 of the first color and the light-emitting element L12 of the second color respectively.

In an embodiment, an orthographic projection of at least one first pixel circuit PC1 on a plane where the display panel is located at least partially overlap with an orthographic projection of at least one first light-emitting element L1 electrically connected to the at least one first pixel circuit PC1 on the plane where the display panel is located.

Here, the first light-emitting element L1 electrically connected to the first pixel circuit PC1 refers to the first light-emitting element L1 directly connected to the first pixel circuit PC1, and excludes the first light-emitting element L1 indirectly electrically connected to the first pixel circuit PC1 through the co-drive connection line W1 or another first light-emitting element.

The position where the first light-emitting element L1 is located and the position where the first pixel circuit PC1 is located have low transmittance. The orthographic projection of the at least one first pixel circuit PC1 on the plane where the display panel is located at least partially overlap with the orthographic projection of at least one first light-emitting element L1 electrically connected to the at least one first pixel circuit PC1 on the plane where the display panel is located so that the sum of the area occupied by the first light-emitting element L1 and the area occupied by the first pixel circuit PC1 can be reduced, facilitating increasing the ratio of the transparent area in the first display area A1, and further improving the performance of the optical elements.

Figure 30:
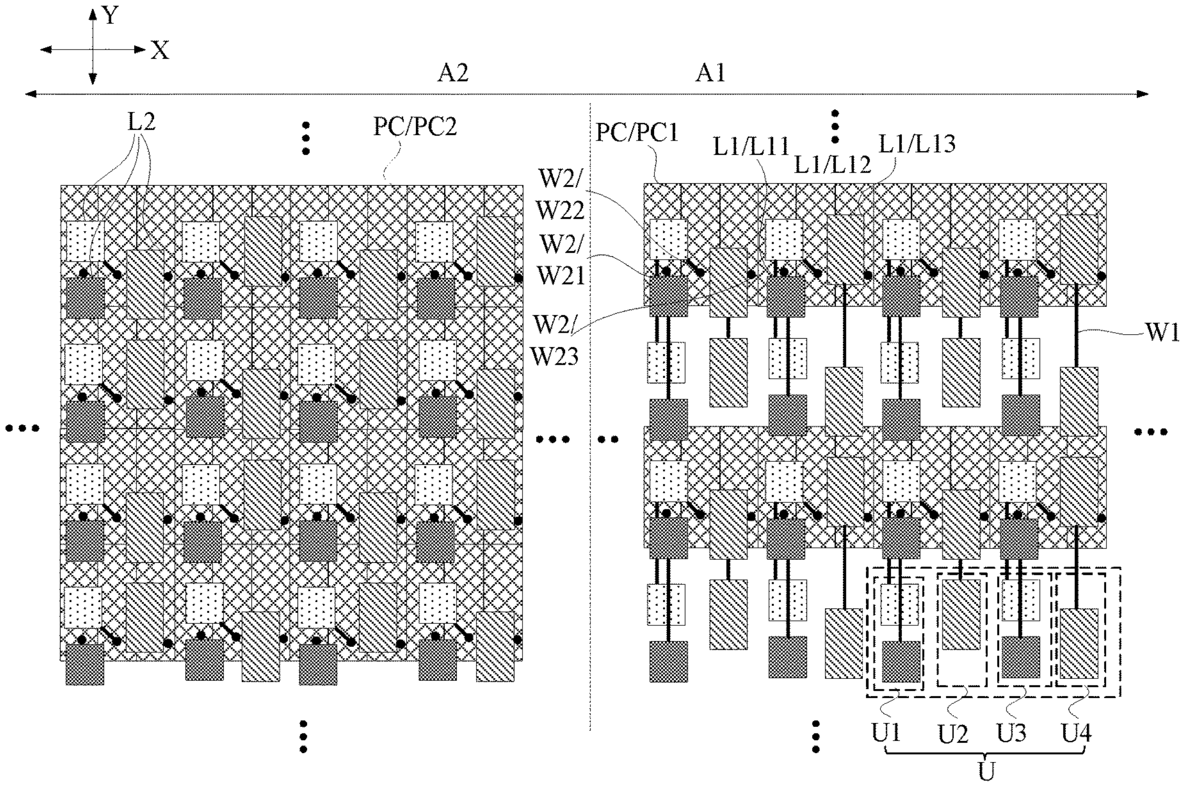
FIG. 30 is a diagram illustrating the structure of a region Q according to an embodiment of the present application.
Figure 31:
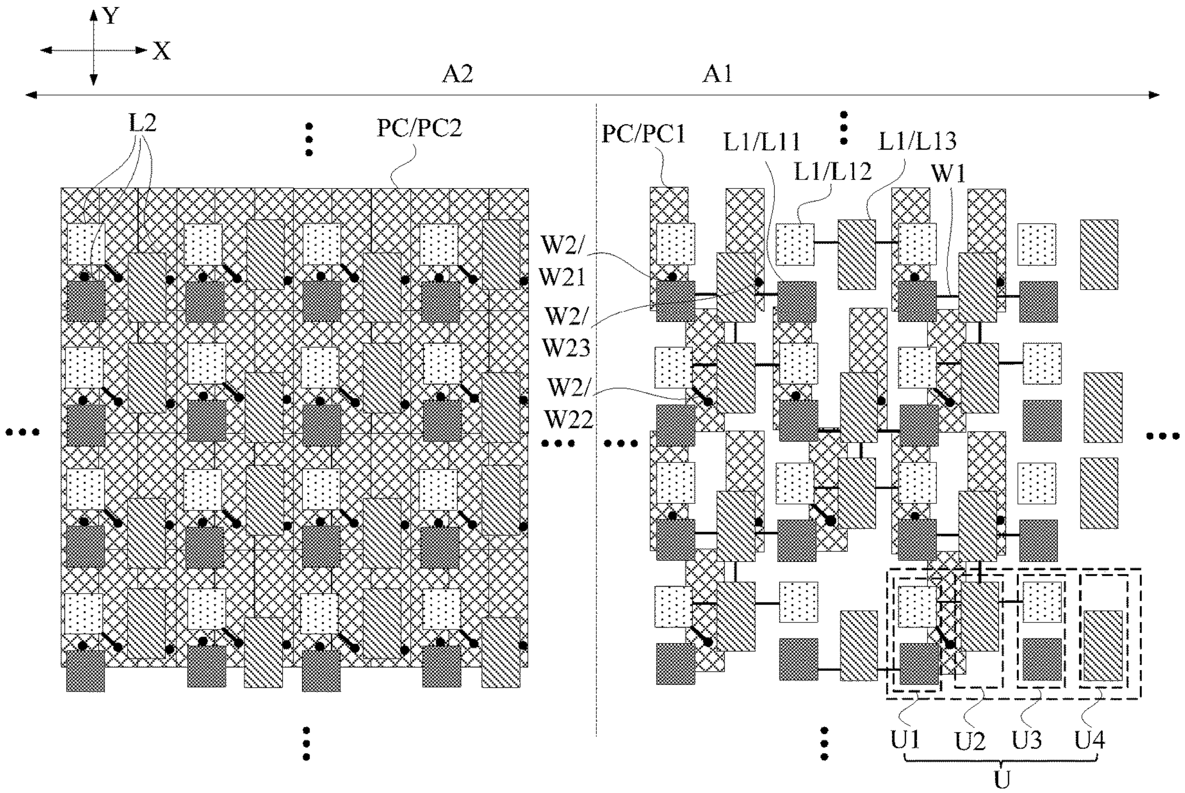
FIG. 31 is a diagram illustrating the structure of another region Q according to an embodiment of the present application.
Figure 32:
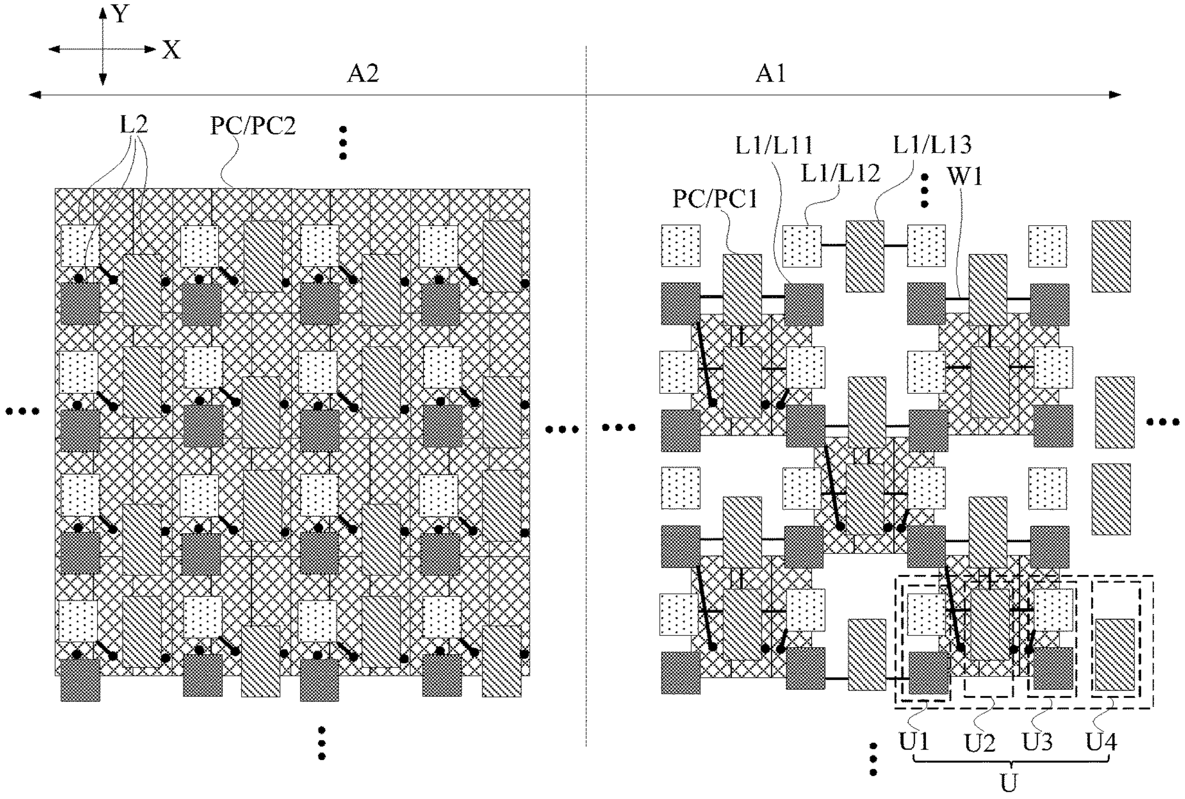
FIG. 32 is a diagram illustrating the structure of another region Q according to an embodiment of the present application.
Figure 34:
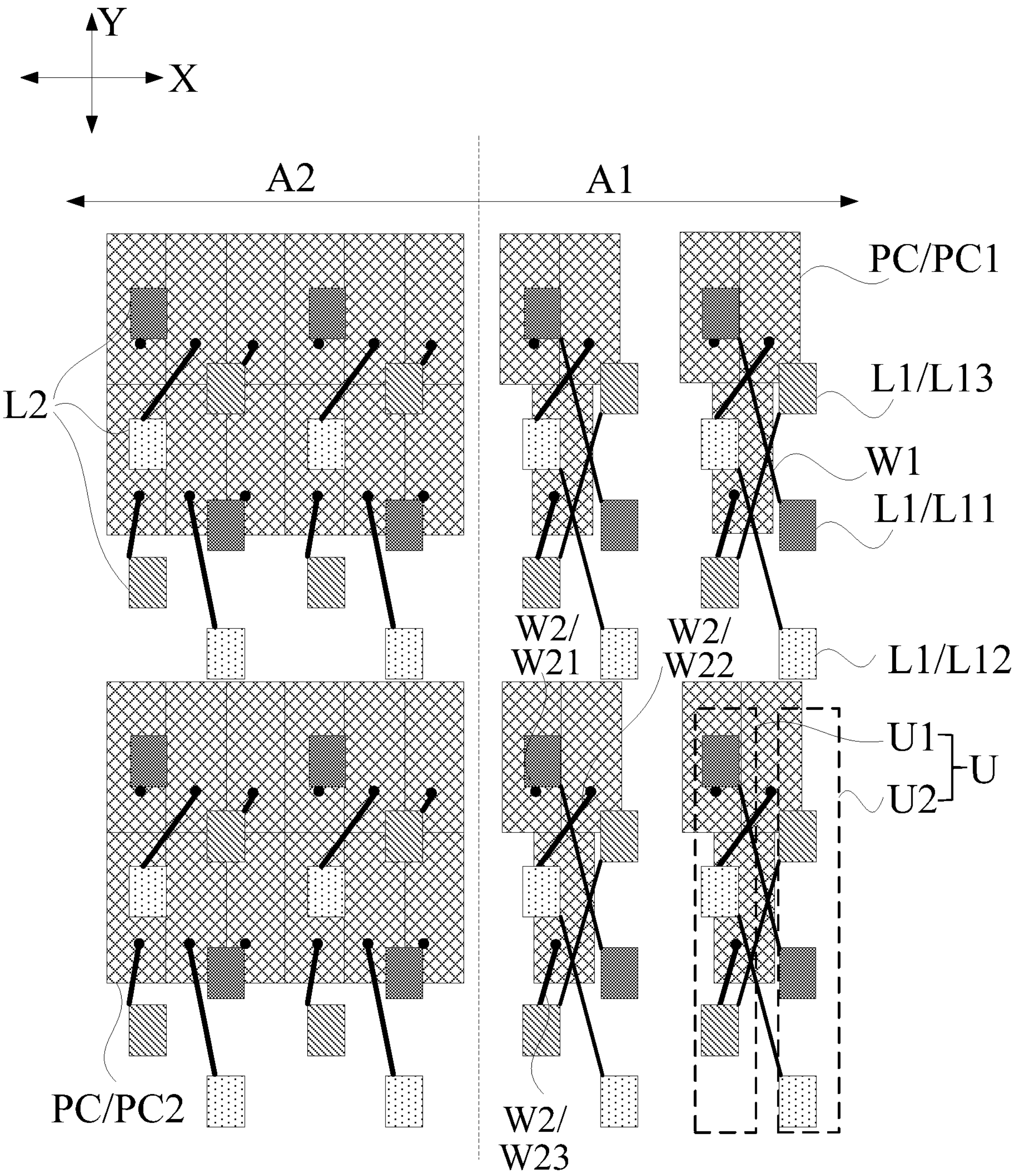
FIG. 34 is a diagram illustrating the structure of another region Q according to an embodiment of the present application.
Figure 35:
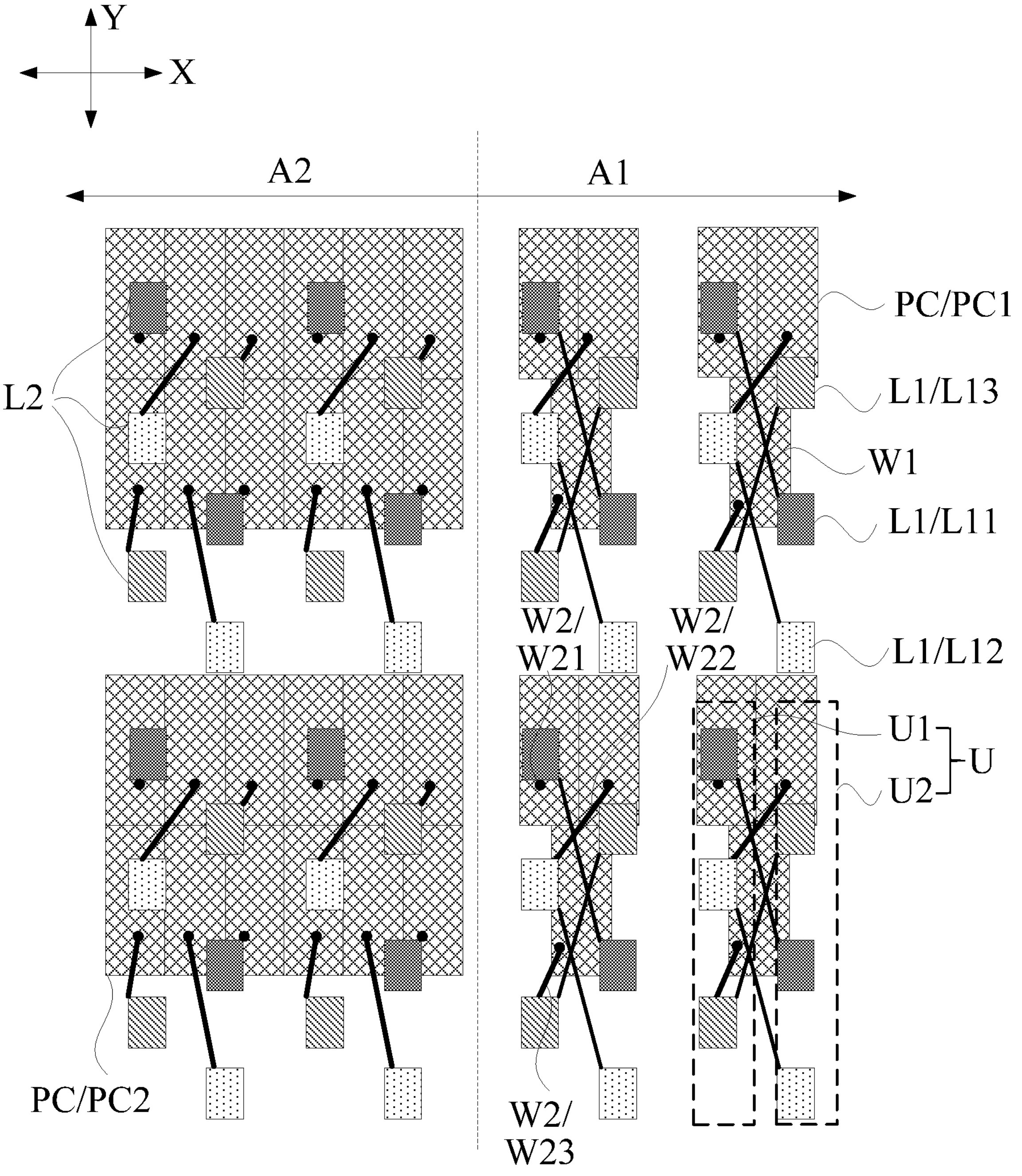
FIG. 35 is a diagram illustrating the structure of another region Q according to an embodiment of the present application.
Figure 36:
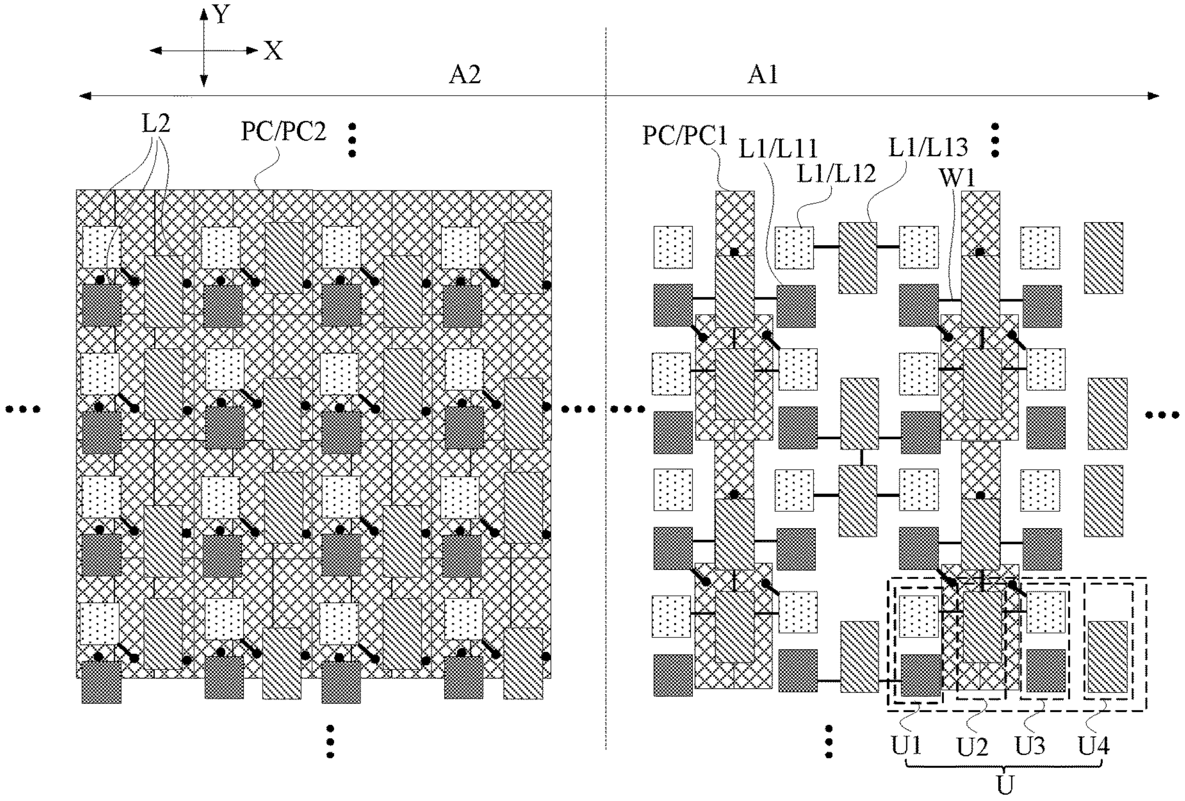
FIG. 36 is a diagram illustrating the structure of another region Q according to an embodiment of the present application.
Figure 37:
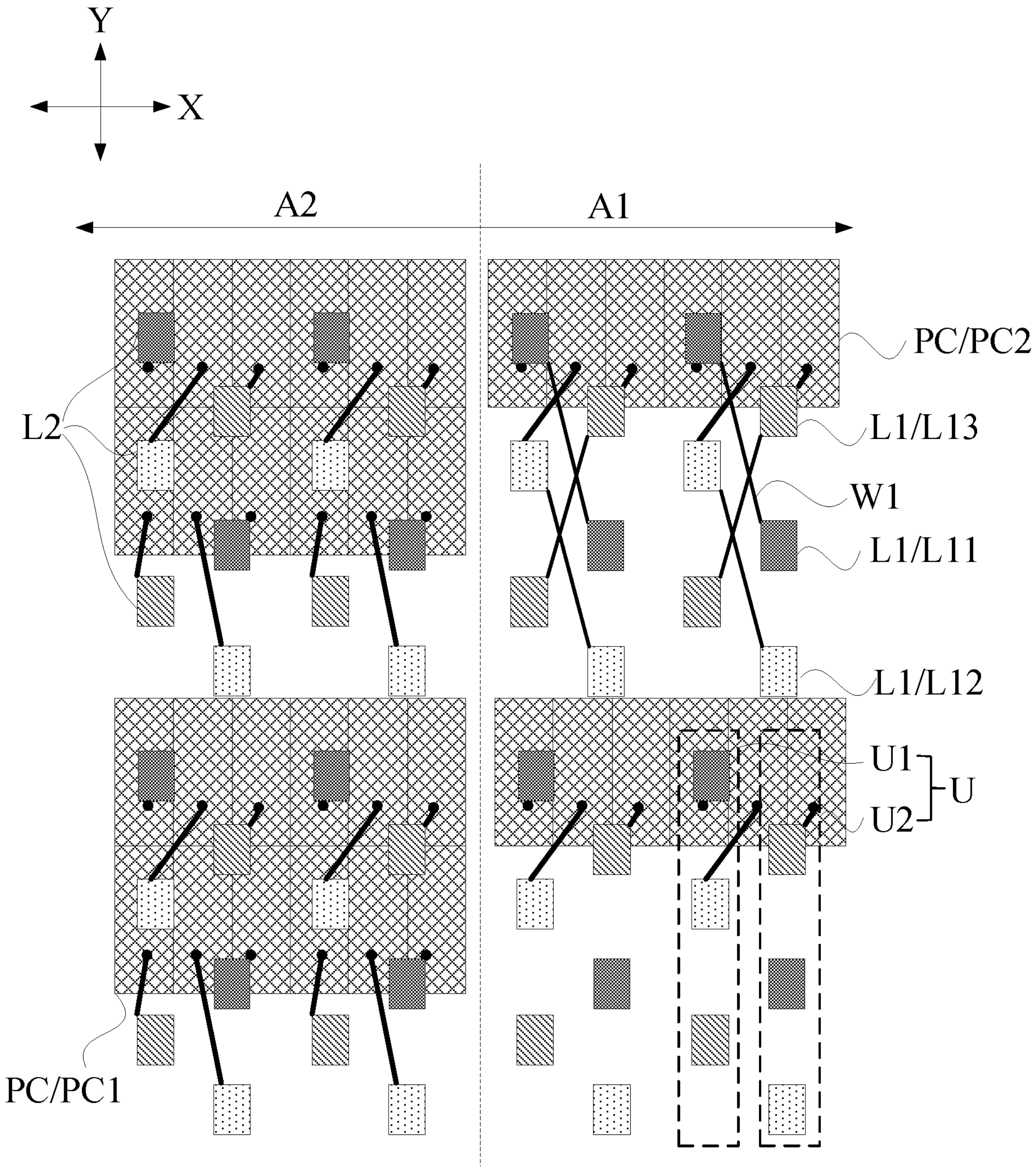
FIG. 37 is a diagram illustrating the structure of another region Q according to an embodiment of the present application.

Such configuration mode is applicable to any pixel arrangement which is described below in detail by way of examples but is not intended to limit the present application. Exemplarily, FIG. 30 is a diagram illustrating the structure of a region Q according to an embodiment of the present application. FIG. 31 is a diagram illustrating the structure of another region Q according to an embodiment of the present application. FIG. 32 is a diagram illustrating the structure of another region Q according to an embodiment of the present application. FIG. 33 is a diagram illustrating the structure of another region Q according to an embodiment of the present application. FIG. 34 is a diagram illustrating the structure of a region Q according to an embodiment of the present application. FIG. 35 is a diagram illustrating the structure of another region Q according to an embodiment of the present application. FIG. 36 is a diagram illustrating the structure of another region Q according to an embodiment of the present application. FIG. 37 is a diagram illustrating the structure of another region Q according to an embodiment of the present application. In FIGS. 30 to 32, and 36, the arrangement mode of the first light-emitting elements L1 is the "x arrangement" and the overlapping between the first pixel circuit PC1 and the first light-emitting element L1 is different. In FIGS. 33 to 35, and 37, the arrangement mode of the first light-emitting elements L1 is the "YYG arrangement" and the overlapping between the first pixel circuit PC1 and the first light-emitting element L1 is different.

In an embodiment, referring to FIGS. 30, 31, 33, 34, 35 and 37, the correspondence between the first pixel circuit PC1 in the first display area A1 and the first light-emitting elements L1 directly electrically connected to the first pixel circuit PC1 in the first display area A1 is the same as the correspondence between the second pixel circuit PC2 in the second display area A2 and the second light-emitting element L2 electrically connected to the second pixel circuit PC2 in the second display area A2. In this way, the design difficulty of the mask used in the process of manufacturing the display panel can be reduced, facilitating reducing the difficulty in manufacturing the display panel. The correspondence described here refers to the overlapping position of an orthographic projection of the pixel circuit PC on the display panel and an orthographic projection of the light-emitting element directly electrically connected to the pixel circuit PC on the display panel, and the overlapping position of an orthographic projection of a via for electrically connecting the pixel circuit PC to the light-emitting element on the display panel and the orthographic projection of the pixel circuit PC on the display panel.

In an embodiment, an orthographic projection of at least one first pixel circuit PC1 on a plane where the display panel is located does not overlap with an orthographic projection of the first light-emitting elements L1 electrically connected to the at least one first pixel circuit PC1 on the plane where the display panel is located.

The light-emitting element electrically connected to the first pixel circuit PC1 described here refers to the first light-emitting element L1 directly connected to the first pixel circuit PC1, and excludes the first light-emitting element L1 indirectly electrically connected to the first pixel circuit PC1 through the co-drive connection line W1 or another first light-emitting element.

Such configuration mode is applicable to any pixel arrangement that is described below in detail by way of examples but is not intended to limit the present application.

In an embodiment, as shown in FIGS. 31, 33, 34 and 35, the light-emitting element L11 of the first color is electrically connected to one first pixel circuit PC1 through a first anode connection line W21. The light-emitting element L12 of the second color is electrically connected to one first pixel circuit PC1 through a second anode connection line W22. The light-emitting element L13 of the third color is electrically connected to one first pixel circuit PC1 through a third anode connection line W23. The length of the second anode connection line W22 is greater than the length of the third anode connection line W23. In an embodiment, the light-emitting element L11 of the first color includes the red light-emitting element, the light-emitting element L12 of the second color includes the green light-emitting element, and the light-emitting element L13 of the third color includes the blue light-emitting element.

The length of the anode connection line W2 described here refers to the minimum distance from the via for electrically connecting the first light-emitting element L1 with the first pixel circuit PC1 to the light-emitting element.

The material of a film where the anode connection line W2 is located and the relative position relationship between the film where the anode connection line W2 is located and other films in the display panel may be set according to practical situations, and are not limited herein. In an embodiment, the anode layer includes at least one first conductive layer and the second conductive layer. The material of the first conductive layer includes an ITO. The material of the second conductive layer includes a silver. The anode connection line W2 may be located in one of the at least one first conductive layer. In this way, one process can be saved, facilitating reducing the cost of the display panel. Moreover, the ITO is transparent, and the anode connection line W2 is arranged in one of the at least one first conductive layer so that the anode connection line W2 can be avoided from blocking the light, facilitating improving the transmittance of the first display area A1, and further improving the optical performance of the optical elements.

The line type of the anode connection line W2 may also be set according to practical situations, which is not limited herein. In an embodiment, the anode connection line W2 may include a straight line, and may also include a curve. In the case where the anode connection line W2 includes the curve, the diffraction degree when the external light bypasses the anode connection line W2 can be effectively reduced, thereby reducing the impact of diffraction phenomenon on the optical performance of the optical elements.

With such configuration, the length of the anode connection line W2 of the green light-emitting element can be greater than the length of the anode connection line W2 of the blue light-emitting element. The green light-emitting element has a longer life than the blue light-emitting element. The length of the anode connection line W2 of the green light-emitting element is increased and the length of the anode connection line of the blue light-emitting element can be shortened so that the signal delay of the blue light-emitting element can be reduced, increasing the light-emitting effect.

Figure 38:
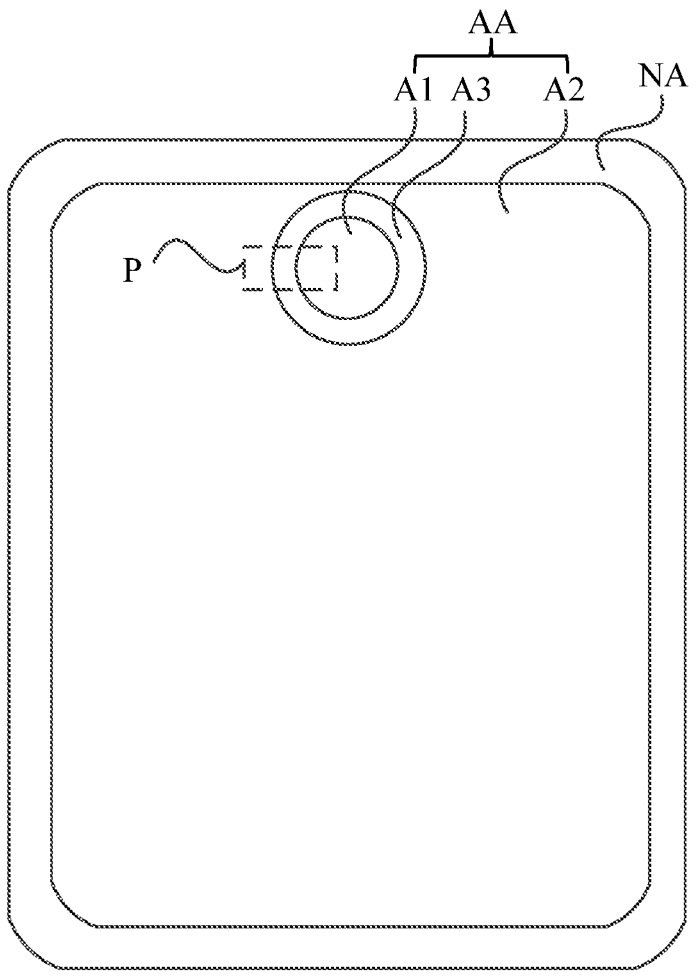
FIG. 38 is a diagram illustrating the structure of another display panel according to an embodiment of the present application.
Figure 39:
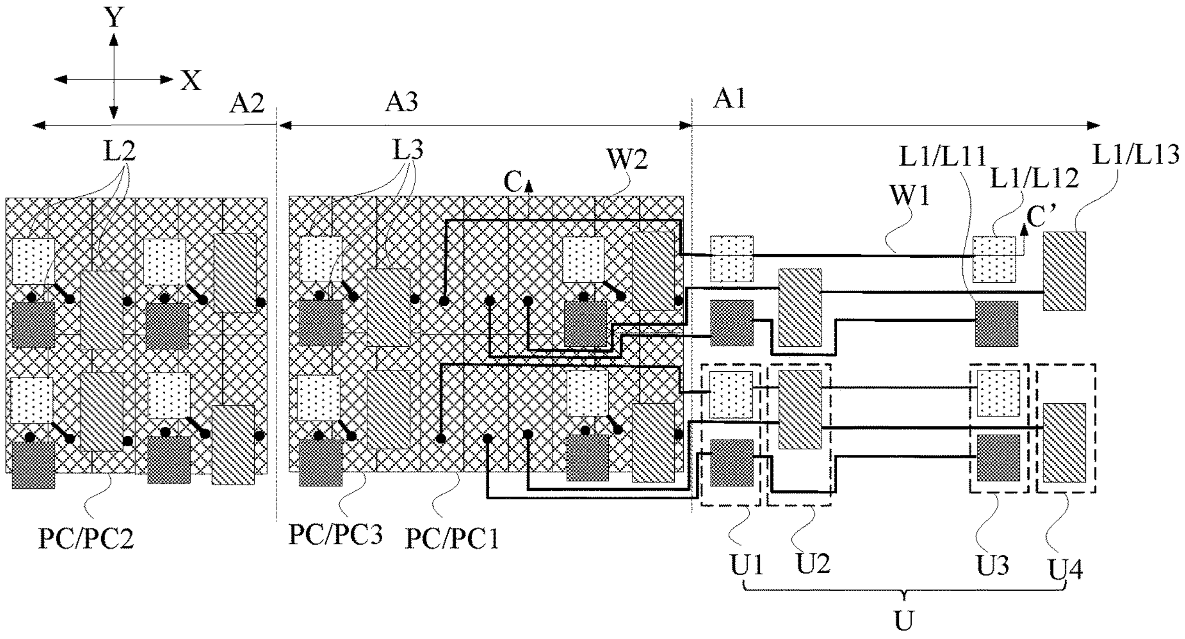
FIG. 39 is a diagram illustrating the structure of a region P according to an embodiment of the present application.
Figure 40:
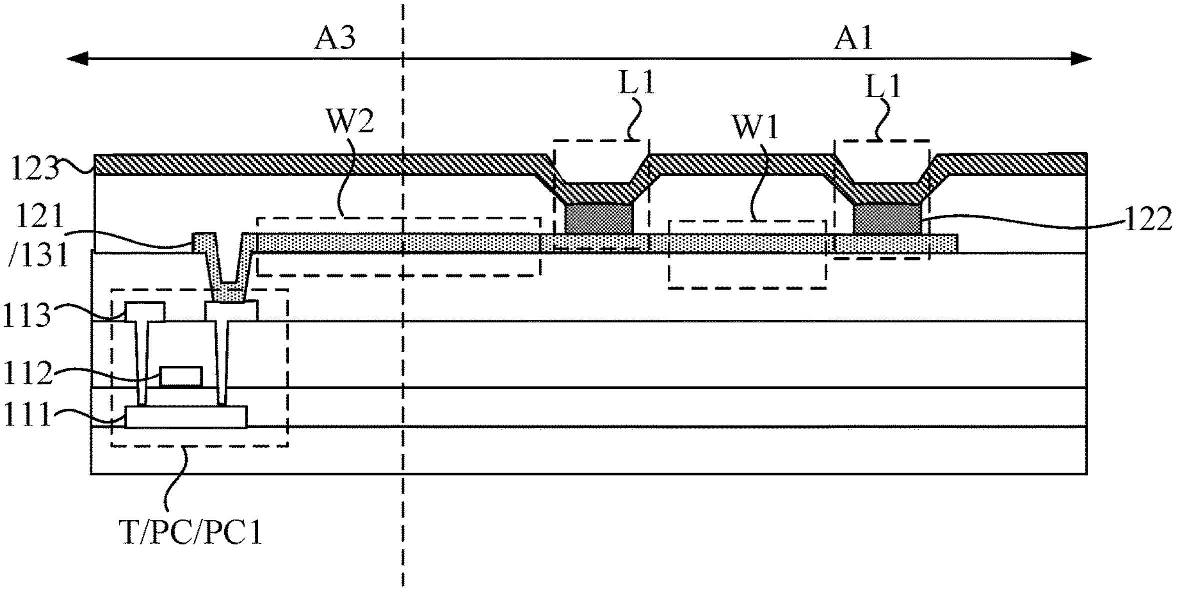
FIG. 40 is a sectional view taken along a direction CC' of FIG. 39.
Figure 41:
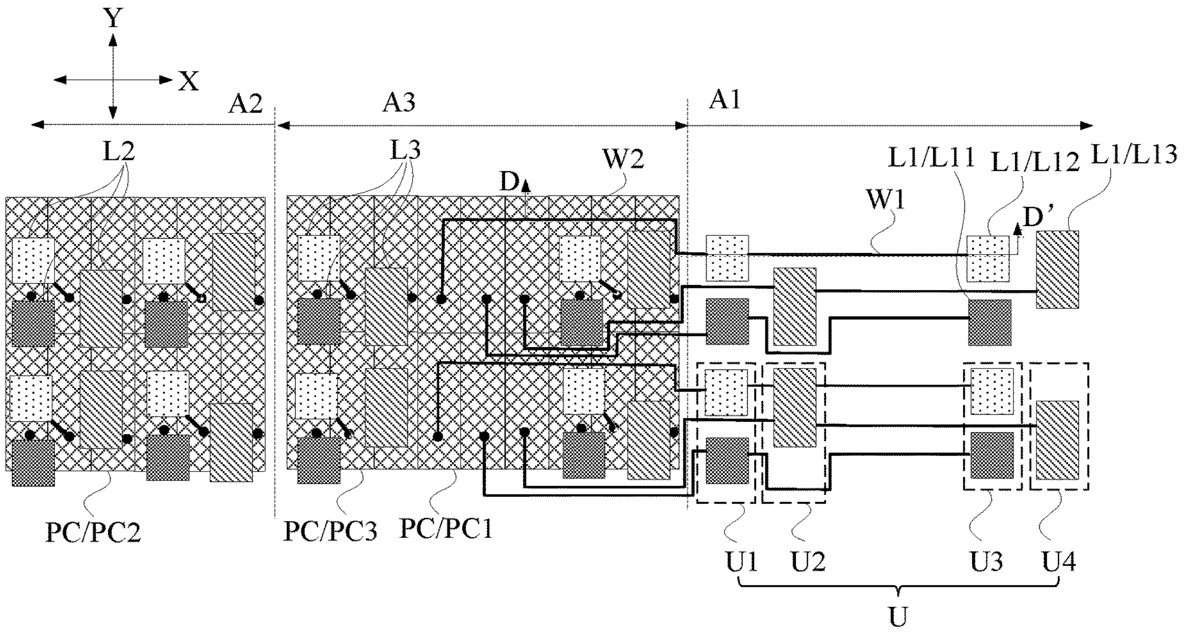
FIG. 41 is a diagram illustrating the structure of another region P according to an embodiment of the present application.
Figure 42:
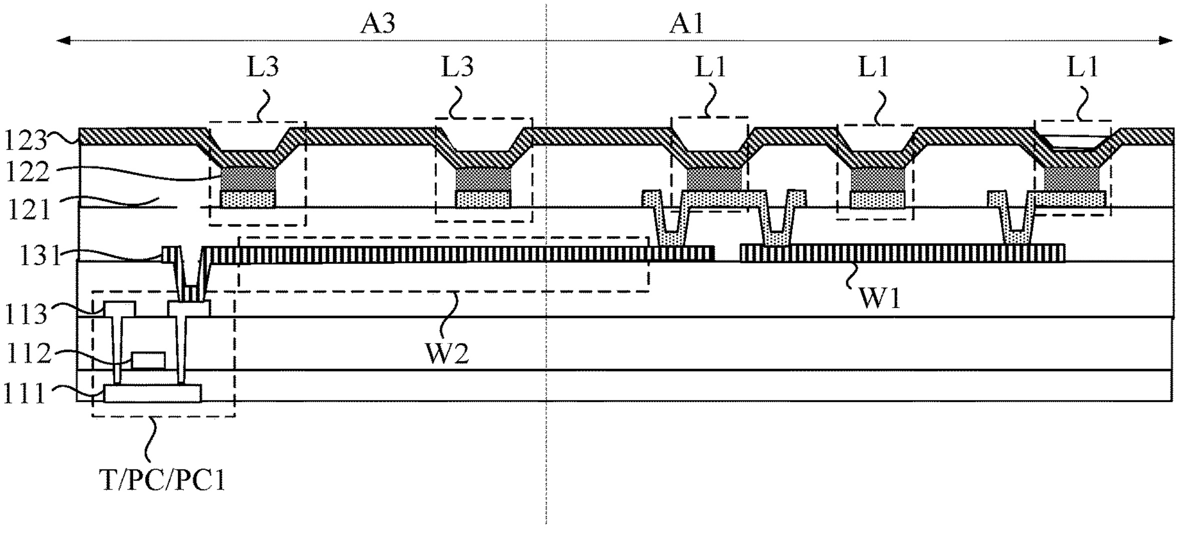
FIG. 42 is a sectional view taken along a direction DD' of FIG. 41.

FIG. 38 is a structural diagram of another display panel according to an embodiment of the present application. FIG. 39 is a diagram illustrating the structure of a region P according to an embodiment of the present application. FIG. 40 is a sectional view taken along a direction CC' of FIG. 39. FIG. 41 is a diagram illustrating the structure of another region P according to an embodiment of the present application. FIG. 42 is a sectional view taken along a direction DD' of FIG. 41. In an embodiment, referring to FIGS. 38 to 42, a display area AA further includes a third display area A3. The third display area A3 is located between a first display area A1 and a second display area A2. At least one first pixel circuit PC1 is located in the third display area A3.

In an embodiment, the third display area A3 further includes third light-emitting elements L3 and third pixel circuits PC3. The third pixel circuit PC3 is configured to drive the third light-emitting elements L3 to emit light. The third pixel circuit PC3 and the first pixel circuit PC1 may have the same or different implementation modes, and are not limited herein.

The at least one first pixel circuit PC1 is moved to the third display area A3 so that the number of first pixel circuits PC1 arranged in the first display area A1 can be reduced, facilitating increasing the transmittance of the first display area A1, thereby facilitating improving the performance of the optical elements.

In an embodiment, the second display area A2 includes second light-emitting elements L2 of at least three different colors. The second pixel circuit PC2 is configured to drive the second light-emitting elements L2 to emit the light. The density of first light-emitting elements L1 in the first display area A1 is less than or equal to the density of second light-emitting elements L2 in the second display area A2.

Figure 43:
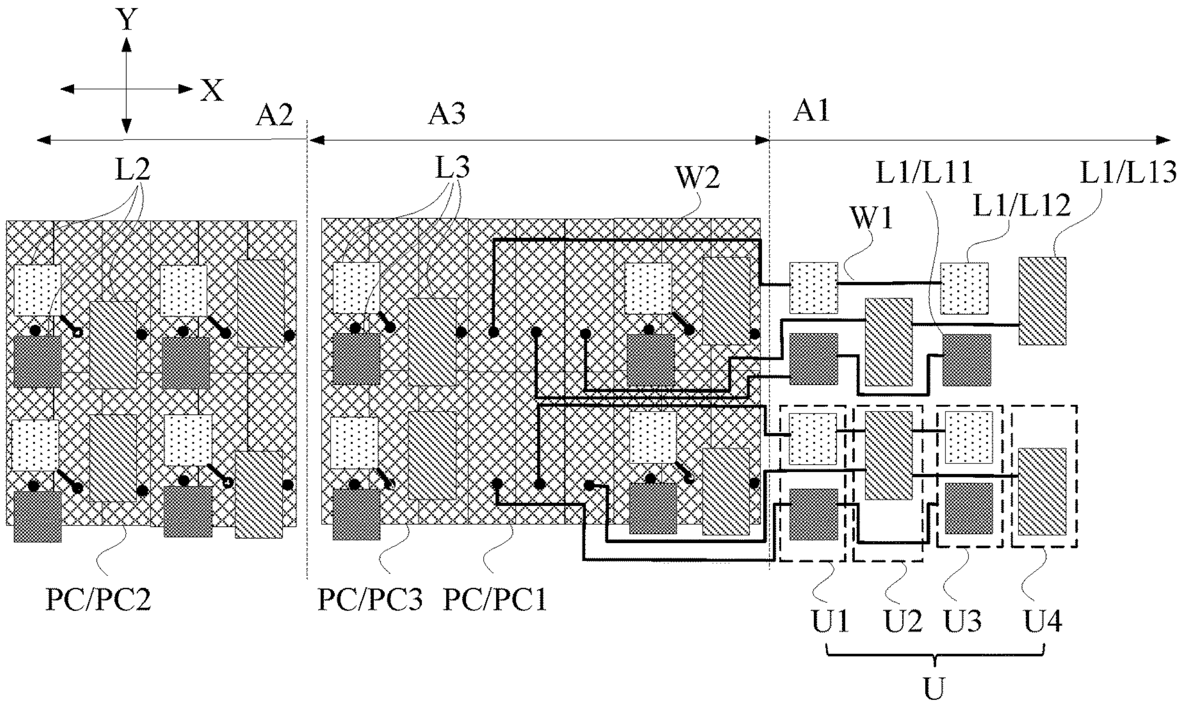
FIG. 43 is a diagram illustrating the structure of another region P according to an embodiment of the present application.

Exemplarily, FIG. 43 is a diagram illustrating the structure of another region P according to an embodiment of the present application. FIGS. 2, 4, 8 to 13, 15, 16, 19 to 21, 22 to 27, 30 to 37 and 43 exemplarily describe the case where the density of first light-emitting elements L1 in the first display area A1 is equal to the density of second light-emitting elements L2 in the second display area A2. On the basis that the density of the first light-emitting elements L1 in the first display area A1 is equal to the density of the second light-emitting elements L2 in the second display area A2, the first pixel circuits PC1 may be arranged in the first display area A1 (i.e., built in), as shown in FIGS. 2, 4, 8 to 13, 15, 16, 19 to 21, 22 to 27 and 30 to 37; the first pixel circuits PC1 may be arranged in the third display area A3 (i.e., built out), as shown in FIG. 43; or the first pixel circuits PC1 may be partially arranged in the first display area A1 and partially arranged in the third display area A3, which are not limited herein. In the case where the first display area A1 is provided with the first pixel circuits PC1, the first pixel circuits PC1 may be aggregated in the first aggregation area JJ or may be dispersed, which are not limited herein.

The density of the first light-emitting elements L1 in the first display area A1 is equal to the density of the second light-emitting elements L2 in the second display area A2 so that the first display area A1 and the second display area A2 have the same display brightness. The current density of the first light-emitting element L1 is equal to the current density of the second light-emitting element L2 so that the aging speed of the first light-emitting element L1 is close to the aging speed of the second light-emitting element L2, avoiding the occurrence of split screen caused by different aging speeds of the first light-emitting element L1 and the light-emitting element L2.

Figure 44:
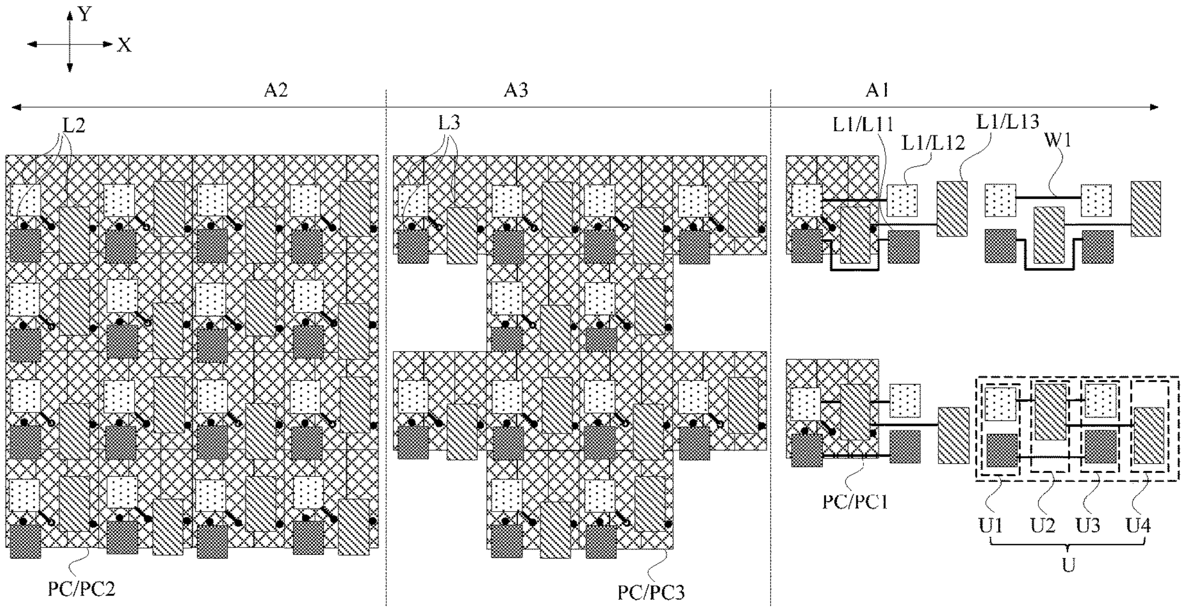
FIG. 44 is a diagram illustrating the structure of another region P according to an embodiment of the present application.
Figure 45:
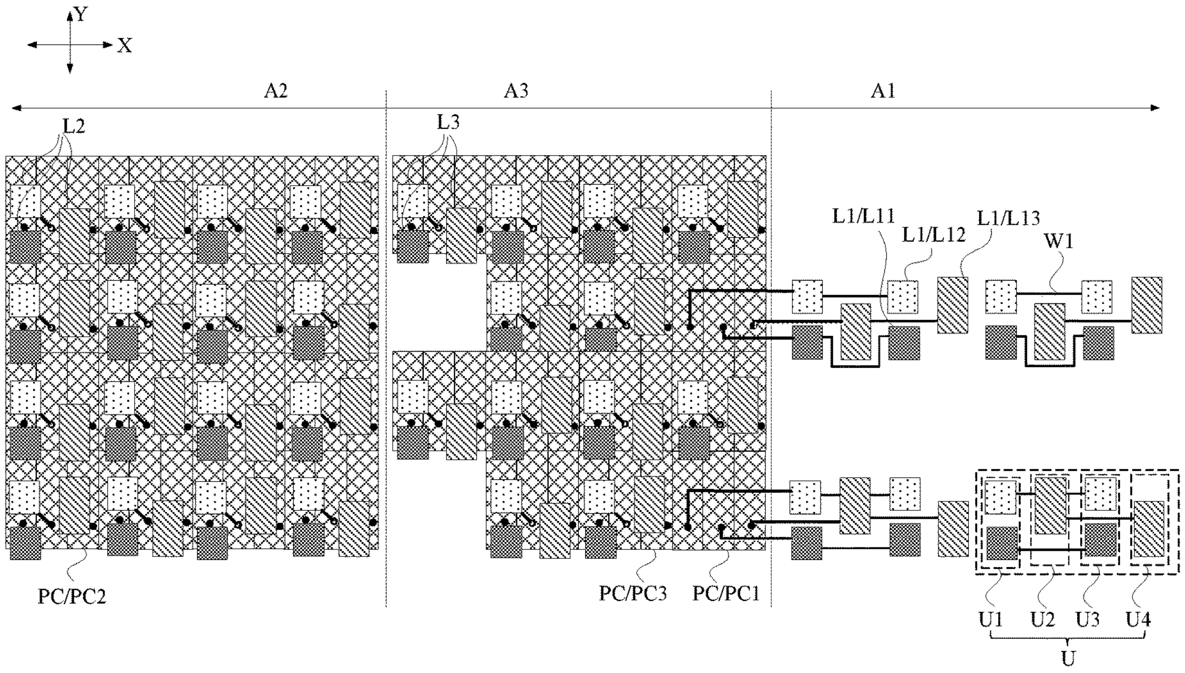
FIG. 45 is a diagram illustrating the structure of a region P according to an embodiment of the present application.

Exemplarily, FIG. 44 is a diagram illustrating the structure of another region P according to an embodiment of the present application. FIG. 45 is a diagram illustrating the structure of a region P according to an embodiment of the present application. FIGS. 14, 17, 18, 28, 29, 44 and 45 exemplarily describe the case where the density of first light-emitting elements L1 in the first display area A1 is less than the density of second light-emitting elements L2 in the second display area A2.

On the basis that the density of the first light-emitting elements L1 in the first display area A1 is less than the density of the second light-emitting elements L2 in the second display area A2, the first pixel circuits PC1 may be arranged in the first display area A1 (i.e., built in), as shown in FIGS. 14, 17, 18, 28, 29 and 44; the first pixel circuits PC1 may be arranged in the third display area A3 (i.e., built out), as shown in FIG. 45; or the first pixel circuits PC1 may be partially arranged in the first display area A1 and partially arranged in the third display area A3, which are not limited herein. In the case where the first display area A1 is provided with the first pixel circuits PC1, the first pixel circuits PC1 may be aggregated in the first aggregation area JJ or may be dispersed, and are not limited herein.

The density of the first light-emitting elements L1 in the first display area A1 is less than the density of the second light-emitting elements L2 in the second display area A2 so that the transmittance of the first display area A1 can be increased, thereby improving the performance of the optical elements.

In an embodiment, FIGS. 44 and 45, the density of third light-emitting elements L3 in the third display area A3 is between the density of the first light-emitting element L1 in the first display area A1 and the density of the second light-emitting element L1 in the second display area A2 to form a transition for improving the display effect.

If not in collision, the structures of the display panel shown in the preceding multiple drawings may be combined or replaced with each other, and are not limited in the embodiments of the present application.

Based on the preceding concept, embodiments of the present application further provide a display device. The display device includes the display panel described in any embodiment of the present application. Therefore, the display device provided in embodiments of the present application also has the effects described in the preceding embodiments, and will not be repeated herein.

Figure 46:
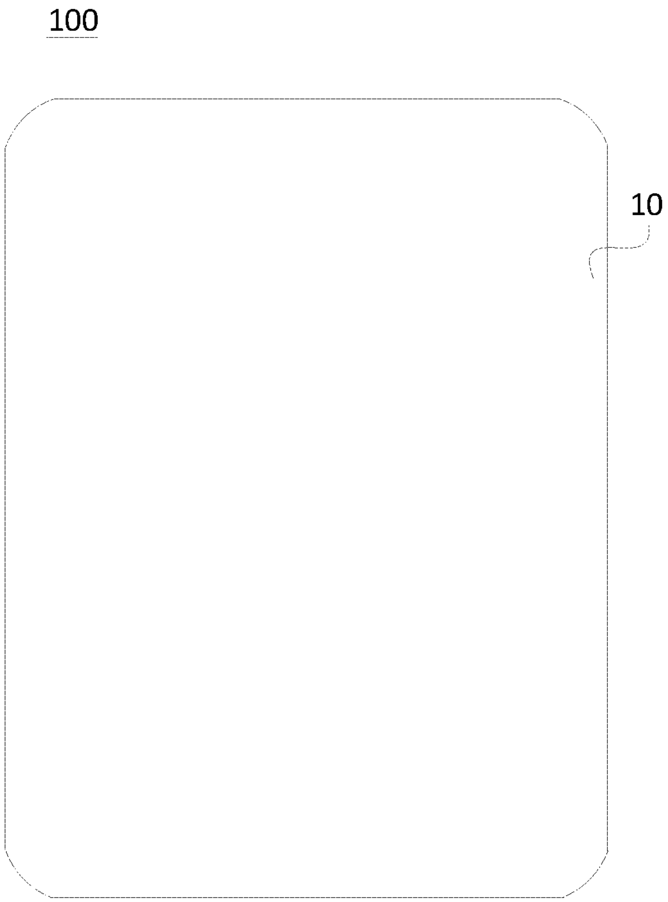
FIG. 46 is a diagram illustrating the structure of a display device according to an embodiment of the present application.

Exemplarily, FIG. 46 is a diagram illustrating the structure of a display device according to an embodiment of the present application. Referring to FIG. 46, a display device 100 includes the display panel 10 according to the preceding implementations. Exemplarily, the display device 100 may include a mobile phone, a computer, a smart wearable device and the like, which is not limited in the embodiments of the present application.

Figure 47:
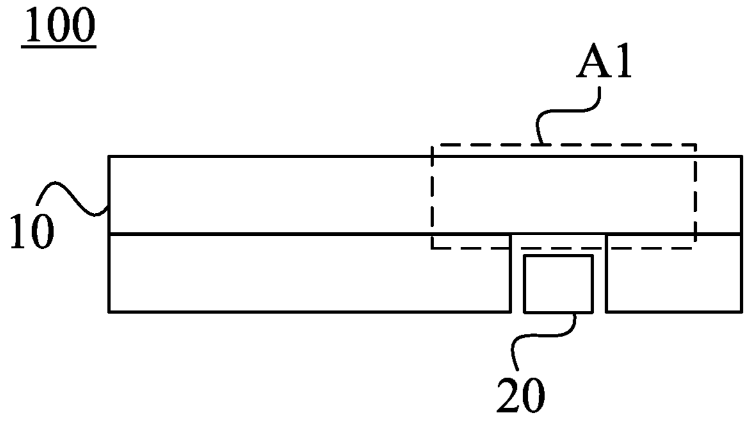
FIG. 47 is a diagram illustrating the structure of films of a display device according to an embodiment of the present application.

Exemplarily, FIG. 47 is a diagram illustrating the structure of a film of a display device according to an embodiment of the present application. As shown in FIG. 47, the display device 100 further includes an optical element 20. The optical element 20 corresponds to a first display area A1. Exemplarily, the optical element 20 may include a camera, an infrared sensor, a fingerprint recognition element and the like.

What is claimed is:

1. A display panel, comprising:

a display area comprising a first display area and a second display area, wherein the first display area is used to accommodate optical elements; and pixel circuits comprising a first pixel circuit and a second pixel circuit, wherein the second pixel circuit is located in the second display area;

wherein the first display area comprises minimum repeating units arranged in rows and columns, a minimum repeating unit of the minimum repeating units comprises first light-emitting elements of at least three different colors, a plurality of first light-emitting elements comprise a light-emitting element of a first color, a light-emitting element of a second color, and a light-emitting element of a third color, and the first pixel circuit is configured to drive first light-emitting elements to emit light;

wherein in at least one minimum repeating unit of the minimum repeating units, at least two first light-emitting elements of at least one same color are electrically connected to a same first pixel circuit;

wherein at least one first pixel circuit is located in the first display area;

wherein the first display area comprises at least one first aggregation area, at least part of the at least one first pixel circuit is located in the at least one first aggregation area, and at least three first pixel circuits compactly closed are arranged in the at least one first aggregation area; and first light-emitting elements electrically connected to the at least three first pixel circuits arranged in the at least one first aggregation area are arranged at an outer periphery of the at least one first aggregation area;

wherein the minimum repeating unit comprises a first light-emitting element column, a second light-emitting element column, a third light-emitting element column, and a fourth light-emitting element column arranged in a row direction, wherein an arrangement mode of the first light-emitting element column is same as an arrangement mode of the third light-emitting element column, and each of the first light-emitting element column and the third light-emitting element column comprises one light-emitting element of the second color and one light-emitting element of the first color arranged in a column direction;

each of the second light-emitting element column and the fourth light-emitting element column comprises one light-emitting element of the third color;

wherein the one light-emitting element of the third color in the second light-emitting element column and the one light-emitting element of the third color in the fourth light-emitting element column are arranged in a misaligned mode in a row direction;

wherein in a same minimum repeating unit, all light-emitting elements of the first color are electrically connected to a same first pixel circuit or all light-emitting elements of the second color are electrically connected to a same first pixel circuit; and one of two light-emitting elements of the third color in a same minimum repeating unit and one light-emitting element of the third color in a different minimum repeating unit are electrically connected to a same first pixel circuit, another one of the two light-emitting elements of the third color in the same minimum repeating unit and one light-emitting element of the third color in a different minimum repeating unit are electrically connected to a same first pixel circuit, and two light-emitting elements of the third color electrically connected to a same first pixel circuit are arranged in the column direction;

wherein in the column direction, one light-emitting element of the third color and another light-emitting element of the third color closest to the one light-emitting element of the third color are electrically connected to a same first pixel circuit;

wherein the two light-emitting elements of the third color electrically connected to the same first pixel circuit are a first sub-color light-emitting element and a second sub-color light-emitting element separately, the first sub-color light-emitting element belongs to a first minimum repeating unit and the second sub-color light-emitting element belongs to a second minimum repeating unit;

the first sub-color light-emitting element, two light-emitting elements of the first color adjacent to the first sub-color light-emitting element in the row direction in the first minimum repeating unit, the second sub-color light-emitting element, the second sub-color light-emitting element, and two light-emitting elements of the second color adjacent to the second sub-color light-emitting element in the row direction in the second minimum repeating unit constitutes a first repeating unit; and first pixel circuits to which the first repeating unit is electrically connected are aggregated in a first aggregation area, and a plurality of first light-emitting elements in the first repeating unit are arranged at an outer periphery of the first aggregation area.

2. The display panel of claim 1, wherein in a same minimum repeating unit, at least two first light-emitting elements of at least one same color are electrically connected to a same first pixel circuit.

3. The display panel of claim 1, wherein among at least two minimum repeating units, at least two first light-emitting elements of at least one same color are electrically connected to a same first pixel circuit.

4. The display panel of claim 3, wherein among at least two adjacent minimum repeating units in a row direction or a column direction, at least two first light-emitting elements of at least one same color are electrically connected to a same first pixel circuit.

5. The display panel of claim 3, wherein among M*N minimum repeating units in at least M rows and N columns, at least two first light-emitting elements of at least one same color are electrically connected to a same first pixel circuit, wherein M and N are both positive integers greater than or equal to 2.

6. The display panel of claim 1, wherein first pixel circuits in a same first aggregation area of the at least one first aggregation area are arranged in rows, in columns, or in rows and columns.

7. The display panel of claim 1, wherein second pixel circuits and first pixel circuits in the first aggregation area are in a same row direction.

8. The display panel of claim 1, wherein second pixel circuits and first pixel circuits in the first aggregation area are arranged in staggered rows.

9. The display panel of claim 1, wherein the light-emitting element of the first color is electrically connected to one first pixel circuit through a first anode connection line, the light-emitting element of the second color is electrically connected to one first pixel circuit through a second anode connection line, and the light-emitting element of the third color is electrically connected to one first pixel circuit through a third anode connection line; and a length of the second anode connection line is greater than a length of the third anode connection line.

10. The display panel of claim 6, wherein the first pixel circuits in the same first aggregation area comprise at least one pixel circuit row; and wherein the display panel further comprises: a scan line extending in a row direction and electrically connected to the first pixel circuit; and in the same first aggregation area, the at least one pixel circuit row is electrically connected to at least two scan lines.

11. The display panel of claim 10, wherein the at least one pixel circuit row comprises a first pixel circuit row and a second pixel circuit row, wherein the first pixel circuit row comprises one first pixel circuit electrically connected to the light-emitting element of the third color; and the second pixel circuit row comprises two first pixel circuits and the two first pixel circuits are electrically connected to the light-emitting element of the first color and the light-emitting element of the second color separately.

12. A display device, comprising: the display panel of claim 1.

* * * * *